US012763935B2

(12) United States Patent
Nix

(10) Patent No.: US 12,763,935 B2
(45) **Date of Patent: *Oct. 13, 2026**

(54) PUBLIC KEY EXCHANGE WITH AUTHENTICATED ECDHE AND SECURITY AGAINST QUANTUM COMPUTERS

(71) Applicant: Network-1 Technologies, Inc., New Canaan, CT (US)

(72) Inventor: John A Nix, Evanston, IL (US)

(73) Assignee: NETWORK-1 TECHNOLOGIES, INC., New Canaan, CT (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/904,406

(22) Filed: Oct. 2, 2024

(65) Prior Publication Data

US 2025/0106010 A1 Mar. 27, 2025

Related U.S. Application Data

(63) Continuation of application No. 18/479,099, filed on Oct. 1, 2023, now Pat. No. 12,143,478, which is a (Continued)

(51) Int. Cl.

| | |
|---|---|
| ***H04L 9/08*** | (2006.01) |
| ***H04L 9/06*** | (2006.01) |
| ***H04L 9/30*** | (2006.01) |

(52) U.S. Cl.
CPC .......... *H04L 9/0844* (2013.01); *H04L 9/0618* (2013.01); *H04L 9/0852* (2013.01); *H04L 9/0869* (2013.01); *H04L 9/3066* (2013.01)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS

| | | | | |
|---|---|---|---|---|
| 5,764,765 | A * | 6/1998 | Phoenix | H04L 9/0858 380/256 |
| 6,748,083 | B2 * | 6/2004 | Hughes | H04L 9/0858 380/278 |

(Continued)

OTHER PUBLICATIONS

Blake-Wilson et al, "Key Agreement Protocols and their Security Analysis", Sep. 9, 1997, Sixth IMA International Conference on Cryptography and Coding, pp. 1-35.

(Continued)

*Primary Examiner* — Sharif E Ullah
(74) *Attorney, Agent, or Firm* — Amster, Rothstein & Ebenstein LLP

(57) ABSTRACT

Elliptic Curve Cryptography (ECC) can provide security against quantum computers that could feasibly determine private keys from public keys. A server communicating with a device can store and use PKI keys comprising server private key ss, device public key Sd, and device ephemeral public key Ed. The device can store and use the corresponding PKI keys, such as server public key Ss. The key use can support all of (i) mutual authentication, (ii) forward secrecy, and (iii) shared secret key exchange. The server and the device can conduct an ECDHE key exchange with the PKI keys to mutually derive a symmetric ciphering key K1. The device can encrypt a device public key PK.Device with K1 and send to the server as a first ciphertext. The server can encrypt a server public key PK.Network with at least K1 and send to the device as a second ciphertext.

14 Claims, 19 Drawing Sheets

Related U.S. Application Data continuation of application No. 17/748,706, filed on May 19, 2022, now Pat. No. 11,777,719, which is a continuation of application No. 16/805,172, filed on Feb. 28, 2020, now Pat. No. 11,343,084.

(60) Provisional application No. 62/812,710, filed on Mar. 1, 2019.

(58) Field of Classification Search

CPC ....... H04L 9/3226; H04L 9/0891; H04L 9/14; H04L 9/0827; H04L 2209/24; H04L 9/08; H04L 9/0819; H04L 9/088; H04L 9/0844; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86

USPC ........ 713/171, 150, 163, 181; 726/2, 21, 36; 380/255, 264, 276

See application file for complete search history.

(56) References Cited

U.S. PATENT DOCUMENTS

| | | | | |
|---|---|---|---|---|
| 7,437,081 | B2 * | 10/2008 | Mitchell | H04B 10/70 398/154 |
| 8,761,401 | B2 * | 6/2014 | Sprunk | H04L 9/0844 380/278 |
| 8,782,774 | B1 * | 7/2014 | Pahl | H04L 9/0841 726/4 |
| 8,855,316 | B2 * | 10/2014 | Wiseman | H04L 9/0855 380/278 |
| 9,118,464 | B2 * | 8/2015 | Nix | H04L 9/0861 |
| 9,276,740 | B2 | 3/2016 | Nix | |
| 9,288,059 | B2 | 3/2016 | Nix | |
| 9,553,856 | B2 | 1/2017 | Pahl et al. | |
| 9,628,268 | B2 * | 4/2017 | Kiang | G06F 21/6218 |
| 9,960,465 | B2 * | 5/2018 | Dudley | H01M 50/204 |
| 10,057,058 | B2 * | 8/2018 | Murakami | H04L 9/0858 |
| 10,129,224 | B2 | 11/2018 | Pahl et al. | |
| 2005/0138352 | A1 * | 6/2005 | Gauvreau | H04L 9/3247 713/153 |
| 2007/0065154 | A1 * | 3/2007 | Luo | H04L 9/0852 398/141 |
| 2007/0076884 | A1 * | 4/2007 | Wellbrock | H04L 9/0855 380/263 |
| 2007/0195774 | A1 * | 8/2007 | Sherman | H04L 69/16 370/392 |
| 2011/0206204 | A1 * | 8/2011 | Sychev | H04J 14/06 380/256 |
| 2011/0213979 | A1 * | 9/2011 | Wiseman | H04L 9/0844 713/171 |
| 2014/0010234 | A1 * | 1/2014 | Patel | H04L 45/74 370/392 |
| 2014/0068765 | A1 * | 3/2014 | Choi | H04L 63/1416 726/23 |
| 2014/0133652 | A1 * | 5/2014 | Oshida | H04L 9/0897 380/255 |
| 2016/0241396 | A1 * | 8/2016 | Fu | H04L 9/0836 |
| 2016/0359626 | A1 * | 12/2016 | Fu | H04L 9/0858 |
| 2016/0366094 | A1 * | 12/2016 | Mason | H04L 61/5038 |
| 2017/0214525 | A1 * | 7/2017 | Zhao | H04W 12/0431 |
| 2017/0230173 | A1 * | 8/2017 | Choi | H04L 9/0861 |
| 2018/0144147 | A1 * | 5/2018 | Nix | H04W 12/35 |
| 2018/0176091 | A1 * | 6/2018 | Yoon | H04L 5/1446 |
| 2019/0036821 | A1 * | 1/2019 | Levy | G06F 12/0868 |
| 2019/0349392 | A1 * | 11/2019 | Wetterwald | H04L 43/0852 |
| 2020/0084222 | A1 * | 3/2020 | William | H04L 63/12 |
| 2021/0211279 | A1 * | 7/2021 | Nix | H04L 9/0841 |
| 2021/0218560 | A1 * | 7/2021 | Nix | H04L 9/3252 |

OTHER PUBLICATIONS

E. Rescorla, et al., Encrypted Server Name Indication for TLS 1.3, draft-ietf-tls-esni-02, Oct. 22, 2018, pp. 1-21.

European Technical Standards Institute (ETSI), "Meeting #81 document SCP(17)000188", Dec. 5, 2017, pp. 1-10.

GSM Association, "iUICC POC Group Primary Platform requirements", Release 1.0, May 17, 2017, pp. 1-43.

National Institute of Standards and Technology (NIST) document "NIST SP 800-56A, Recommendation for Pair-Wise Key Establishment Schemes Using Discrete Logarithm Cryptography", Mar. 2007, pp. 1-152.

Putman, "ECDH-based Authentication using Pre-Shared Asymmetric Keypairs for (Datagram) Transport Layer Security ((D)TLS) Protocol version 1.2", IETF TLS Working Group, Nov. 30, 2017, pp. 1-12.

Turner et al, "Use of Elliptic Curve Cryptography {ECG) Algorithms in Cryptographic Message Syntax {CMS)", IETF RFC 5753, Jan. 2010, pp. 1-61.

WiFi Alliance, Device Provisioning Protocol Specification Version 1.0, Apr. 9, 2018, pp. 1-124.

Wikipedia, "Elliptic Curve Diffie-Hellman", Mar. 9, 2018, pp. 1-2.

Wikipedia, "Elliptic curve point multiplication", May 15, 2018, pp. 1-7.

* cited by examiner

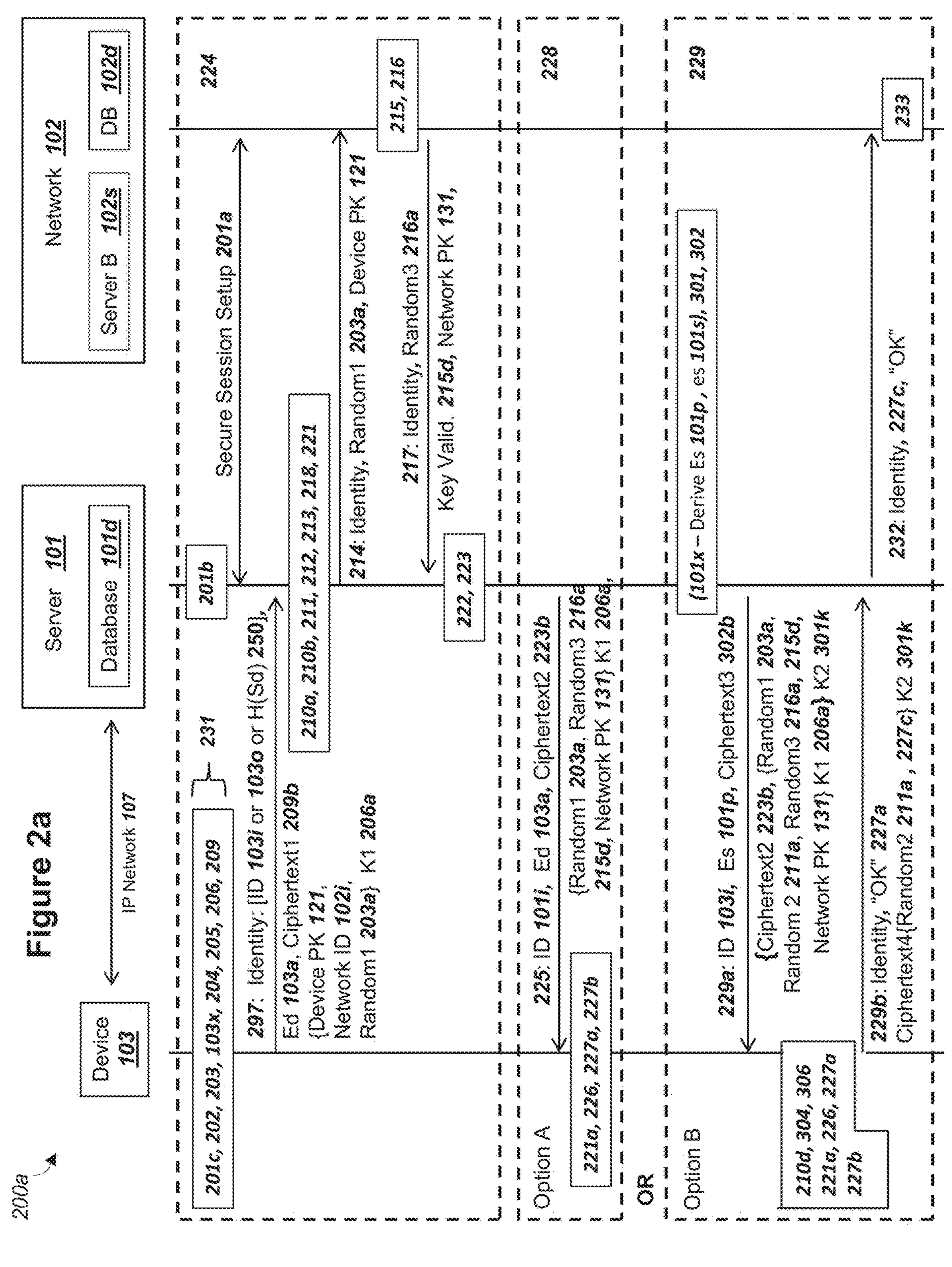
Figure 2a
200a
Device 103
IP Network 107
Server 101
Database 101d
Network 102
Server B 102s
DB 102d
201c, 202, 203, 103x, 204, 205, 206, 209
231
201b
Secure Session Setup 201a
224
297: Identity: [ID 103i or 103o or H(Sd) 250],
Ed 103a, Ciphertext1 209b
{Device PK 121,
Network ID 102i,
Random1 203a} K1 206a
210a, 210b, 211, 212, 213, 218, 221
214: Identity, Random1 203a, Device PK 121
215, 216
217: Identity, Random3 216a
Key Valid. 215d, Network PK 131,
222, 223
Option A
228
225: ID 101i, Ed 103a, Ciphertext2 223b
{Random1 203a, Random3 216a
215d, Network PK 131} K1 206a,
221a, 226, 227a, 227b
OR
Option B
229
{101x – Derive Es 101p, es 101s}, 301, 302
229a: ID 103i, Es 101p, Ciphertext3 302b
{Ciphertext2 223b, {Random1 203a,
Random 2 211a, Random3 216a, 215d,
Network PK 131} K1 206a} K2 301k
210d, 304, 306
221a, 226, 227a
227b
229b: Identity, "OK" 227a
Ciphertext4{Random2 211a, 227c} K2 301k
232: Identity, 227c, "OK"
233

Figure 2f

Server Database 101d

PKI Key Table 101da

| Row | ID-token.dev **103o** | ID.Device **103i** | H(Sd) **250** | H(Ss) **252** | Sd **103c** | Ed **103a** | Ss **101a** | ss **101b** | Network ID **102i** | PK.Network **131** | Es **101p** | es **101s** |
|---|---|---|---|---|---|---|---|---|---|---|---|---|
| 1 | 103o-1 | 103i-1 | | | 103c-1 | 103a-1 | 101a-1 | 101b-1 | 102i-1 | 131-1 | 101p-1 | 101s-1 |
| 2 | | 103i-2 | 250-2 | | 103c-2 | 103a-2 | 101a-1 | 101b-1 | 102i-1 | 131-2 | | |
| 3 | 103o-3 | 103i-3 | | 251-1 | 103c-3 | 103a-3 | 101a-3 | 101b-3 | 102i-1 | 131-3 | | |
| 4 | | 103i-4 | 250-4 | 251-4 | 103c-4 | 103a-4 | 101a-4 | 101b-4 | 102i-1 | 131-4 | 101p-4 | 101s-4 |
| 5 | 103o-5 | 103i-5 | 250-5 | 251-5 | 103c-5 | 103a-5 | 101a-5 | 101b-5 | 102i-2 | 131-5 | 101p-5 | 101s-5 |

...

Device Table 101db

| Row | ID-Device **103i** | Random 1 **203a** | Parameters A **104a** | Source IP:Port **297p** | Radom 2 **211a** | Radom 3 **216a** | X0 **213a** | X3 **207a** | K1 **206a** | K2 **301k** |
|---|---|---|---|---|---|---|---|---|---|---|
| 1 | 103i-1 | 203a-1 | 104a-1 | 297p-1 | 211a-1 | 216a-1 | 213a-1 | 207a-1 | 206a-1 | 301k-1 |
| 2 | 103i-2 | 203a-2 | 104a-1 | 297p-2 | 211a-2 | 216a-2 | 213a-2 | 207a-2 | 206a-2 | |
| 3 | 103i-3 | 203a-3 | 104a-1 | 297p-3 | 211a-3 | 216a-3 | 213a-3 | 207a-3 | 206a-3 | |
| 4 | 103i-4 | 203a-3 | 104a-2 | 297p-4 | 211a-4 | 216a-4 | 213a-4 | 207a-4 | 206a-4 | 301k-4 |
| 5 | 103i-5 | 203a-3 | 104a-4 | 297p-5 | 211a-5 | 216a-5 | 213a-5 | 207a-5 | 206a-5 | 301k-5 |

...

Figure 2g

Cryptographic Parameters A 104

| Set 104a | PKI Key Length 104b | Curve 104c | Hash 104d | Symmetric Ciphering Key Length 104e | Symmetric Ciphering Parameters 104f | Random Length 104g | Server Encryption Option 104h |
|---|---|---|---|---|---|---|---|
| A | 256 | p256 | SHA-256 | 128 | C1 | 128 | A |
| B | 384 | p384 | SHA-384 | 192 | C2 | 192 | B |
| C | 512 | secp521r1 | SHA-512 | 256 | C3 | 256 | A |
| D | 256 | Curve25519 | SHA-3 | 128 | C4 | 128 | B |
| E | 448 | Curve448 | SHA-3 | 192 | C5 | 192 | A |

...

Figure 2h

Network Database 102d

| Row | ID-Device 103i | Parameters B 131b | Source IP:Port 297p | Random 3 216a | PK.Device 121a | PK.Network 131a | SK.Network 132 | X5 503 | K3 506a |
|---|---|---|---|---|---|---|---|---|---|
| 1 | 103i-1 | 131b-1 | 203a-1 | 216a-1 | 121a-1 | 131a-1 | 132-1 | 503-1 | 506a-1 |
| 2 | 103i-2 | 131b-1 | 203a-2 | 216a-2 | 121a-2 | 131a-1 | 132-1 | 503-2 | 506a-2 |
| 3 | 103i-3 | 131b-3 | 203a-3 | 216a-3 | 121a-3 | 131a-3 | 132-3 | 503-3 | 506a-3 |
| 4 | 103i-4 | 131b-4 | 203a-4 | 216a-4 | 121a-4 | 131a-4 | 132-4 | 503-4 | 506a-4 |
| 5 | 103i-5 | 131b-5 | 203a-5 | 216a-5 | 121a-5 | 131a-5 | 132-5 | 503-5 | 506a-5 |

...

500

PUBLIC KEY EXCHANGE WITH AUTHENTICATED ECDHE AND SECURITY AGAINST QUANTUM COMPUTERS

CROSS-REFERENCE TO RELATED APPLICATIONS

This U.S. non-provisional application is a continuation of U.S. Non-Provisional application Ser. No. 18/479,099, filed on Oct. 1, 2023, which is a continuation of U.S. Non-Provisional application Ser. No. 17/748,706, filed May 19, 2022, that issued as U.S. Pat. No. 11,777,719 on Oct. 3, 2023, which is a continuation of U.S. Non-Provisional application Ser. No. 16/805,172, filed Feb. 28, 2020, that issued as U.S. Pat. No. 11,343,084 on May 24, 2022, and that claims the benefit of the filing date of U.S. Provisional patent application Ser. No. 62/812,710, filed Mar. 1, 2019, which are all hereby incorporated by reference in their entirety.

BACKGROUND

Technical Field

The present systems and methods relate to the secure and authenticated transfer of public keys using ephemeral elliptic curve Diffie Hellman (ECDHE) key exchanges, including security against quantum computers, and more particularly to communications between a computing device, a server, and a network in order for the computing device and the network to (i) securely transfer public keys in an authenticated and encrypted manner and (ii) conduct key exchanges with the public keys and corresponding private keys in order to encrypt and decrypt data.

Description of Related Art

The use of elliptic curve cryptography (ECC) for computing devices has expanded over the past decade and is also expected to continue to grow. Many applications use or propose using ephemeral elliptic curve Diffie Hellman (ECDHE) key exchanges in order for nodes to mutually derive a symmetric ciphering key. Prominent examples today include embedded universal integrated circuit cards (eUICCs) also known as embedded SIMs, Transport Layer Security (TLS) version 1.3 from the Internet Engineering Task Force (IETF), and the Device Provisioning Protocol (DPP) from the WiFi Alliance™. Other examples are expected in the future as well, such as the use of ECDHE in order to protect the Subscription Permanent Identifier (SUPI) for 5G mobile networks, where the SUPI is equivalent to an International Mobile Subscriber Identity (IMSI). ECDHE can be considered a subset of elliptic curve Diffie-Hellman key exchanges (ECDH), where ECDHE key exchanges use at least one ephemeral or short-term elliptic curve PKI key pair. Applications use ECDHE key exchanges in order for two nodes to mutually derive a symmetric ciphering key and a message authentication code (MAC) key. The symmetric ciphering key can subsequently be used with a symmetric ciphering algorithm such as the Advanced Encryption Standard (AES) and the MAC key can be used to verify message integrity. In this manner, secure communication can be established between two nodes.

ECDHE key exchanges depend on a first node deriving a first ephemeral private and public key pair and a second node deriving or using a second private and public key, where the public key infrastructure (PKI) keys use a common elliptic curve. The elliptic curve can be specified in parameters that define a named curve such as secp256r1 (P-256), secp256k1, secp385r1, etc., and many other possibilities exist as well for named curves, include curve 25519. ECDHE key exchanges have multiple benefits over older generation technology such as Diffie Hellman key exchanges. With ECDHE, elliptic curve cryptography can be utilized with shorter keys and faster processing times compared to previous technology, for the equivalent level of security or bit length of keys. For example, a 256 bit ECC PKI key pair can be used to obtain a comparable level of security as that obtained from using a 3072 bit RSA based PKI key pair. Calculation or processing time for conducting an ECDHE key exchange can also be faster than a traditional Diffie Hellman key exchange for the same level of security, as defined by the resulting key length of a derived shared secret from the key exchange. Note that ECDHE key exchanges in many applications or standards also include the use of digital signatures in order to authenticate a node, since ephemeral ECDH keys typically provide no inherent authentication (e.g. potentially any node could derive an ephemeral PKI key pair).

Although the use of ECDHE key exchanges is growing rapidly and included in many different protocols and standards, quantum computers are expected to be able to solve the elliptic curve discrete logarithm problem in polynomial time, while classical computers solve the problem in exponential time. As of early 2019, estimates for the number of qubits required to break a 256 bit ECC public key to determine the private key with a reasonable computation time are approximately 2000-4000 qubits. Estimates for the number of qubits required to break a 3072 bit RSA based PKI public key to determine the private key are approximately 4000-8000 qubits. Industry projections of the number of qubits for operating quantum computers shows this number of qubits could be available in approximately 5 to 10 years, and likely within 15 years. However, the wholesale change of protocols such as TLS or the embedded SIM to entirely new and relatively unproven but "quantum safe" post-quantum cryptographic algorithms will also likely require more than a decade.

Consequently, there exists a need in the art where existing elliptic curve cryptography algorithms and keys could be used to encrypt public keys in an authenticated manner, such that the public keys could be transferred or exchanged across an insecure network such as the public Internet in a secure manner. As contemplated herein, the use of PKI keys based on any of the integer factorization problem (e.g. RSA), the discrete logarithm problem (e.g. Diffie Hellman), and the elliptic curve discrete logarithm problem (ECDH) can be referred to as classical PKI with classical public keys. The use of PKI keys with quantum safe problems such as (i) lattice based algorithms, such as learning with errors, (ii) code based algorithms such as classic McEliece, and (iii) ECC algorithms that based on Supersingular Elliptic Curve Isogeny can be considered "post-quantum cryptography" (PQC), and other possibilities exist as well for PQC.

Although the use of ECDHE key exchanges is growing rapidly and included in many different protocols and standards, improvements can be made for ECDHE key exchanges in order to further enhance security and also leverage existing keys that may be recorded by the nodes participating in an ECDHE key exchange. As one example, an ECDHE key exchange as contemplated for (a) the exemplary applications and standards from the first paragraph above do not normally (b) provide authentication of either node. Separate steps than an ECDHE key exchange have to be conducted in order to authenticate endpoints, such as using an elliptic curve digital signature algorithm (ECDSA) with static or long-term ECC PKI keys recorded by the nodes. ECDSA algorithms also have challenges, where the reuse of a value k for two different signatures can reveal the private key. As another example and related to the authentication issue above, an ECDHE is susceptible to “man in the middle” attacks, where an intermediate node or different node than the intended node can perform the ECDHE key exchange instead of the intended node.

Thus, although ECDHE can securely establish a symmetric ciphering key for confidentiality of data communications, the confidentiality could be established with a party or node that is not the intended recipient of the confidential communications. Consequently, a need exists in the art for the intended two nodes for confidential communications to use an ECDHE key exchange in a manner where the two nodes can be mutually authenticated and transfer or exchange public keys. A need exists in the art for the intended two nodes for confidential communications to use an ECDHE key exchange in a manner where the two nodes can be mutually authenticated without requiring the use of digital signature algorithms such as ECDSA or DSA.

Many applications or new standards such as TLS version 1.3, the embedded SIM standard from the GSMA and 5G network standards from the 3rd Generation Partnership Project (3GPP) implement ECDHE key exchanges in order to quickly establish confidentiality early in the communications between two nodes. As noted above, a traditional ECDHE key exchange establishes confidentiality without authentication, and authentication must be obtained through other means, such as using X.509 certificates with ECDSA or DSA. However, the use of X.509 certificates and ECDSA or DSA algorithms can have the private keys feasibly compromised for the recorded public keys in the certificate by sufficiently large quantum computers. Many standard schemes for authentication depend on a root certificate recorded by a device, where a received certificate for a server or node communicating with the device is verified using the root certificate. Since many IoT applications are designed to be used for decades, this creates a significant challenge and risk where the private key for the root certificate could be compromised by a quantum computer long before the root certificate expires.

As one example, the GSMA embedded SIM standard for consumer use has a root certificate for all embedded SIMs with a common name of “GSM Association—RSP2 Root CI1”. As of February 2019 the expiration date for this certificate is the year 2052. The key is 256 bits in length and uses the ECC curve P-256. As discussed above, there is a reasonable chance that a quantum computer could break this root certificate and root public key to derive the root signing key within the next 10 years. This means the root certificate (and entire authentication scheme) may become unusable ~20 years before the root certificate was planned to expire. Consequently, a need exists in the art for a secure and authenticated transfer of public keys to a device where (i) the public key is encrypted, and (ii) the authentication does not depend on a root certificate and supporting ECDSA or DSA algorithms.

Solutions have been proposed in the art for an authenticated Diffie-Hellman or elliptic curve Diffie-Hellman key exchange using ephemeral keys and static keys. Blake-Wilson et al in the paper “Key Agreement Protocols and their Security Analysis”, which is herein incorporated by reference, propose the use of both long-term static keys and short-term ephemeral keys with a DH key exchange in order to conduct the key exchange in an authenticated manner in order to address some needs in the art mentioned above. Likewise, the Internet Engineering Task Force (IETF) proposes the use of elliptic curve ephemeral and static PKI keys in the “Request for Comments” (RFC) 5753 document “Use of Elliptic Curve Cryptography (ECC) Algorithms in Cryptographic Message Syntax (CMS)”, which is also hereby incorporated by reference.

However, the methods described for Blake-Wilson, RFC 5753, and related systems depend on (a) the recipient/responder of an ephemeral ECC public key from a sender/initiator to (b) also to record or operate with the static private ECC key corresponding to the static public key recorded by the sender. This can reduce scalability of a system with (i) a plurality of senders/initiators and (ii) a plurality of recipients/responders receiving ephemeral ECC public keys for ECDHE key exchanges, since each recipient/responder also needs to record and operate on the static ECC private key corresponding to the static ECC public key recorded by the sender/initiator. The overall security of a system can be decreased for a system of potentially millions of devices and several servers, where the servers need to record server static private ECC keys corresponding to server static public ECC keys recorded by devices. A need exists in the art for (a) a recipient/responder to support authenticated ephemeral ECDH key exchanges without (b) the recipient/responder also recording the static ECC private key corresponding to the static ECC public key recorded by the sender/initiator.

In addition, the methods described for Blake-Wilson, RFC 5753, and related systems do not contemplate or describe how a node seeking to securely establish communication with a server could use multiple private keys and at least one public key in a single key exchange in order to derive a symmetric ciphering key. Likewise, conventional technology does not suggest how a server could use the corresponding multiple public keys for the multiple private keys in order to mutually derive the symmetric ciphering key. A need exists in the art for a device communicating with a server to use multiple private keys and at least one server public key in order to derive a symmetric ciphering key, where a public key for the device could be encrypted with the derived symmetric ciphering key.

Other proposed solutions contemplate (i) the use of both ECDHE key exchanges and (ii) pre-shared PKI key pairs between two nodes for conducting an ECDHE key exchange with mutual authentication. An example would be the draft IETF RFC document “ECDH-based Authentication using Pre-Shared Asymmetric Keypairs for (Datagram) Transport Layer Security ((D) TLS) Protocol version 1.2”, which is hereby incorporated by reference. Benefits of this and similar proposed systems is that mutual authentication and forward secrecy can be obtained. However, the system as presented requires both a client and a server to conduct multiple ECDH key exchanges and transmit multiple messages before mutually deriving a symmetric ciphering key. A need exists in the art for a client to conduct a single ECDH key exchange with multiple private keys, such that the client can send an encrypted public key in a mutually authenticated manner with an ephemeral public key. Conventional technology such as the RFC in this paragraph does not contemplate that the client can send both (i) an ephemeral client public key and (ii) an encrypted device public key in a single message in a manner that would be mutually authenticated.

Many other examples exist as well for needs in the art to conduct an ECDHE key exchange in a secure manner for the secure transfer or exchange of public keys, where the two nodes can also be mutually authenticated, and the above are examples are just a few and intended to be illustrative instead of limiting.

SUMMARY

Methods and systems are provided for a device and a network to securely exchange public keys using a server, where (i) the device receives a network public key from the server in an encrypted and authenticated manner, and (ii) the network receives the device public key from the server also in an encrypted and authenticated manner. The device and the server can record and operate a set of compatible values and algorithms for a key pair generation algorithm, an ECDH key exchange algorithm, a key derivation function, a symmetric ciphering algorithm, and a random number generator, and a set of cryptographic parameters. The device can comprise a computing device with a network interface to communicate with the server via an IP network. The device can be a computing device for "the Internet of Things", a mobile phone, a tracking device, a security system, a module, a WiFi client, a WiFi access point, a second server, or similar devices.

The device can also include a tamper resistant element (TRE), where the tamper resistant element operates as a primary platform (PP) with firmware, and the TRE with the PP can comprise a secure operating environment for PKI keys and cryptographic operations in support of an application running as a device program in the device. The server can be a computing device with a network interface to communicate with (i) the device via the IP network and (ii) the network via a private network. The device can record a domain name service (DNS) name or uniform resource locator (URL) for the server and/or the network. The network can record a network private key and a corresponding network public key with a set of parameters B. The server can record and operate a server database. The device can be one of a plurality of different devices communicating with the server.

Before distribution to an end user of the computing device, a device manufacturer or a device distributor or a device owner could record a set of data in nonvolatile memory for the device. In addition to regular operating data and programs for the device, such as an operating system and a transducer driver, the data recorded in device before distribution could include (i) a server static public key, (ii) a device static private key, (iii) a device static public key, (iv) a set of cryptographic parameters associated with the static public keys, (v) a device identity for the computing device, and (vi) a device public key with a corresponding device private key. For a first exemplary embodiment, the server static public key can be unique for the device and not shared with other devices. For a second exemplary embodiment, the server static public key can be shared across a set of devices and thus the server static public key would not be uniquely recorded in an individual device, but the sever static public key could be recorded in a set of devices.

After power up and/or connecting with the IP network, the device can use the random number generator, the cryptographic parameters, and the key pair generation algorithm to derive a device ephemeral private key and a device ephemeral public key. The device can conduct a first ECDHE key exchange using the device static private key, the device ephemeral private key, and the server static public key. The output from the first ECDHE key exchange can comprise a shared secret X3. The device can derive a first symmetric ciphering key using shared secret X3 and a key derivation function. The device can generate a first random number. The device can process a first ciphertext that contains the first random number and the device public key, where the first ciphertext is encrypted with the derived first symmetric ciphering key. The device can send the device ephemeral public key, the first ciphertext, identification information for the device, and the associated set of cryptographic parameters to the server in a first message using the recorded DNS name or a URL for the server.

The device can also optionally send a device identity or a secure hash value for the device static public key to the server in the first message, in order for the server to identify the device or set of devices. In some exemplary embodiments, the identity of the device and also the secure hash value can be omitted from the first message and the server identifies the group of devices by a particular IP address and port number and/or URL and/or DNS name used by the server and receiving data from devices. In other words, without identifying data for the device in the first message, (X) a subset of devices sending data to the server where the server uses a particular name, URL, or IP address and/or port number can be identified by (Y) the server receiving data from the devices using the IP address and port number and/or URL and/or DNS name.

The server can receive the first message and process the first message. The server can use the received or previously stored set of cryptographic parameters to conduct an ECC point validation step to verify that the received ECC public key comprises a point on a named curve specified by the set of cryptographic parameters. The server can also verify that the received set of cryptographic parameters is valid or acceptable, such as using an acceptable named curve and also supporting a sufficient level of security such as an exemplary 256 bit long keys. The server can use identification information for the device from the first message to select PKI keys for the device from a server database. The selected PKI keys can comprise a device static public key and a server static private key. The server can also select a network for use with communications and authentication with the device, and the first message could include an identity for the network. The server can also select a device identity from the server database using the identification information for the device, for embodiments where the identification information in the first message comprises other information than a device identity for the device. The server can also generate a second random number for subsequent use when communicating with the device.

The server can operate or be associated with a server database in order to record or store data for the server communicating with a plurality of different devices, such that different keys for different devices could be tracked by the server. In exemplary embodiments the first message is received with a random number generated by the device (in the first ciphertext) and also a source IP address and port number, and the server records the source IP address and port number for the first message in the server database. The server can conduct a first ECC point addition operation using the received device ephemeral public key and the selected device static public key to derive a point X0 using the set of cryptographic parameters. The server can record the name or URL for a network and communicate with the network through a private network. The server can establish a secure session with the network.

The server can conduct a second ECDHE key exchange using the set of cryptographic parameters, the derived point X0 and the selected server static private key in order to derive the point X3. The server can conduct a key derivation step with the point X3 in order to mutually derive the first symmetric ciphering key which was also previously derived by the device. The key derivation step used by the server can comprise input of the point X3 into the same key derivation function used by the device. The output of the key derivation function (KDF) in the key derivation step can comprise the mutually derived first symmetric ciphering key.

The server can then use a decryption step with the first symmetric ciphering key in order to read plaintext from the first ciphertext received in the first message from the device. The plaintext read can include the first random number generated by the device and the device public key. The successful decryption of the first ciphertext can indicate that the device is authenticated, since the server could only feasibly decrypt the ciphertext from the first message if the device conducted the first ECDHE key exchange with the device static private key which corresponds to the device static public key used by the server in the second ECDH key exchange. The server can forward the decrypted device public key to the network in a second message via the secure session. The network can receive and process the device public key. The network can send the server a network public key and a third random number for the device in a third message over the secure session.

The server can derive an ephemeral PKI key pair for the server using the set of cryptographic parameters. The server ephemeral PKI key pair can comprise a server ephemeral private key and a server ephemeral public key. The server can conduct a third ECDHE key exchange using the point X0 and the server ephemeral private key and the server static private key in order to derive a point X4. The server can conduct a key derivation step with the point X4 in order to mutually derive a second symmetric ciphering key K2. The server can encrypt using the second symmetric ciphering key K2 (*i*) the second random number generated by the server, (ii) the first random number received by the device, (iii) the third random number received from the network, and (iv) the network public key from the network. The encryption step used by the server can include encryption using the second mutually derived symmetric ciphering key K2. The output of the encryption step can comprise a second ciphertext. The server can send the device a fourth message, where the fourth message includes the server ephemeral public key and the second ciphertext.

The device can receive the fourth message from the server and take steps to process the message. The device can conduct a fourth ECDHE key exchange using the device static private key, the device ephemeral private key, the server static public key, and the server ephemeral public key received in the fourth message. The output from the third ECDHE key exchange can comprise the shared secret X4. The device can derive the second symmetric ciphering key K2 using shared secret X4 and a key derivation function. The device can decrypt the second ciphertext using the second symmetric ciphering key derived by the device using the fourth ECDHE key exchange. The device can read the plaintext from the second ciphertext, where the plaintext includes the network public key. The device can also confirm that the plaintext from the second ciphertext received in the fourth message includes the first random number.

Successful decryption of the second ciphertext and reading the first random number from the second ciphertext, where the first random number could be sent by the device in the first ciphertext, can confirm that the server is authenticated. In other words, the server could only feasibly successfully encrypt the second ciphertext if the server records and operate with both the server static private key and the server ephemeral private key. The plaintext from the second ciphertext received by the device can also include the response from the server in addition to the network public key.

In exemplary embodiments, the device can send a signal or a fifth message to the server proving the successful decryption of the second ciphertext (such as using a second random number from the second ciphertext), and in this manner the device can be further authenticated with the server. In exemplary embodiments using the steps above, the device and the network can exchange public keys through the server in an encrypted and authenticated manner, such that the public keys would not be exposed to potential attackers who could operate quantum computers with sufficient capacity to break an ECC based or RSA based public key. Further, the authentication does not depend on a ECDSA or Digital Signature Algorithm based authentication scheme with a root certificate, where again an attacker with a quantum computer could potentially break the public key for the root certificate to determine the private key.

The device can then securely use the network public key and the network can securely use the device public key. The device can either (i) encrypt a third symmetric ciphering key using a key encapsulation mechanism (KEM) and the network public key or (ii) conduct a key exchange using the device private key and the network public key in order to derive the third symmetric ciphering key. The device can encrypt device data and the third random number using the third symmetric ciphering key and send the network a sixth message with the encrypted device data and encrypted third random number. If a KEM is used, then the sixth message can include a ciphertext of the third symmetric ciphering key.

The network can either (i) decrypt the third symmetric ciphering key using the KEM and the network private key or (ii) conduct a key exchange using the network private key and the device public key in order to derive the third symmetric ciphering key. The network can decrypt the device data and the third random number using the third symmetric ciphering key.

The systems and methods described above can also be used with various implementations for the computing device and the server. A $5^{th}$ generation or $6^{th}$ generation wireless WAN network, such as based on standards from 3GPP, could utilize the steps above in order to conduct an ECDHE key exchange with mutual authentication and a network and securely exchange public keys. For this embodiment, the computing device could comprise a wireless device or wireless terminal, including a mobile phone or smart phone. The server could comprise a "g Node B" for "next generation node b", or gNb, which provides equivalent functionality of a base transceiver station and manages the radio-frequency communications with the wireless device. For the embodiment in this paragraph, the cryptographic parameters could comprise the values for curve 25519, although other ECC curves could be utilized as well.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 2*a* is a simplified message flow diagram illustrating an exemplary system with exemplary steps and messages sent and received by a device, a server, and a network, in accordance with exemplary embodiments;

FIG. 2*f* is an illustration of an exemplary server database, in accordance with exemplary embodiments;

FIG. 2*g* is an illustration of an exemplary set of cryptographic parameters, in accordance with exemplary embodiments;

FIG. 2*h* is an illustration of an exemplary network database, in accordance with exemplary embodiments;

DETAILED DESCRIPTION OF EXEMPLARY EMBODIMENTS OF THE INVENTION

FIG. 1*a*

Figure 1A:
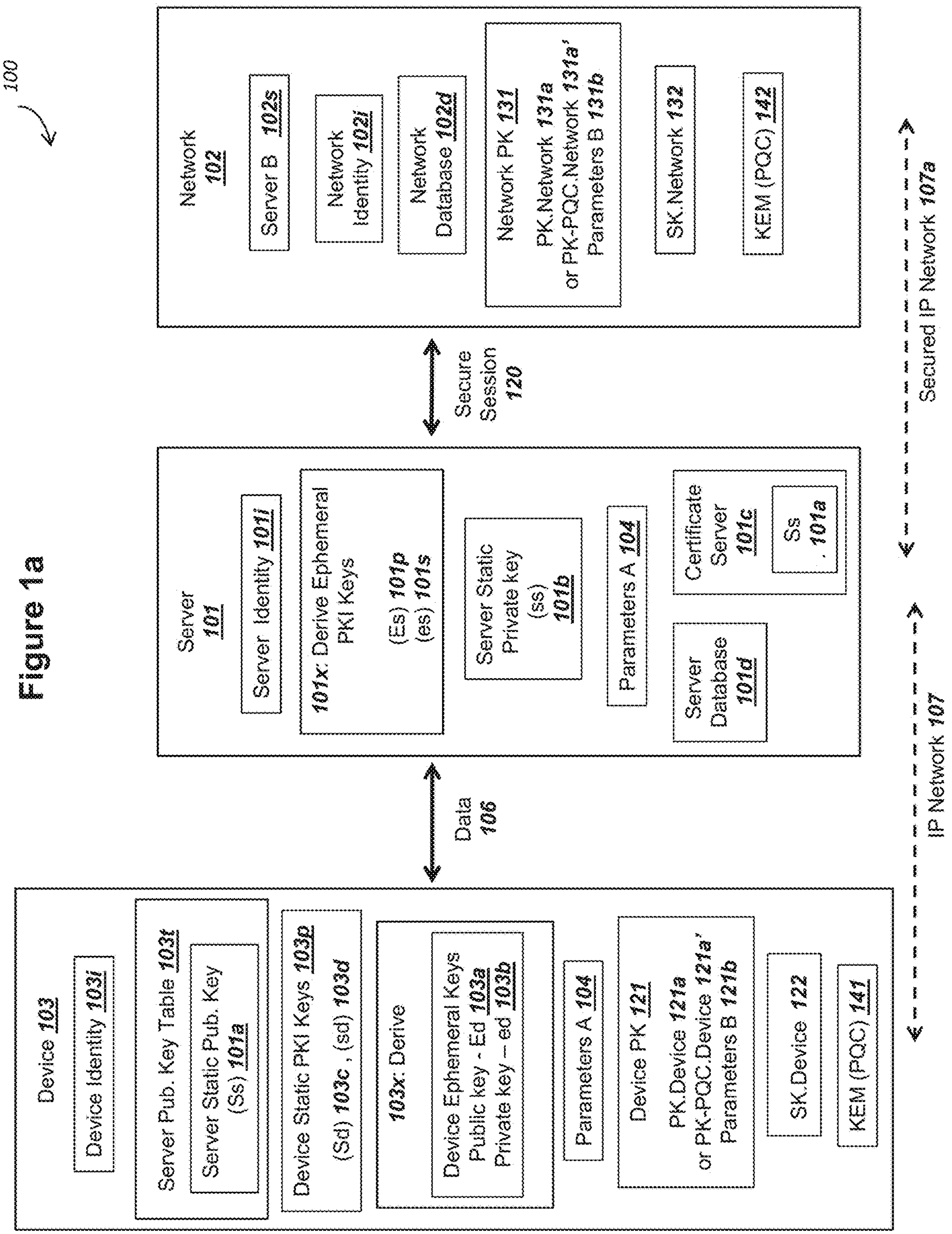
FIG. 1*a* is a graphical illustration of an exemplary system, where a device, a server, and a network store data and communicate, in accordance with exemplary embodiments.

FIG. 1*a* is a graphical illustration of an exemplary system, where a device, a server, and a network store data and communicate, in accordance with exemplary embodiments. The system 100 can include a server 101, a network 102, and a device 103, where (i) the device 103 communicates data 106 with the server 101, and (ii) the server 101 communicates with the network 102 via a secure session 120. The nodes can communicate over an Internet Protocol (IP) network 107, including a secured IP network 107*a*. Server 101 can comprise an individual server or a plurality of servers supporting communication such as data 106 with a plurality of devices 103. Network 102 can include a second server B 102*s* similar or equivalent to server 101, where server B 102*s* can comprise a plurality of different computers or computing processes operating in a coordinated manner. The exemplary servers shown as server 101 and server 102*s* in system 100 can be either different physical computers such as rack-mounted servers, or different logical or virtual servers or instances operating in a "cloud" configuration. Or, server 101 and server 102*s* could represent different logical "server-side" processes connected to an IP network 107, including different programs running on a server that listen and communicate using different IP port numbers within one physical server. In other words, although server 101 is depicted in FIG. 1*a* as operating outside of network 102, in some embodiments server 101 could be a server operating within a network 102.

In exemplary embodiments, server 101 and server B 102*s* can operate using the physical electrical components depicted and described for a server 101 in FIG. 1*c* below. Other possibilities exist as well for the physical embodiment of server 101 and server B 102*s* without departing from the scope of the present invention, including exemplary embodiments depicted and described in connection with FIG. 6*a* through FIG. 6*c* below. In exemplary embodiments, server 101 can be described as a "first server" and server 102*s* can be described as a "second server". The combination of a first server 101 and a second server 102*s* can also comprise a "set of servers".

Server 101 and server 102*s* could also be associated with different networks than a network 102 and communicate in a secure manner. A secure session 120 between Server 101 and network 102 with Server B 102*s* could be established over IP network 107 using methods including a physical wired connection via a local area network (LAN), transport layer security (TLS), a virtual private network (VPN), and IP Security (IPSEC), a secure shell (SSH) tunnel, and other possibilities exist as well. The use of a secure session 120 between Server 101 and network 102 could be over a secure IP network 107*a*, including the use of firewalls to restrict traffic from an IP network 107 (such as the public Internet). Server 101 and Server B 102*s* could communicate over a secure IP network 107*a*, where the secure IP network 107*a* could (i) comprise a private network, and/or (ii) be established using the methods for a secure session in the previous sentence.

Device 103 can be a computing device for sending and receiving data. Device 103 can take several different embodiments, such as a general purpose personal computer, a mobile phone based on the Android® from Google® or the IOS operating system from Apple®, a tablet, a device with a sensor or actuator for the "Internet of Things", a module for "machine to machine" communications, a device that connects to a wireless or wired Local Area Network (LAN), an initiator according to the Device Provisioning Protocol specification (DPP) from the WiFi alliance, a router, and/or a server, and other possibilities exist as well without departing from the scope of the present invention. Exemplary electrical components within a device 103 can be similar to the electrical components for a Server 101 depicted and described in FIG. 1*b* below, where device 103 can use electrical components with smaller capacities and lower overall power consumption, compared to the capacity and power consumption for the same electrical components in a Server 101.

Device 103 can include a device identity 103*i*, which could comprise a string or number to uniquely identify device 103 with network 102 and/or Server 101 and Server B 102*s*. Device identity 103*i* could comprise a medium access control (MAC) address for a physical interface such as Ethernet or WiFi, a Subscription Permanent Identifier (SUPI) with 5G networks, an international mobile subscriber identity (IMSI) or international mobile equipment identity (IMEI) with 2G/3G/4G networks, and other possibilities exist as well without departing from the scope of the present invention. In exemplary embodiments, device identity 103*i* can be written to hardware in device 103 and operate as a unique, long-term identity for device 103.

Device 103 can record at least one elliptic curve cryptography (ECC) static public key for Server 101 comprising server static public key Ss 101*a*. Server static public key Ss 101*a* could be recorded in nonvolatile or volatile memory within device 103. For embodiments where keys 101*a* are recorded in nonvolatile memory, keys 101*a* could be recorded by a device manufacturer or device distributor. Or, key 102*a* could be recorded by a device owner before device 103 connects with Server 101, and at least one server static public key Ss 101*a* could be recorded by a device distributor or device manufacturer. Other possibilities exist as well for the source and secure recording of keys 101*a* without departing from the scope of the present invention.

As contemplated in the present invention, the use of a capital letter as the first character for a PKI key can represent a public key, the use of a lower case letter as the first character for a PKI key can represent a private key. The use of a character "S" or "s" for the first character in a key can represent a static key and the use of a character "E" or "e" for the first character can represent an ephemeral key. In some embodiments, an ephemeral key can be referred to as a protocol key or a temporary key. As contemplated in the present invention, the second letter for a PKI key can represent the entity the key is associated with or belongs to (e.g. "d" for device 103 and "s" for Server 101). Thus, using the notation described in the previous three sentences, the corresponding private key for server static public key Ss 101*a* can comprise server static private key ss 101*b*. Likewise, a key "es" would represent an ephemeral private key for a server, while key "Es" would represent an ephemeral public key for a server. Similarly, "Ed" would represent an ephemeral public key for a device 103 and "sd" would represent a static private key for a device 103, etc.

For embodiments where keys 101*a* are recorded in volatile memory, device 103 could obtain keys 101*a* from a different server than Server 101 before communicating data 106, such as device 103 obtaining keys 101*a* via a secure session from a different server before sending data 106. For embodiments that support post-quantum cryptography, then the secure session for obtaining keys 101*a* before sending data 106 could also preferably support post-quantum cryptography (e.g. the secure session for obtaining keys 101*a* not be based on classical cryptography algorithms as described above). A device 103 can record a plurality of different server static public keys Ss 101*a* in a Server Public Key Table 103*t*. Different keys 101*a* in a table 103*t* could be associated with different servers 101 that device 103 communicates with over time. Or (i) a first set of keys 101*a* could be used with a first set of severs 101, and (ii) a second, different set of keys 101*a* in a table 103*t* could be used as a backup or failover second set of keys 101*a* for the set of servers 101, and (iii) a third set of keys 101*a* could be used with a second set of servers 101. Exemplary data for a Server Public Key Table 103*t* for device 103 is depicted and described in connection with FIG. 1*d* below. The different keys 101*a* can be associated with network names and/or Uniform Resource Locators (URLs) or domain names, such that device 103 can select the server static public key Ss 101*a* based on a URL or domain name where device 103 will send data 106 or a message 510 in FIG. 5*a* below.

A server static public key Ss 101*a* can be obtained by device 103 before conducting an elliptic curve Diffie-Hellman (ECDH) key exchange or an ephemeral elliptic curve Diffie-Hellman (ECHDE) key exchange. A server static public key Ss 101*a* could be obtained by device 103 in several different ways. Server static public key 101*a* could be written into memory or a hardware address by a manufacturer, distributor, or owner of device 103 before device 103 connects with Server 101. Keys 101*a* could be received by device 103 over an IP network 107 via a secured session, such as a TLS, IPSec, or VPN connection before sending data 106 to Server 101. In exemplary embodiments, server static public key 101*a* are recorded in device 103 in a secured and authenticated manner, such that device 103 can trust server static public key Ss 101*a*.

As one exemplary embodiment, different server static public keys Ss 101*a* could be public keys within different certificates, where the public keys 101*a* are signed by a certificate authority. Although not depicted in FIG. 1*a*, device 103 could also record a certificate authority root certificate, and device 103 could (a) verify the signature of a certificate authority in a certificate for the public key 101*a* using (b) the recoded root certificate for the certificate authority (and any intermediary parent certificates). A server static public key 101*a* could be processed or formatted according to a set of cryptographic parameters A 104, and a server static public key 101*a* could also be compatible with parameters A 104. Note that if server static public keys Ss 101*a* are received from a trusted source such as a device 103 manufacturer or in a trusted manner, then a certificate for the server static public key Ss 101*a* could be optionally omitted or optionally not used by device 103.

Although public keys 101*a* and other static public keys are described as "static" herein, the keys could change relatively slowly over time such as with the expiration of a validity date when recorded in a certificate. A public key Ss 101*a* could remain static over the period of time for device 103 to conduct at least two separate ECDHE key exchanges, where one ECDHE key exchange uses an ephemeral or derived ECC PKI keys for device 103, such as a key exchange step 206 below. Public keys Ss 101*a* could comprise a long-term public key for use by device 103 when communicating with servers 101. Although the use of a certificate for public keys 101*a* is described in the paragraph above for public keys 101*a*, the use of a certificate is not required.

Cryptographic parameters A 104 can specify values or settings for (i) conducting an ECDH or ECDHE key exchange, (ii) mutually deriving a symmetric ciphering key, (iii) using a symmetric ciphering algorithm, (iv) calculating a secure hash, and (v) conducting a point validation for a received ECC point. As contemplated herein, cryptographic parameters A 104 may also be referred to as parameters A 104. Each of device 103 and Server 101 can record at least one compatible subset of parameters within a set of cryptographic parameters A 104. Parameters A 104 can specify values for an elliptic curve cryptography (ECC) curve name, key length, key formatting (e.g. compressed or uncompressed), encoding rules, etc. As contemplated herein, the parameters A 104 and cryptographic algorithms used with ECC PKI keys and a key exchange in the present invention can be compatible and substantially conform with ECC algorithms and keys as specified in (i) the IETF Request for Comments (RFC) 6090 titled "Fundamental Elliptic Curve Cryptography Algorithms", and (ii) IETF RFC 5915 titled "Elliptic Curve Private Key Structure", and also subsequent and related versions of these standards. Other possibilities exist as well for cryptographic parameters A 104 without departing from the scope of the present invention.

For use of ECC algorithms, parameters A 104 can specify elliptic curve names such as, but not limited to NIST P-256, sect283k1, sect283r1, sect409k1, sect409r1, and other possibilities exist as well. Further, elliptic curves that do not depend on curves currently specified by the National Institute of Standards and Technology (NIST) could be utilized as well, such as, but not limited to, Curve22519, curve448, or FourQ. Parameters A 104 can specify domain parameters for nodes in system 100 to calculate values or numbers in a compatible manner, such as common base point G for use with ECC PKI key pairs and a defining equation for an elliptic curve. An exemplary set of cryptographic parameters A 104 is depicted and described in connection with FIG. 2*g* below.

Device 103 can also record a device static PKI key pair 103*p* in nonvolatile memory or within a secure processing environment or tamper resistant element (TRE) within device 103. The key pair 103*p* can be either (i) generated by device 103 during device manufacturing or device distribution, or (ii) generated externally from device 103 and written to device 103 in a secure manner during device manufacturing or device distribution. The PKI key pair 103*p* can comprise a device static private key sd 103*d* and a device static public key Sd 103*c*. The keys sd 103*d* and Sd 103*c* could be formatted and compatible with a selected subset of cryptographic parameters A 104*a* from set of cryptographic parameters A 104. In exemplary embodiments, public key Sd 103*c* can be recorded in an X.509 certificate from a certificate authority. In some embodiments, device 103 could renew static key Sd 103*c* and sd 103*d*, or possibly record a plurality of the values upon manufacturing or distribution. Device 103 could switch from using a first pair of static device PKI keys to a second pair of static device PKI keys over time. In addition, a first pair of device static PKI keys could be associated with a first set of cryptographic parameters A 104*a* and a second pair of static PKI keys (e.g. key 103*c* and key 103*d*) could be associated with a second set of cryptographic parameters A 104*a*.

Device 103 can include an ECC key pair generation algorithm 103*x* and Server 101 can include a compatible ECC key pair generation algorithm 101*x*. A key pair generation algorithm 103*x* or 101*x* can use (i) a random number generator in order to derive the ephemeral PKI private key and (ii) a selected set of cryptographic parameters A 104 in order to calculate the ephemeral PKI public key. In exemplary embodiments, a random number for the ephemeral PKI private key multiplies the base point G from the curve specified by the parameters A 104 in order to obtain the corresponding ephemeral PKI public key. Other possibilities exist as well for the algorithms 103*x* and 101*x* to derive an ephemeral ECC PKI key pair without departing from the scope of the present invention. A key pair generation algorithm 103*x* for device 103 can output an ephemeral ECC PKI pair comprising device ephemeral public key Ed 103*a* and device ephemeral private key ed 103*b*. A key pair generation algorithm 101*x* for Server 101 can output an ephemeral ECC PKI pair comprising server ephemeral public key Es 101*p* and server ephemeral private key es 101*s*.

Device 103 can also record or store a set of data for a device public key 121. The set of data for a device public key 121 can include (i) a public key PK.Device 121*a* or (ii) a public key for post-quantum cryptography of PK-PQC.Device 121*a'*, and also a set of cryptographic parameters B 121*b* associated with the public key. In exemplary embodiments, the set of data for a device public key 121 can be used or associated with a network 102 and use a different set of cryptographic parameters B 121*b* than a set of cryptographic parameters A 104, which could be used by device 103 with a Server 101. In this manner, the set of data for a device public key 121 could support different cryptographic algorithms with network 102 than both (i) a set of cryptographic algorithms for Server 101 and (ii) PKI keys supporting the set of cryptographic parameters A 104, such as server static public key Ss 101*a*, device static public key Sd 103*c*, device ephemeral public key Ed 103*a*, etc.

In other words, (A) PKI keys for device 103 used with Server 101 could use a first set of cryptographic algorithms and cryptographic parameters A 104 (such as keys, algorithms, and parameters based on ECC algorithms), and (B) PKI keys for device 103 used with network 102 could use a second set of cryptographic algorithms and cryptographic parameters B 121*b* (such as keys, algorithms, and parameters supporting post-quantum cryptography). Or, the PKI keys for device 103 and network 102 used for communicating between device 103 and network 102 could also support classical cryptography (such as ECC, ECDH, ECDSA, RSA, DH, etc.), and cryptographic parameters B 121*b* could specify parameters for classical cryptography and not post-quantum cryptography.

In general, as contemplated herein, keys, algorithms, and parameters supporting post-quantum cryptography are not based on (i) the integer factorization problem, (ii) the discrete logarithm problem, or (iii) the elliptic curve discrete logarithm problem. In general, as contemplated herein, keys, algorithms, and parameters supporting post-quantum cryptography can be based on any of (i) lattice based algorithms, such as learning with errors, (ii) code based algorithms such as classic McEliece, and (iii) ECC algorithms that based on Supersingular Elliptic Curve Isogeny, and other possibilities exist as well without departing from the scope of the present invention.

Device 103 can also store or record a private key corresponding to either (i) the public key PK.Device 121*a* or (ii) the public key PK-PQC.Device 121*a*', and the private key can comprise a private key SK.Device 122. Device 103 can include a key exchange algorithm or a key encapsulation mechanism, and the key exchange mechanism or key exchange algorithm can support post-quantum cryptography. FIG. 1*a* depicts the key exchange mechanism or key exchange algorithm as KEM (PQC) 141. The depiction of "(PQC)" for KEM (PQC) 141 is used to show that support for post-quantum cryptography for the KEM is optional, and an algorithm for KEM (PQC) 141 could support classical algorithms (such as based on the elliptic curve discrete logarithm problem or the integer factorization problem). Additional details regarding a KEM (PQC) 141 are depicted and described in connection with FIG. 5*b* and FIG. 5*c* below.

As depicted in FIG. 1*a*, Server 101 can include a server identity 101*i*, a key pair generation algorithm 101*x*, a set of cryptographic parameters A 104, a server database 101*d*, a server certificate 101*c*, and at least one server static private key ss 101*b*. Server identity 101*i* can comprise a name or number to uniquely identify Server 101 in IP network 107 and/or secure IP network 107*a*. In exemplary embodiments, server identity 101*i* can comprise or include a domain name service (DNS) name, which could comprise a string of characters and/or numbers. Server identity 101*i* could also comprise a Uniform Resource Locator (URL). Server identity 101*i* could be associated with an IP address, such that the exemplary data 106 from device 103 could be routed to Server 101 via the IP network 107. Server identity 101*i* could also comprise a MAC address, and a server identity 101*i* could comprise multiple different values such as all of a MAC address, a DNS name, and virtual instance identity if Server 101 operates as a virtual server. In summary, server identity 101*i* can allow (a) a plurality of different devices 103 to (b) select and route data 106 to Server 101 from a potential plurality of different servers and nodes. Other possibilities exist as well for the format, structure, or value for a server identity 101*i* without departing from the scope of the present invention.

The set of cryptographic parameters A 104 for Server 101 can be equivalent to or a superset of the cryptographic parameters A 104 used by device 103. The description above for a set of parameters A 104 used by a device 103 is also applicable to a set of parameters A 104 used by a Server 101. A set of cryptographic parameters A 104 and a subset of cryptographic parameters A 104*a* are depicted and described in connection with FIG. 2*h* below. In exemplary embodiments, a subset of parameters A 104*a* used by both Server 101 and device 103 can be fully compatible, such as using the same ECC named curve, key lengths, encoding rules, etc.

Server database 101*d* for Server 101 can comprise a database or memory recording or storing (i) data for Server 101 to communicate with both a plurality of devices 103 and also (ii) at least one server static private key ss 101*b*. An exemplary server database 101*d* is depicted and described in connection with FIG. 2*f* below. Server database 101*d* can record values for PKI keys, derived shared secrets, derived symmetric ciphering keys, random numbers used in secure sessions, and related values in order to support the communications with both device 103 and server 101, as well as a plurality of different devices 103. Server certificate 101*c* can comprise a certificate formatted according to the X.509 family of standards and include a server static public key Ss 101*a*. Server certificate 101*c* can include a signature from a certificate authority for server public key Ss 101*a*. As depicted in FIG. 1*a*, Server 101 can also record and operate with a private key corresponding to public key Ss 101*a*, where the server static private key ss 101*b* can is depicted in FIG. 1*a*. Note that a Server 101 could operate with a plurality of different pairs of PKI keys comprising public key Ss 101*a* and private key ss 101*b* in order to support communications with a plurality of different devices 103. The use of different values for keys Ss 101*a* and ss 101*b* with different devices 103 is depicted and described in connection with FIG. 2*f* below, such as a first pair 101*a*-1, 101*b*-1 with a first device identity 103*i*-1 and a second pair 101*a*-3, 101*b*-3 with a second device identity 103*i*-3. Note that the use of a certificate 101*c* with server static public key can be omitted, and both device 103 and server 101 could use a server static public key Ss 101*a* without a certificate 101*c*. Or, server 101 could use and store some server static public keys Ss 101*a* with certificates 101*c* and other server static public keys Ss 101*a* without certificates 101*c*.

As depicted in FIG. 1*a*, network 102 can include (i) at least one Server B 102*s* and (ii) a network identity 102*i*, a network database 102*d*, at least one network public key 131, a corresponding network private key 132, and a key exchange/encapsulation mechanism (KEM) 142. Note that the key exchange/encapsulation mechanism (KEM) can support t post-quantum cryptography if the corresponding PKI keys also comprise post-quantum cryptography keys and the KEM supports post-quantum cryptography algorithms.

Network 102 can also record a set of data for at least one network public key 131. The set of data for a network public key 131 can comprise (i) a public key PK.Network 131*a* or (ii) a public key for post-quantum cryptography of PK-PQC.Network 131*a*', and also a set of cryptographic parameters B 131*b* associated with the public key. In exemplary embodiments, the set of data for a network public key 131 can be used or associated with a device 103 and use a set of cryptographic parameters B 131*b*. The set of cryptographic parameters B 131*b* can be associated with the cryptographic algorithms used for processing or conducting computations using the network public key 131. Network 102 can also store or record at least one network private key of SK.Network 132, where the network private key SK.Network 132 corresponds to the network public key 131 and also can be used with the set of parameters B 131*b*.

Network identity 102*i* can comprise a name or number to uniquely identify network 102 in IP network 107 and/or secure IP network 107*a*. Network identity 102*i* can be similar to server identity 101*i*, except using a different value, name, or number in order to uniquely identify network 102 and/or Server B 102*s*. The set of cryptographic parameters B 131*b* for network 102 can be equivalent to or a superset of the cryptographic parameters B 121*b* used by device 103 and parameters B 121*b* was also described above for device 103. In addition, for some exemplary embodiments, parameters B 131*b* could be equivalent or compatible for parameters A 104, such as if network public key PK.Network 131*b* is used with ECC algorithms and/or ECDH key exchanges, and for these embodiments then PK-PQC.Network 131*b*' could be omitted. For the embodiments where network public key PK.Network 131*b* is used with ECC algorithms and/or ECDH key exchanges, then parameters B 121*b* for device 103 could also specify values and settings for ECC algorithms and/or ECDH key exchanges.

Network database 102*d* can be similar to server database 101*d* depicted in FIG. 2*f*, except that network database 102*d* can record and store values and data calculated by network 102. Network database 102*d* can record and store values for PKI keys, derived shared secrets, and related values in order to support the communications between network 102 and (i) Server 101 and (ii) device 103. As depicted in FIG. 2*h* below, network database 102*d* can record sets of data for different devices 103, where each set can comprise a row in a table with a device identity 103*i*, parameters B 121*b*, the device public key PK.Device 121*a*, the network public key value PK.Network 131*a*, and the network private key SK.Network 132, a random number random3 216*a*, and values for a key exchange X5 and a symmetric ciphering key K3 506*a*. Other possibilities exist as well for the data stored or recorded in a network database 102*d* without departing from the scope of the present invention.

Network 102 can record at least one network private key SK.Network 132, which can be the private key corresponding to the network public key PK.Network 131*a* recorded by a set of devices 103 and described above for device 103. In exemplary embodiments and as depicted in FIG. 2*a* below, network 102 may not send or transmit network public key PK.Network 131*a* to device 103 directly, but rather can preferably transfer the network public key PK.Network 131*a* to device 103 through Server 101. In this manner, device 103 can receive network public key PK.Network 131*a* via an encrypted and authenticated manner, which could also be resistant to quantum computers that could solve classical cryptographic "hard" algorithms (such as elliptic curve Diffie Hellman) in polynomial time instead of exponential time.

Although not depicted in FIG. 1*a*, a network 102 could operate a firewall in order to prevent packets or data from the public Internet (other than Server 101) from reaching network 102. In this manner by isolating network 102 from IP network 107, security for the network 102 and the network public key PK.Network 131*a* can be enhanced, since only authenticated and authorized nodes within network 102 and connected to secure IP network 107*a* could communicate with network 102 and receive the network public key PK.Network 131*a*. In exemplary embodiments, network 102 may only transmit the network public key PK.Network 131*a* and/or receive the device public key PK.Device 121*a* via a secure IP network 107*a*. In exemplary embodiments, the network public key 131 can include both a numeric value for PK.Network 131*a* and the set of parameters B 131*b* associated with the PK. Network 131*a*. Parameters B 131*b* could provide settings and values associated with the PK. Network 131*a* similar to the parameters A 104 in FIG. 2*g* below (but using values for a different cryptographic scheme such as lattice-based, code-based, etc.)

Network 102 can also store or record a private key corresponding to either (i) the public key PK.Network 131*a* or (ii) the public key PK-PQC.Network 131*a*', and the private key can comprise a private key SK.Network 132. Network 102 can include a key exchange algorithm or a key encapsulation mechanism, and the key exchange mechanism or key exchange algorithm can support post-quantum cryptography. FIG. 1*a* depicts the key exchange mechanism or key exchange algorithm for network 102 as KEM (PQC) 142. The depiction of "(PQC)" for KEM (PQC) 142 is used to show that support for post-quantum cryptography for the KEM is optional, and an algorithm for KEM (PQC) 142 could support classical algorithms (such as based on the elliptic curve discrete logarithm problem). Additional details regarding a KEM (PQC) 142 are depicted and described in connection with FIG. 5*c* below.

IP network 107 could be either a Local Area Network (LAN) or a Wide Area Network (WAN), or potentially a combination of both. IP network 107 could include data links supporting either IEEE 802.11 (WiFi) standards. Device 103 also utilize a variety of WAN wireless technologies to communicate data 106 with Server 101, including Low Power Wide Area (LPWA) technology, 3rd Generation Partnership Project (3GPP) technology such as, but not limited to, 3G, 4G Long-Term Evolution (LTE), or 4G LTE Advanced, NarrowBand—Internet of Things (NB-IoT), LTE Cat M, proposed 5G networks, and other examples exist as well. Server 101 can connect to the IP network 107 via a wired connection such as, but not limited to, an Ethernet, a fiber optic, or a Universal Serial Bus (USB) connection (not shown). IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPV6 or IPv4. A public IP network 107 could utilize globally routable IP addresses. Secure IP network 107*a* could utilize private IP addresses which could also be referred to as an Intranet. Other possibilities for IP Network 107 and Private Network 107*a* exist as well without departing from the scope of the invention.

FIG. 1*b*

Figure 1B:
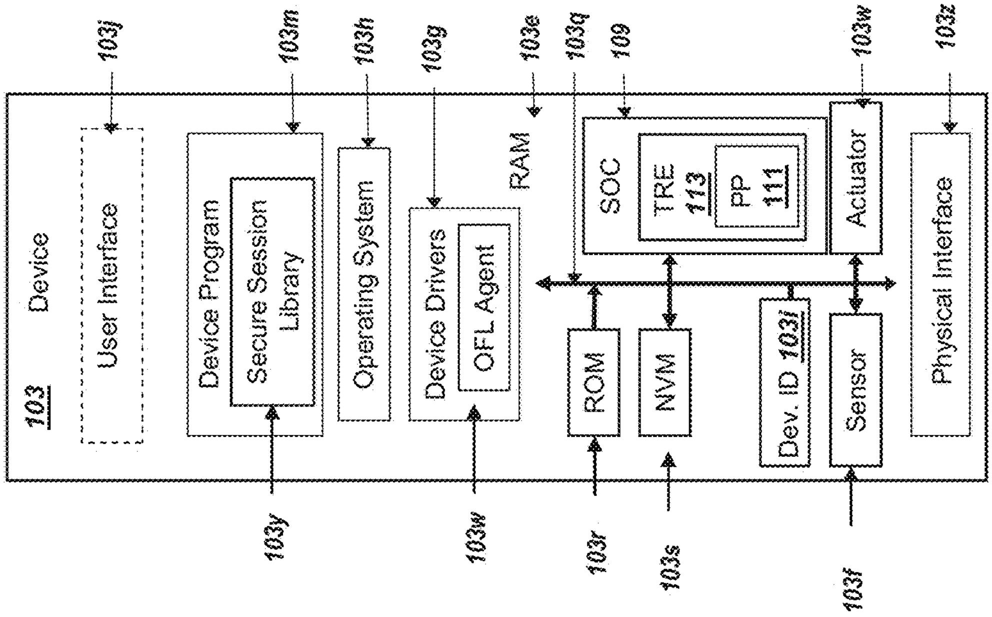
FIG. 1*b* is a graphical illustration of hardware, firmware, and software components for a device, including a tamper resistant element with a primary platform, in accordance with exemplary embodiments.

FIG. 1*b* is a graphical illustration of hardware, firmware, and software components for a device, including a tamper resistant element with a primary platform, in accordance with exemplary embodiments. FIG. 1*b* is illustrated to include many components that can be common within a device 103, and device 103 may also operate in a wireless configuration in order to connect with a wireless network. In a wireless configuration, the physical interface 103*z* of device 103 may support radio-frequency (RF) communications with networks including a wireless network via standards such as GSM, UMTS, mobile WiMax, CDMA, LTE, LTE Advanced, 5G, and/or other mobile-network technologies. In a wireless configuration, the physical interface 103*z* may also provide connectivity to local networks such as 802.11 WLAN, Bluetooth, Zigbee, or an IEEE 802.15.4 network, among other possibilities. In a wireless configuration, device 103 could use a physical interface 103*z* connected with both a wireless WAN and wireless LAN simultaneously. In a wired configuration, the physical interface 103*z* can provide connectivity to a wired network such as through an Ethernet connection or USB connection or fiber-optic connection, etc.

The physical interface 103*z* can include associated hardware to provide connections to components such as radio-frequency (RF) chipsets, a power amplifier, an antenna, cable connectors, RF filters, etc. Device drivers 103*g* can communicate with the physical interfaces 103*z*, providing hardware access to higher-level functions on device 103. Device drivers 103*g* may also be embedded into hardware or combined with the physical interfaces. Device drivers 103*g* can include an open firmware loader (OFL) agent 103*w*, which can be utilized by a device 103 and operating system 103*h* in order to read and write data to TRE 113, including communicating with a primary platform 111 within TRE 113. Device 103 may preferably include an operating system 103*h* to manage device drivers 103*g* and hardware resources within device 103. The operating systems described herein can also manage other resources such as memory and may support multiple software programs or software libraries operating on device 103, including applications that communicate with a primary platform 111 through a device driver 103*g*.

The operating system 103*h* can include Internet protocol stacks such as a User Datagram Protocol (UDP) stack, Transmission Control Protocol (TCP) stack, a domain name system (DNS) stack, etc., and the operating system 103*h* may include timers and schedulers for managing the access of software to hardware resources, including TRE 113. The operating system shown of 103*h* can be appropriate for a low-power device with limited memory and CPU resources (compared to a server 103). Example operating systems 103*h* for a device 103 includes Linux, Android® from Google®, IoS from Apple®, Windows® Mobile, or Open AT® from Sierra Wireless®. Additional example operating systems 103*h* for device 103 include Fuchsia, eCos, uC/OS, LiteOs, Contiki, OpenWRT, Raspbian, and other possibilities exist as well without departing from the scope of the present invention.

A device program 103*m* may be an application programmed in a language such as, but not limited to, C, C++, Java, and/or Python, and could provide functionality to support M2M applications such as remote monitoring of sensors and remote activation of actuators. A device program 103*m* could also comprise an application for a mobile phone, table, personal computer, or the like. Device program 103*m* could also be a software routine, subroutine, linked library, or software device, according to one preferred embodiment. As contemplated herein, a device program 103*m* may be an application operating within a smartphone, such as an iPhone® or Android®-based smartphone, and in this case device 103 could comprise the smartphone. The application functioning as a device program 103*m* could be downloaded from an "app store" associated with the smartphone. Device program 103*m* can include secure session library 103*y*, which can provide the functionality or "System on a Chip" (SOC) 109 instructions for conducting the steps and communication depicted and described in connection with FIG. 2*a*.

Many of the logical steps for operation of device 103 can be performed in software and hardware by various combinations of sensor 103*f*, actuator 103*w*, physical interface 103*z*, device driver 103*g*, operating system 103*h*, device program 103*m*, and SOC 109. Note that device 103 may also optionally include user interface 103*j* which may include one or more devices for receiving inputs and/or one or more devices for conveying outputs. User interfaces are known in the art for devices 103 and could include a few LED lights or LCD display or OLED display, and thus user interfaces are not described in detail here. User interface 103*j* could comprise a touch screen if device 103 operates as a smartphone or mobile phone. As illustrated in FIG. 1*b*, device 103 can optionally omit a user interface 103*j*, since no user input may be required for many M2M applications, although a user interface 103*j* could be included with device 103.

Device 103 may be a computing device or wireless device that includes computer components for the purposes of collecting data from a sensor 103*f* or triggering an action by an actuator 103*w*. Device 103 may include a central processing unit (CPU) within SOC 109, a random access memory (RAM) 103*e*, and a system bus 103*q* that couples various system components including the random access memory 103*e* to the processing unit 103*b*. The system bus 103*q* may be any of several types of bus structures including a memory bus or memory controller, a peripheral bus, and a local bus using any of a variety of bus architectures including a data bus.

Device 103 may include a read-only memory (ROM) 103*r* which can contain a boot loader program. Although ROM 103*r* is illustrated as "read-only memory", ROM 103*r* could comprise long-term memory storage chipsets or physical units that are designed primarily for writing once and reading many times, such as Electrically Erasable Programmable Read-Only Memory (EEPROM). As contemplated within the present invention, a read-only address could comprise an address within a read only memory such as a ROM 103*r* memory address or another hardware address for read-only operations accessible via bus 103*q*. Changing data recorded in a ROM 103*r* can require a technician have physical access to device 103, such as removing a cover or part of an enclosure, where the technician can subsequently connect equipment to a circuit board in device 103, including replacing ROM 103*r*. ROM 103*r* could also comprise a nonvolatile memory, such that data is stored within ROM 103*r* even if no electrical power is provided to ROM 103*r*.

Device 103 can include a SOC 109 and SOC 109 can include a processor for device 103. SOC 109 can include TRE 113. Although TRE 113 is depicted in FIG. 1*b* as operating within SOC 109, TRE 113 could be operated within a removable unit such as an SD card, a SIM card, etc. Or TRE 113 could operate within a separate soldered chip connected to bus 103*q*. An exemplary removable form factor for TRE 113 could comprise a standard SD card, a mini SD card, a micro SD card, a mini UICC, a micro UICC, or a nano UICC, and other possibilities exist as well without departing from the scope of the present invention. SOC 109 can include electrical contacts which provide electrical connectivity to bus 103*q*.

SOC 109 can include NAND or NOR flash memory in order to record data when device 103 is not powered, and other nonvolatile memory technologies can be used in a storage unit as well without departing from the scope of the present invention. SOC 109 can be separately manufactured from device 103 and accessed and loaded with data before insertion into device 103. SOC 109 could also operate as an "embedded" unit, such that storage unit comprises an integrated circuit soldered to a circuit board in device 103, and in these embodiments SOC 109 can be fixed and not removable.

TRE 113 within SOC 109 can include a processor, bus, and memory similar (but with less power and on a smaller scale) as the CPU 103*b*, bus 103*q*, and ROM 103*r*. TRE 113 can perform cryptographic functions using either boot firmware or downloaded firmware such as (i) internally deriving a private key in a cryptographically secure manner, (ii) recording the private key in a protected memory such that device 103 or external parties cannot feasibly or cost-effectively read the derived private key, and (ii) conducting key exchanges and/or encryption/decryption and/or process digital signatures.

Although the exemplary environment described herein employs ROM 103*r*, RAM 103*e*, and nonvolatile memory (NVM) 103*s*, it should be appreciated by those skilled in the art that TRE 113 could also operate within other types of computer readable media which can store data that is accessible by a device 103, such as memory cards, subscriber identity device (SIM) cards, local miniaturized hard disks, and the like, which may also be used in the exemplary operating environment without departing from the scope of the invention. The memory and associated hardware illustrated in FIG. 1*b* provide nonvolatile storage of computer-executable instructions, data structures, program devices, device program 103*m*, device drivers 103*g*, and other data for computer or device 103. Note the device 103 may include a physical data connection at the physical interface 103*z* such as a miniaturized universal serial bus adapter, firewire, optical, or other another port and the computer executable instructions such as device program 103*m*, operating system 103*h*, or device driver 103*g* can be initially loaded into memory such as ROM 103*r* or NVM 103*s* through the physical interface 103*z* before device 103 is given to an end user, shipped by a manufacturer to a distribution channel, or installed by a technician.

Further, device program 103*m*, operating system 103*h*, or device driver 103*g* can be separately loaded into NVM 103*s* before or after distribution of device 103. In some exemplary embodiments, applications or programs operating within device 103 can be given limited or restricted access to TRE 113 in order to support the applications or programs. For example, a mobile payment application operating a device program 103*m* could authenticate either device 103 or a user with keys recorded in TRE 113. TRE 113 could record the PKI keys for device 103 depicted in FIG. 1*a*, such as Ss 101*a*, sd 103*d*, device public key 121, device private key SK.Device 132, parameters A 104, parameters B 121*b*, etc. Device program 103*m* could provide a graphical user interface (GUI) to a user through user interface 101*j*. Other possibilities exist as well for a device program 103*m* to operate in conjunction with keys and identities recorded in TRE 113 without departing from the scope of the present invention.

A number of program devices may be stored in RAM 103*e*, ROM 103*r*, or NVM 103*s*, including an operating system 103*h*, device driver 103*g*, an http client (not shown), a DNS client, and related software. TRE 113 can record program devices as well, where the program devices in TRE 113 may be focused on cryptographic operations and functions conducted within TRE 113 in support of the operation of device 103. Program devices include routines, sub-routines, programs, objects, components, data structures, etc., which perform particular tasks or implement particular abstract data types. Aspects of the present invention may be implemented in the form of (i) a device program 103*m* which are executed by the device 103 working in conjunction with (ii) firmware on TRE 113 and PP 111 in order for device 103 to conduct the steps and communications for a device 103 depicted in FIG. 2*a* and FIG. 5*a* below. For other embodiments, the use of a TRE 113 could be omitted and a device program 103*m* and/or OS 103*h* could conduct the steps and communications for device 103 depicted and described in connection with FIG. 2*a* and FIG. 5*a* below.

A user may enter commands and information into device 103 through an optional user interface 103*j*, such as a keypad, keyboard (possibly miniaturized for a mobile phone form-factor), and a pointing device. Pointing devices may include a trackball, an electronic pen, or a touch screen. A user interface 103*j* may also include a display (not shown) such as a device screen. A display may also be connected to system bus 103*q* via an interface. The display can comprise any type of display devices such as a liquid crystal display (LCD), a plasma display, and an organic light-emitting diode (OLED) display. Device 103 may also include a camera (not shown) connected to or integrated with device 103 through a physical interface 103*z*, and the camera can comprise a video camera for the device 103 to collect sensor data that includes video or images. The camera (not shown) can be a CCD (charge-coupled device) camera, a CMOS (complementary metal-oxide semiconductor) camera, or a similar device to collect video or camera input including QR codes. Other arrangements could be used as well, without departing from the invention.

The device 103, comprising a computer, may operate in a networked environment using logical connections to one or more remote computers, such as servers. Servers communicating with device 103 can also function as a general purpose server to provide files, programs, disk storage, remote memory, and other resources to device 103 usually through a networked connection. Additional remote computers with which device 103 communicates may include another device 103 or mobile device, an M2M node within a capillary network, a personal computer, other servers, a client, a router, a network PC, a peer device, a wireless network, or other common network nodes. The servers or networks communicating with device 103 or a remote computer typically includes many of the elements described above relative to the device 103, including a CPU, memory, and physical interfaces. It will be appreciated that the network connections shown throughout the present invention are exemplary and other means of establishing a wireless or wired communications link may be used between mobile devices, computers, servers, corresponding nodes, and similar computers.

Tamper resistant element (TRE) 113 can comprise a tamper resistant element as described in GSMA technical document "iUICC POC Group Primary Platform requirements", Approved Release 1.0 dated May 17, 2017, which is hereby incorporated by reference in its entirety ("GSMA PP Requirements"). Tamper resistant element can comprise a silicon enclave within a tamper resistant chip such as a "system on chip" as depicted and described in connection with FIG. 1*b* below. TRE 113 can include a primary platform (PP) 111, where a primary platform is also described in the GSMA PP Requirements document. TRE 113 could also comprise a "Smart Secure Platform" (SSP) as described in ETSI TC SCP Meeting #81 document "SCP(17)000188", which is hereby incorporated by reference in its entirety. Note that draft specifications for an SSP such as "103 666-1 SSP Draft Specification 0.8.0" are not publicly available and have restricted access on the ETSI web site as of Feb. 18, 2019.

Primary platform 111 can comprise a secure operating environment, a secure enclave, a secure element, and comprise a dedicated processing core within a processor for device 103. Primary platform 111 can also operate in a Trusted Execution Environment (TEE) within a processor for device 103. Primary platform 111 can also comprise a SSP as contemplated by ETSI documents and draft specifications for 5G networks. In exemplary embodiments, the public and private keys depicted in FIG. 1*a* for a device 103, such as, but not limited to device static public key Sd 103*c*, device static private key sd 103*d*, device ephemeral public key Ed 103*a*, device ephemeral private key ed 103*b*, device public key PK.Device 121, cryptographic parameters A 104, cryptographic parameters 2 121*b*, and/or device private key SK.Device 122 can be recorded in SOC 109 and/or TRE 113.

TRE 113 and PP 111 can support a variety of applications. TRE 113 can comprise the physical device such as that depicted in FIG. 1*a*, and a primary platform 111 can comprise a secure processing environment operating within the TRE 113. With appropriate firmware, TRE 113 and PP 111 could operate as an "integrated universal integrated circuit card" (iUICC), an "embedded universal integrated circuit card" (eUICC), a secure element for banking applications or payments from mobile phones, an radio-frequency identity (RFID) card, a secure bootstrap environment for device 102, a virtual key for cars or door locks, an secure environment for recording an identity and secret or private keys for drivers licenses, passports, online or web-site access, etc.

Other applications for firmware operating in TRE 113 and PP 111 are possible as well, without departing from the scope of the present invention. In general, cryptographic keys and cryptographic algorithms and parameters could be stored in PP 111 in order to securely support applications such as device programs operating on device 103. In this manner, an insecure device program also operating on device 103 would not feasibly be able to ready the cryptographic keys or use the cryptographic algorithms stored in PP 111. Each of the above exemplary applications can be operated by a firmware or "bound package" running within TRE 113 on PP 111.

The device program 103*m* operating within device 103 illustrated in FIG. 1*b* and communicating with TRE 113 can provide computer executable instructions to hardware such as a central processing unit (CPU) or SOC 109 through a system bus 103*q* in order for a device 103 to (i) transmit and receive data with a service provider, (ii) monitor a sensor and/or change the state of an actuator 103*w*, (iii) send or receive packets with a server or network, and (iv) authenticate with a server, thus allowing the server to remotely monitor or control device 103 in an authenticated and secure manner. The device program 103*m* can enable the device 103 to authenticate and communicate with a server by recording data in memory such as RAM 103*e*, where the data can include sensor data, a destination IP address number, a packet or packet header value, an encryption or ciphering algorithm and key, a digital signature and public key, etc, where cryptographic operations or calculations for the device program 103*m* can be performed by TRE 113 using firmware. The data recorded in RAM 103*e* can be subsequently read by the operating system 103*h* or the device driver 103*g*. The operating system 103*h* or the device driver 103*g* can write the data to a physical interface 103*z* using a system bus 103*q* in order to use a physical interface 103*z* to send data such as a digital signature for authentication to a server using the Internet 107. In exemplary embodiments, the digital signature can be generated or processed in the TRE 113 using a PP 111 and firmware. Alternatively, the device program 103*m* can write the data directly to the physical interface 103*z* using the system bus 103*q*.

In general, digital signatures for authentication with a server can be performed in TRE 113, where the digital signature output is transferred from TRE 113 to RAM 103*e* before being transmitted from device 103 to a server through the IP network 107. The data recorded in RAM 103*e* such as a digital signature can be subsequently read by the operating system 103*h* or the device driver 103*g*. Note that device driver 103*g* can include OFL agent 103*w* in order to communicate with TRE 113. Thus, OFL agent 103*w* can be a device driver 103*g* specifically for TRE 113. The operating system 103*h* or the device driver 103*g* can write the data to a physical interface 103*z* using a system bus 103*q* in order to use a physical interface 103*z* to send data such as a digital signature for authentication to a server using the Internet 107. Alternatively, the device program 103*m* can write the data directly to the physical interface 103*z* using the system bus 103*q*. Other possibilities exist as well without departing from the scope of the present invention.

The device program 103*m* or operating system 103*h* (possibly including the use of TRE 113 and PP 111 with firmware) can include steps to process the data recorded in memory such as encrypting data, selecting a destination address, or encoding sensor data acquired by (i) a sensor 103*f* or (ii) through a physical interface 103*z* such as a thermocouple, shock or vibration sensor, light sensor, or global positioning system (GPS) receiver, etc. The device 103 can use the physical interface 103*z* such as a radio to transmit or send (i) the data from a sensor or (ii) a digital signature from TRE 113 to a network 102. For those skilled in the art, other steps are possible as well for a device program 103*m* or operating system 103*h* to collect data from either (i) a sensor 103*f* or (ii) a TRE 113 and send the data in a packet without departing from the scope of the present invention.

Conversely, in order for device 103 to receive a packet or response from server, which could include a challenge or nonce in order to authenticate a device 103 with the server, the physical interface 103*z* can use a radio to receive the challenge or nonce from a wireless network. The challenge or nonce received from the server through the wireless network could comprise a random number or a pseudo random string of digits, bits, and/or characters. The received data can include information from a server and may also comprise a datagram, a source IP address number, a packet or header value, an instruction for device 103, an acknowledgement to a packet that device 103 sent, a digital signature, and/or encrypted data. The operating system 103*h* or device driver 103*g* can use a system bus 103*q* and a CPU operating in SOC 109 to record the received data such as a challenge or nonce from a server in memory such as RAM 103*e*, and the device program 103*m* or operating system 103*h* may access the memory in order to process the received data and determine the next step for the device 103 after receiving the data.

Processing the received data from a server to device 103 could include deciphering or decrypting received data by TRE 113 with a key recorded in TRE 113, sending the challenge or nonce to the TRE 113, reading an instruction from a server, or similar transformations of the received data. The steps within the paragraph above may also describe the steps a device program 103*m* can perform in order to receive a packet. For those skilled in the art, other steps are possible as well for a device program 103*m* or device 103 to receive a packet or challenge or nonce from a server without departing from the scope of the present invention. A server described herein without the designation of "Server 101" or Server B 102*s* can comprise a different server than Server 101 communicating with device 103 in support of an application operating as a device program 103*m*.

Moreover, those skilled in the art will appreciate that the present invention may be implemented in other computer system configurations, including hand-held devices, netbooks, portable computers, multiprocessor systems, microprocessor based or programmable consumer electronics, network personal computers, minicomputers, mainframe computers, servers, and the like. The invention may also be practiced in distributed computing environments, where tasks are performed by remote processing devices that are linked through a communications network. In a distributed computing environment, program devices may be located in both local and remote memory storage devices. In addition, the terms "mobile node", "mobile station", "mobile device", "M2M device", "M2M device", "networked sensor", or "industrial controller" can be used to refer to device 103 as contemplated herein.

In exemplary embodiments, a device 103 can include the functional capabilities of (i) collecting sensor data, (ii) changing state of an actuator 103*w*, (iii) communicating the data associated with a sensor or actuator with a wireless network, and/or receiving a challenge or nonce from a server and sending a digital signature. The device driver 103*g*, operating system 103*h*, and/or device program 103*m* could optionally be combined into an integrated system for providing the device 103 functionality. Other possibilities exist as well for the configuration or combination of components illustrated in FIG. 1*b* without departing from the scope of the present invention.

FIG. 1*c*

Figure 1C:
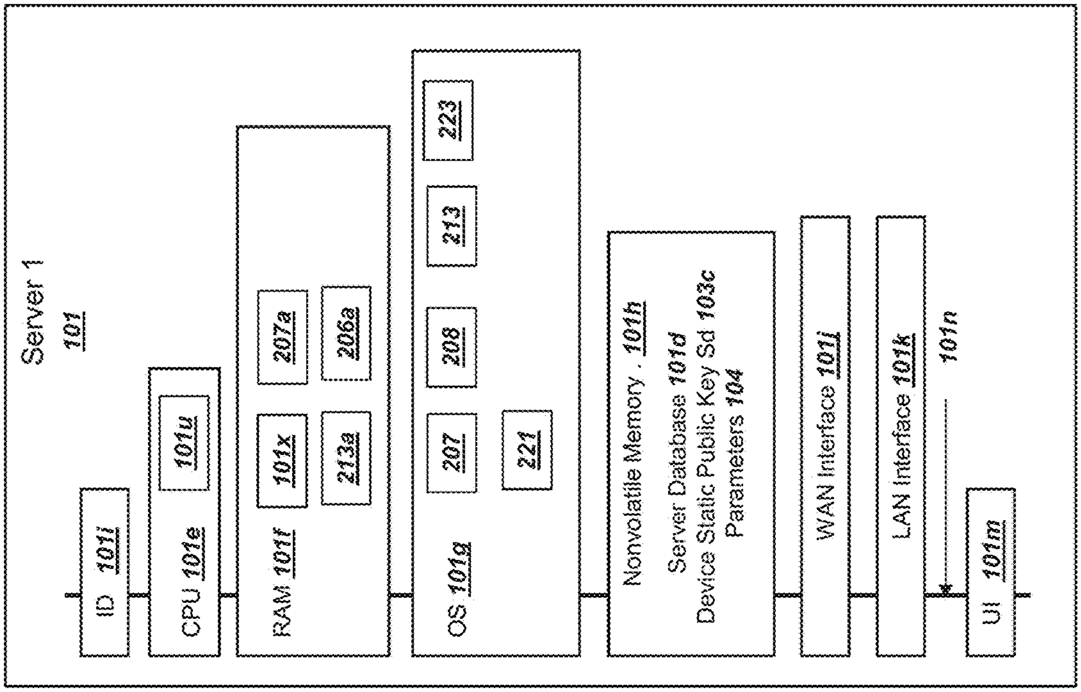
FIG. 1*c* is a graphical illustration of hardware, firmware, and software components for a server, in accordance with exemplary embodiments.

FIG. 1*c* is a graphical illustration of hardware, firmware, and software components for a server, in accordance with exemplary embodiments. FIG. 1*c* is illustrated to include several components that can be common within a Server 101. Server 101 may consist of multiple electrical components in order to communicate with a plurality of devices 103 and at least one network 102. In exemplary embodiments and as depicted in FIG. 1*c*, Server 101 can include a server identity 101*i*, a processor 101*e* (depicted as "CPU 101*e*"), random access memory (RAM) 101*f*, an operating system (OS) 101*g*, storage memory 101*h* (depicted as "nonvolatile memory 101*h*"), a Wide Area Network (WAN) interface 101*j*, a LAN interface 101*k*, a system bus 101*n*, and a user interface (UI) 101*m*.

Server identity 101*i* could comprise a preferably unique alpha-numeric or hexadecimal identifier for Server 101, such as an Ethernet MAC address, a domain name service (DNS) name, a Uniform Resource Locator (URL), an owner interface identifier in an IPV6 network, a serial number, an IP address, or other sequence of digits to uniquely identify each of the many different possible nodes for a Server 101 connected to an IP network 107. Server identity 101*i* can preferably be recorded in a non-volatile memory and recorded by a network 102 upon configuration of a Server 101. Server identity 101*i* may also be a number or string to identify an instance of Server 101 running in a cloud or virtual networking environment. In exemplary embodiments, Server 101 can operate with multiple different server identities 101*i*, such as a first server identity 101*i* comprising a DNS name and a second server identity 101*i* comprising an IP address and a port number. A different Server 101 could be associated with a different IP address and port number. In exemplary embodiments, a first Server 101 with a first server identity 101*i* can operates with a first Internet Protocol address and port (IP: port) number with a first server static private key ss 101*b*, and a second Server 101 with a second server identity 101*i* can operate with a second IP: port number and a second server static private key ss 101*b*.

The CPU 101*e* can comprise a general purpose processor appropriate for higher processing power requirements for a Server 101, and may operate with multiple different processor cores. CPU 101*e* can comprise a processor for Server 101 such as an ARM® based process or an Intel® based processor such as belonging to the XEON® family of processors, and other possibilities exist as well. CPU 101*e* can utilize bus 101*n* to fetch instructions from RAM 101*f* and operate on the instruction. CPU 101*e* can include components such as registers, accumulators, and logic elements to add, subtract, multiply, and divide numerical values and record the results in RAM 101*f* or storage memory 101*h*, and also write the values to an external interface such as WAN interface 101*j* and/or LAN interface 101*k*. In exemplary embodiments, CPU 101*e* can perform the mathematical calculations for a key pair generation step 101*x* and also an ECDH key exchange algorithm 207 depicted in FIG. 2*a*, FIG. 2*d*, etc., below.

Figure 2B:
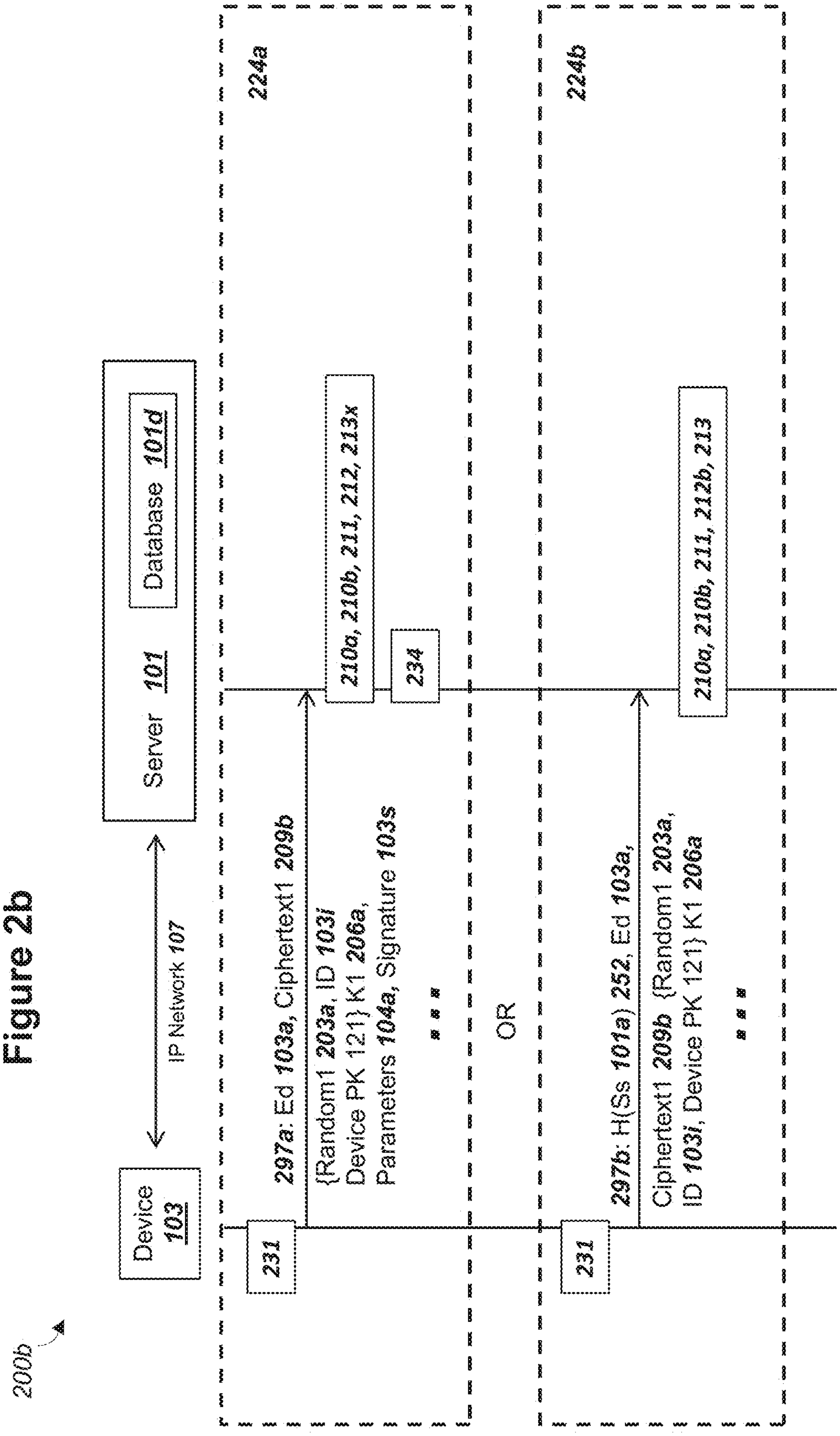
FIG. 2*b* is a simplified message flow diagram illustrating an exemplary messages transmitted from a device to a server, in accordance with exemplary embodiments.
Figure 2C:
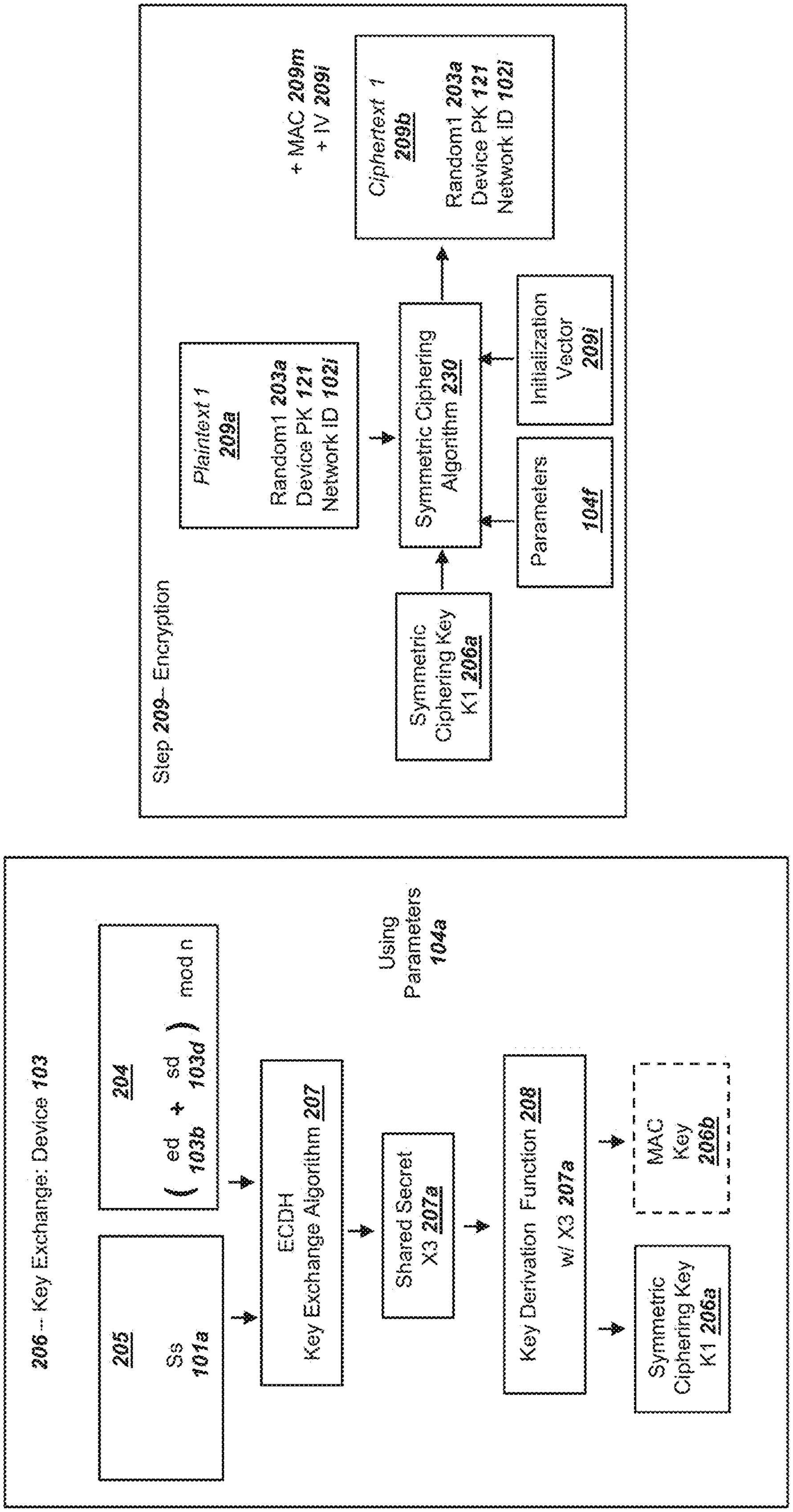
FIG. 2*c* is a flow chart illustrating exemplary steps for conducting a key exchange using PKI keys in order to derive a shared secret key, and for using the derived shared secret key to encrypt data, in accordance with exemplary embodiments.
Figure 2D:
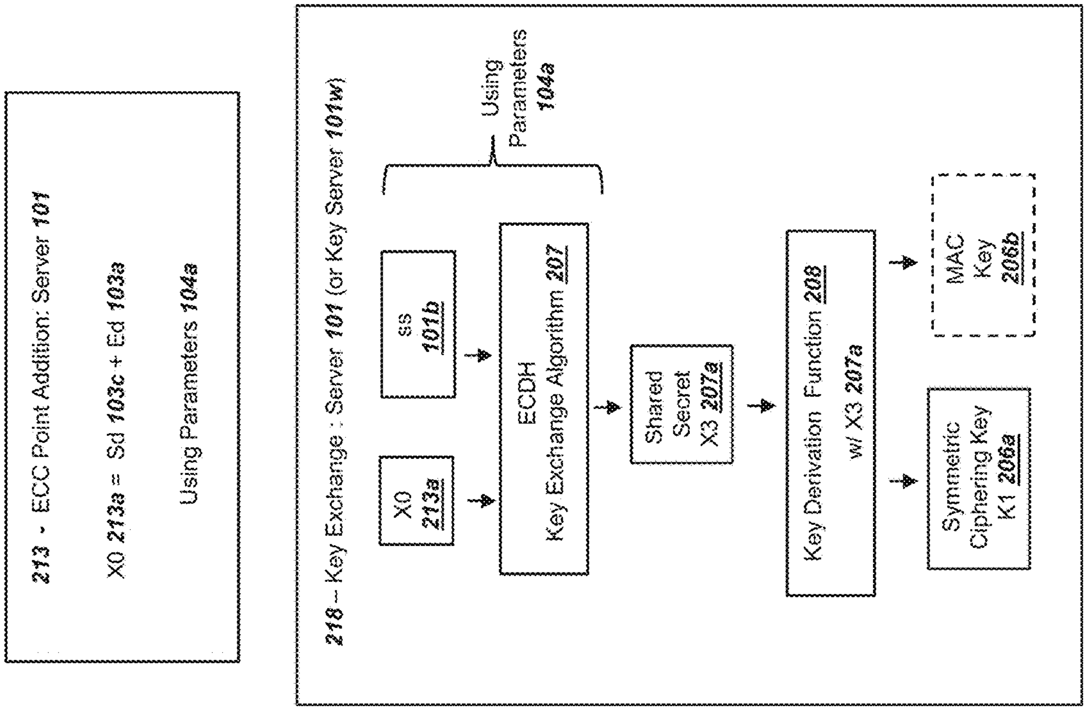
FIG. 2*d* is a flow chart illustrating exemplary steps for conducting an ECC point addition operation to combine public keys, for conducting a key exchange using PKI keys in order to derive shared secrets, and for conducting a key derivation function, in accordance with exemplary embodiments.

CPU 101*e* can also contain a secure processing environment (SPE) 101*u* in order to conduct elliptic curve cryptography (ECC) operations and algorithms, such as an ECC point addition steps 213 as depicted in FIG. 2*d* below, as well as deriving ephemeral ECC PKI keys such as with key generation step 101*x* depicted and described in connection with FIG. 1*a* above. SPE 101*u* can comprise a dedicated area of silicon or transistors within CPU 101*e* in order to isolate the ECC operations from other programs or software operated by CPU 101*e*, including many processes or programs running operating system 101*g*. SPE 101*u* could contain RAM memory equivalent to RAM 101*f* and nonvolatile memory equivalent to storage memory 101*h*, as well as a separately functioning processor on a smaller scale than CPU 101*e*, such as possibly a dedicated processor core within CPU 101*e*. SPE 101*u* can comprise a "secure enclave" or a "secure environment", based on the manufacturer of CPU 101*e*. In some exemplary embodiments, an SPE 101*u* can be omitted and the CPU 101*e* can conduct ECC operations or calculations without an SPE 101*u*. Note that the use of a SPE 101*u* for conducting cryptographic calculations can provide resistance to various "speculative executions" attacks known as "Spectre", since the calculations can be conducted entirely within the secure enclave of SPE 101*u* and not use general registers or cache memory for CPU 101*e*.

RAM 101*f* may comprise a random access memory for Server 101. RAM 101*f* can be a volatile memory providing rapid read/write memory access to CPU 101*e*. RAM 101*f* could be located on a separate integrated circuit in Server 101 or located within CPU 101*e*. The RAM 101*f* can include data recorded or stored in Server 101 for the operation when communicating with a plurality of devices 103 or a network 102. The system bus 101*n* may be any of several types of bus structures including a memory bus or memory controller, a peripheral bus, and a local bus using any of a variety of bus architectures including a data bus. System bus 101*n* connects components within Server 101 as illustrated in FIG. 1*c*, such as transferring electrical signals between the components illustrated. Server 101 can include multiple different versions of bus 101*n* to connect different components, including a first system bus 101*n* between CPU 101*e* and RAM 101*f* (which could be a memory bus), and a second system bus 101*n* between CPU 101*e* and WAN interface 101*j* or LAN interface 101*k*, which could be an I2C bus, an SPI bus, a PCI bus, or similar data busses.

In exemplary embodiments, RAM 101*f* operating with Server 101 can record values and algorithmic steps or computer instructions for conducting an ECDH key exchange, including a key pair generation step 101*x*. Additional shared secret values or points on an elliptic curve can be recorded in RAM 101*f* as well, such as the values or points depicted and described in connection with FIG. 2*d* below, which could comprise a point X0 213*a*, a secret X3 207*a*, and symmetric ciphering key K1 206*a*. The depicted values and algorithms can be recorded in RAM 101*f* so that CPU 101*e* can conduct ECC operations and calculations quickly using the values. The depicted values could also be recorded in other locations for longer-term or nonvolatile storage, such as within a server database 101*d*. Additional or other values besides the ones depicted in FIG. 1*c* can also be recorded in RAM 101*f* in order to support Server 101 conducting the communications, steps, and message flows depicted in FIG. 2*a* and FIG. 4 below, and also other Figures herein.

The operating system (OS) 101*g* can include Internet protocol stacks such as a User Datagram Protocol (UDP)

stack, Transmission Control Protocol (TCP) stack, a domain name system (DNS) stack, a TLS stack, a DPP stack, etc. The operating system 101*g* may include timers and schedulers for managing the access of software to hardware resources within Server 101, where the hardware resources managed by OS 101*g* can include CPU 101*e*, RAM 101*f*, nonvolatile memory 101*h*, and system bus 101*n*, and well as connections to the IP network 107 via a WAN interface 101*j*. The operating system shown of 101*g* can be appropriate for a higher power computing device with more memory and CPU resources (compared to a device 103). Example operating systems 101*g* for a Server 101 includes Linux or Windows® Server, and other possibilities exist as well. Although depicted as a separate element within Server 101 in FIG. 1*c*, OS 101*g* may reside in RAM 101*f* and/or nonvolatile memory 101*h* during operation of Server 101.

As depicted in FIG. 1*c*, OS 101*g* in FIG. 1*c* can contain algorithms, programs, or computer executable instructions (by processor 101*e* or SPE 101*u*) for an ECDH key exchange algorithm 207 (depicted and described in FIG. 2*d* below), a key derivation function (KDF) 208 (depicted and described in FIG. 2*d* below), and also ECC point addition operation 213. ECC point addition operation 213 is depicted and described in connection with FIG. 2*d* below. OS 101*g* could also record and operate a decryption step 221 and an encryption step 223, as depicted and described below in FIG. 2*e*. The steps or algorithms could be included either (i) within the kernel of OS 101*g*, or (ii) as a separate program or process loaded by OS 101*g* and operated by OS 101*g*. OS 101*g* can also read and write data to a secure processing environment SPE 101*u*, if CPU 101*e* contains SPE 101*u*. In other words, for some exemplary embodiments, depicted logic or steps of 207, 208, 213, 221, 223, etc. could be performed within an SPE 101*u* instead of a general purpose OS 101*g*.

Nonvolatile memory 101*h* or "storage memory" 101*h* (which can also be referred to herein as "memory 101*h*") within Server 101 can comprise a non-volatile memory for long-term storage of data, including times when Server 101 may be powered off. Memory 101*h* may be a NAND flash memory or a NOR flash memory and record firmware for Server 101, such as a bootloader program and OS 101*g*. Memory 101*h* can record long-term and non-volatile storage of data or files for Server 101. In an exemplary embodiment, OS 101*g* is recorded in memory 101*h* when Server 101 is powered off, and portions of memory 101*h* are moved by CPU 101*e* into RAM 101*f* when Server 101 powers on. Memory 101*h* (i) can be integrated with CPU 101*e* into a single integrated circuit (potentially as a "system on a chip"), or (ii) operate as a separate integrated circuit or a removable card or "disk", such as a solid state drive (SSD). Storage memory 101*h* can also comprise a plurality of spinning hard disk drives in a redundant array of independent disks (RAID) configuration. Memory 101*h* may also be referred to as "server storage" and can include exemplary file systems of FAT16, FAT 32, NTFS, ext3, ext4, UDF, or similar file systems. As contemplated herein, the terms "memory 101*h*", "storage memory 101*h*", and "nonvolatile memory 101*h*" can be considered equivalent.

As depicted in FIG. 1*c*, non-volatile memory 101*h* can record a server database 101*d*, at least one device static public key Sd 103*c*, and cryptographic parameters A 104. Exemplary data within a server database 101*d* is depicted and described in connection with FIG. 2*f* below. Although depicted in FIG. 1*c* as recorded within memory 101*h*, a server database 101*d* could also operate as a separate server than Server 101, and Server 101 could query the server database 101*d* using a private network 107*a*. The device static public key Sd 101*c* could be received by Server 101 from (i) a device manufacturer or a device owner, or (ii) directly from device 103 through IP network 107 (preferably in a secured manner, such as using encryption and authentication). In addition, as depicted in FIG. 1*c*, memory 101*h* can record the parameters A 104 which were depicted and described in connection with FIG. 1*a* above and also FIG. 3 below.

In exemplary embodiments, device static public key Sd 103*c* is received by Server 101 in a manner that is secured against quantum computers, such as, but not limited to, (i) not transferred through an Internet 107, (ii) received from a manufacturer or distributor of device 103 via encrypted physical media, or (iii) transferred through Internet 107 using pre-shared secret symmetric ciphering keys. Or, device static public key Sd could be received over Internet 107 from a device 103 manufacturer using post-quantum cryptography. Other possibilities exist as well for the steps for Server 101 to receive a device static public key Sd 101*c* in a manner that that does not depend on the security of (i) factoring large integers, (ii) computing large discrete logarithms, or (ii) computing large elliptic curve discrete logarithms, without departing from the scope of the present invention. In this manner, by securely recording or storing device static public keys Sd 103*c*, the public keys can be secured against quantum computers and subsequently utilized by a Server 101 (and the private key used by a device 103) to securely encrypt subsequent public keys, where the subsequent public keys may also use classical or "quantum unsafe" algorithms because the subsequently transferred public keys are transferred in a manner that is secured against quantum computers (e.g. using symmetric ciphering algorithms).

Server 101 can include a WAN interface 101*j* to communicate with IP network 107 and a plurality of devices 103, as depicted in FIG. 1*a* above (where FIG. 1*a* depicts a single device 103). WAN interface 101*j* can comprise either a wired connection such as Ethernet or a wireless connection. For wireless configurations of Server 101, then WAN interface 101*j* can comprise a radio, which could connect with an antenna in order to transmit and receive radio frequency signals. For a wireless configuration of Server 101, WAN interface 101*j* within Server 101 can provide connectivity to an IP network 107 through 3GPP standards such as 3G, 4G, 4G LTE, and 5G networks, or subsequent and similar standards. In some exemplary embodiments, Server 101 can comprise a "g node b" or gNb in a 5G network (or equivalent functionality in 6G or subsequent networks), and WAN interface 101*j* can comprise a 5G radio access network (RAN) interface. WAN interface 101*j* can also comprise a wired connection such as digital subscriber line (DSL), coaxial cable connection, or fiber optic connection, and other possibilities exist as well without departing from the scope of the present invention.

Server 101 may also operate a LAN interface 101*k*, where LAN interface 101*k* can be used to connect and communicate with other servers in a network 102, such as network 102 through private network 107*a*. LAN interface 101*k* can comprise a physical interface connected to system bus 101*n* for Server 101. In exemplary embodiments, LAN interface 101*k* can comprise an Ethernet or fiber optic wired connection. In other words, (i) LAN interface 101*k* can connect Server 101 to private network 107*a* (which could comprise an IP network with private IP addresses that are not globally routable), and (ii) WAN interface 101*j* can comprise an interface for communicating with a plurality of devices 103 through insecure networks such as the globally routable public Internet. The use of a separate WAN interface 101*j* and LAN interface 101*k* can increase the security of operation for Server 101. However, the use of separate physical interfaces for LAN interface 101*k* and WAN interface 101*j* can be omitted, and a single physical interface such as Ethernet or fiber-optic could be used by Server 101 to communicate with both devices 103 and network 102.

Server 101 may also optionally include user interface 101*m* which may include one or more interfaces for receiving inputs and/or one or more interfaces for conveying outputs. User interfaces are known in the art and may be simple for many servers 101 such as a few LED lights or and LCD display, and thus user interfaces are not described in detail here. User interface 101*m* could comprise a touch screen or screen display with keyboard and mouse, if Server 101 has sophisticated interaction with a user, such as a network administrator. Server 101 can optionally omit a user interface 101*m*, if no user input or display is required for establishing communications within a network 102 and/or IP network 107. Although not depicted in FIG. 1*c*, Server 101 can include other components to support operation, such as a clock, power source or connection, antennas, etc. Other possibilities exist as well for hardware and electrical components operating in a Server 101 without departing from the scope of the present invention. Using the electrical components depicted in FIG. 1*c*, a Server 101 could send and receive the data 106 in FIG. 1*a* as well as conduct the steps and communicate the messages with at least one device as depicted in FIG. 2*a*.

FIG. 1*d*

Figure 1D:
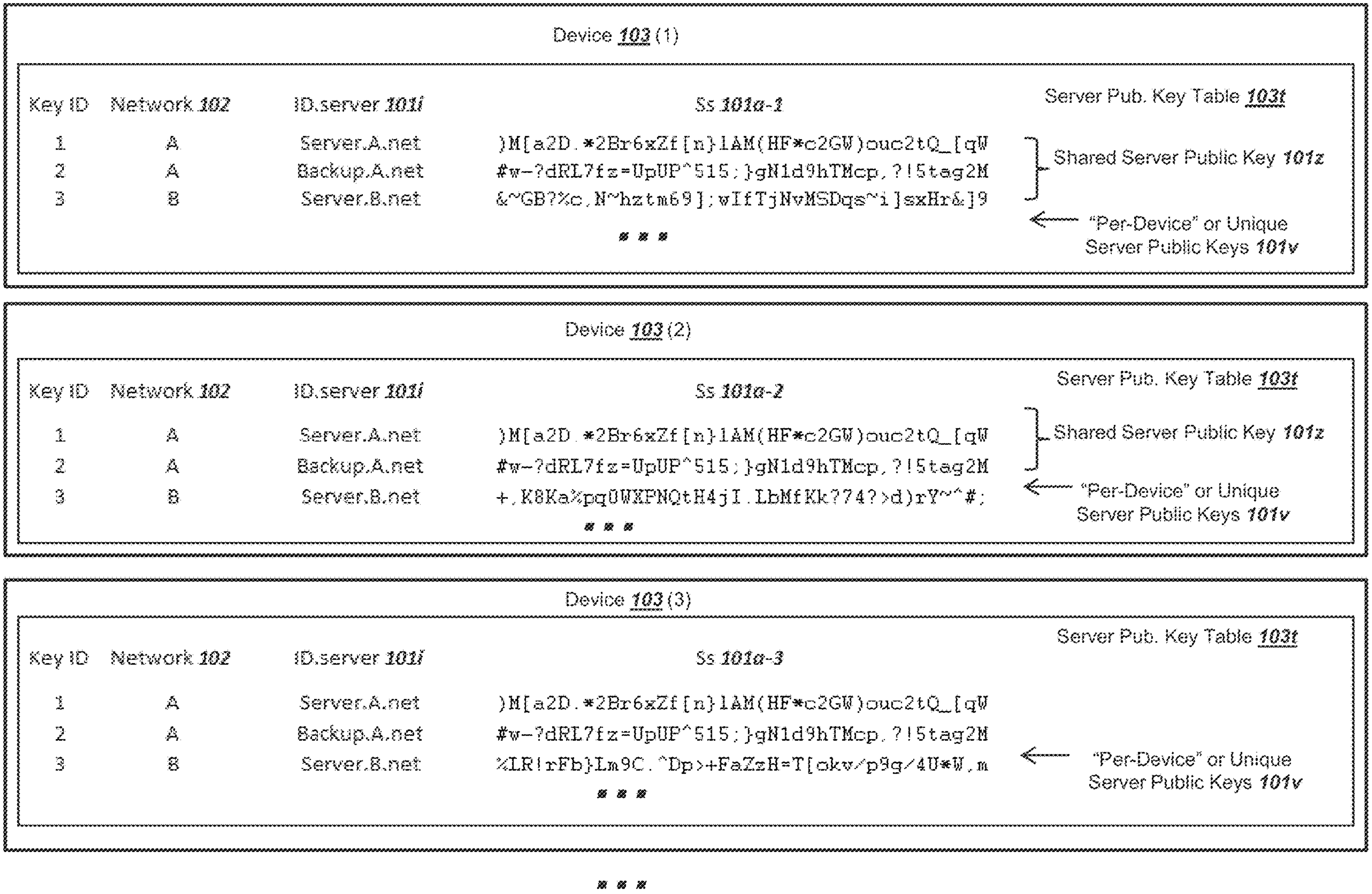
FIG. 1*d* is an illustration of exemplary server static public keys recorded by a plurality of devices, in accordance with exemplary embodiments.

FIG. 1*d* is an illustration of exemplary server static public keys recorded by a plurality of devices, in accordance with exemplary embodiments. FIG. 1*d* depicts PKI keys recorded for an exemplary three different devices 103, although a system 100 and other systems herein could operate with potentially millions or more devices 103. The data depicted for each device in FIG. 1*d* can comprise exemplary data for a server public key table 103*t* for a device 103, which is also depicted and described in connection with FIG. 1*a* above. The exemplary values recorded for server static public keys depicts different embodiments where both (i) a device 103 can record a server static public key Ss 101*a* that is shared with other devices 103, and (ii) a server static public key Ss 101*a* recorded by device 103 could be unique for device 103 (e.g. not shared with other devices 103 in a system 100 above or a system 200*a* below, as well as other systems herein). Although not depicted in FIG. 1*d*, each public key in a server public key table 103*t* could include a subset of cryptographic parameters A 104 associated with the public key.

A server public key table 103*t* for device 103 can record values of a key identity, a network name for network 102, an identity for Server 101 comprising ID.Server 101*i*, and also a value for server static public key Ss 101*a*. In addition, although a network name for network 102 is depicted in FIG. 1*d*, a server public key table 103*t* could store or record a network identity 102*i* instead of the network name. As depicted in FIG. 1*d*, a device 103 can record multiple different values for use with multiple different servers 101. As depicted in FIG. 1*d*, a device 103 can also record multiple different values for use with a set of servers 101, such as a primary set of PKI keys (e.g. row 1), and a backup set of PKI keys (e.g. row 2). In some exemplary embodiments, the server static public keys Ss 101*a* are securely recorded in device 103 such as within a TRE 113 depicted in FIG. 1*b* above during manufacturing. In other exemplary embodiments, the server static public keys Ss 101*a* are securely recorded in device 103 such as within a TRE 113 depicted in FIG. 1*b* above after manufacturing and before distribution of device 103 to an user, such as a device distributor recording the data in a server public key table 103*t*.

The manufacturer or distributor of device 103 could receive the server static public keys Ss 101*a* from the owner or operator of servers 101 in a secure manner. In exemplary embodiments, a server static public key Ss 101*a* is received by device 103 from the owner or operator of servers 101 in a manner that is secured against quantum computers. Server static public key Ss 101*a* could preferably (i) not be transferred through an Internet 107, (ii) received by a manufacturer or distributor of device 103 via encrypted physical media, or (iii) transferred through Internet 107 to device manufacturer of device 103 using pre-shared secret symmetric ciphering keys. Or, server static public key Ss 101*a* could be received by a manufacturer or distributor of device 103 over Internet 107 from an owner or operator of servers 101 using post-quantum cryptography.

Other possibilities exist as well for the steps for a device 103 to receive a server static public key Ss 101*a* in a server public key table 103*t* in a manner that that does not depend on security from (i) factoring large integers, (ii) computing discrete logarithms for large numbers, or (ii) computing elliptic curve discrete logarithms for large points, without departing from the scope of the present invention. In this manner, by securely recording or storing server static public keys Ss 101*a* in device 103 before device 103 communicates with server 101, the public keys can be secured against quantum computers. The server static public keys Ss 101*a* can subsequently utilized by a device 103 (and the private key used by a Server 101) to securely encrypt subsequent public keys, where the subsequent public keys may also use classical or "quantum unsafe" algorithms because the subsequently transferred public keys are transferred in a manner that is secured against quantum computers (e.g. using symmetric ciphering algorithms).

The first two entries for server static public keys Ss 101*a* for a first device 103(1) and a second device 103(2) in FIG. 1*d* (e.g. row 1 for each device 103) depicts the same alphanumeric values for basE91 binary to text encoding for an exemplary server static public keys Ss 102*a*-1 in a first device 103 (1) and Sn 102*a*-2 for a second device 103(2), where the key value is depicted for a Server 101 of "server-.A.net". In other words, a value Ss 101*a*-1 and Ss 101*a*-2 can be equal. Likewise, the second two entries for server static public keys Ss 101*a* for a first device 103(1) and a second device 103(2) in FIG. 1*d* (e.g. row 2 for each device 103) depicts the same alphanumeric values for basE91 binary to text encoding for an exemplary server static public key Ss 101*a* in a first device 103(1) and a second device 103(2). Note that although a single value is depicted for PKI keys in a server public key table 103*t*, the values or numbers for keys recorded could comprise a point on an ECC curve with both an X coordinate and a Y coordinate. For illustration purposes in FIG. 1*d*, only the X coordinate are displayed and the Y coordinate could be calculated from the X coordinate using the equation for an ECC curve in a set of cryptographic parameters A 104*a* for the PKI keys.

The depiction of these exemplary keys Ss 101*a* illustrates the use of shared server public keys 101*z* for a plurality of different devices 103. Although only two devices are depicted with shared server public keys 101*z*, many more devices could also record the same shared server public keys for Ss 101*a*. Each of the shared server public keys 101*z* is associated with the same Server 101 or set of servers 1 101, identified with an exemplary same name "server.A.net", although row 1 and row 2 for device 103-1 and device 103-2 could be for different networks as well (e.g. "network A" for row 1 and a "network X" for row 2). In this manner, a plurality of different devices 103 can record and use the same value for a server static public key Ss 101*a*. As described above, the value in a table 103*t* including server static public key Ss 101*a* could be written in device before the device sends the first message 297 in FIG. 2*a* below. The data could be recorded by a device manufacturer, a device distributor, or a device owner, and other possibilities exist as well for the source of input for Ss 101*a* without departing from the scope of the present invention (where an owner or operator of Server 101 output Ss 101*a* using the server static private key ss 101*b*).

The same values for shared server public keys 101*z* across different devices 103 could be recorded in device 103 during manufacturing or before distribution to end users of device 103. In this manner, devices 103 could be received by end users in a "partially configured" yet secure state, such that a device 103 could use the recorded keys Ss 101*a* with a Server 101, where the Server 101 operates or records the corresponding network static private key ss 102*b*. As depicted and described in connection with FIGS. 2*a*, 4, etc. below, a Server 101 could record and operate with the corresponding server static private key ss 101*b* and thus the key ss 101*b* can remain secured.

In this manner, encrypted communications for data 106 in FIG. 1*a* can be transferred between device 103 and Server 101 without the transfer of public keys Ss 101*a* and Sd 101*c* through IP network 107. This increases the security of a system 100 and other systems herein, because Server 101 and device 103 may communicate through an insecure IP network 107, where other nodes on the IP network 107 could feasibly derive a private key from a public key using a quantum computer, and other potential security benefits exist as well. Note that in some exemplary embodiments, such as those depicted and described in connection with FIG. 4 below, then server static private key ss 101*b* can also be recorded by a key server 101*w*, such that Server 101 does not operate or record server static private key ss 101*b* which corresponds to a server static public key Ss 101*a* recorded by at least one device 103.

By using a set of shared keys 101*z* or shared keys 101*z* or across a plurality of devices 103, Server 101 can control access of the devices 103 as a group. For example, a Server 101 could deny transactions requiring access to the private key corresponding to the public key for the first depicted value of Ss 101*a* in a first device 103(1). That action by Server 101 would also deny a second device 103(2) transactions requiring access to the private key corresponding to the public key for the first depicted value of Ss 101*a* in the second device 103(2). In this manner, Server 101 could control access to a plurality of different devices 103 by controlling access to a single value of ss 101*b*, where (i) the plurality of different devices 103 record the corresponding Ss 101*a* as shared keys 101*z*. Other benefits for using shared keys 101*z* can be available as well, such as simplifying manufacturing or distribution, since the same key value for Ss 101*a* could be recorded with multiple different devices 103. In other words, a device manufacturer or device distributor would not need to keep track of which values for Ss 101*a* belongs with which device 103 for embodiments where shared keys 101*z* are utilized. However, the use of shared keys 101*z* for multiple different devices 103 is not required for some exemplary embodiments.

In exemplary embodiments, server static public keys Ss 101*a* can also comprise a unique key for each device 103 in a system 100 and other systems herein. Thus, some exemplary embodiments also support the use of a server static public key Ss 101*a* that is not shared across multiple different devices 103. For these exemplary embodiments, and as depicted in FIG. 1*d*, a device 103 can record a unique key 101*v* (depicted as "Unique Server Static Public Key" 101*v* in FIG. 1*d*). For example, the depicted value for the third key Ss 101*a* for device 103(1), (2), and (3) in FIG. 1*d* is shown as unique for each device. A Server 101 could also record the corresponding server static private key ss 101*b* that is unique for each device in a server database 101*d*. In this manner, a Server 101 can control access to Server 101 on a per-device basis using the unique key 101*v*. For example, Server 101 could deny access to device 103(3) (while continuing to allow service for device 103(1) and 103(2)), by denying access or cryptographic operations requiring the secret key ss 101*b* in a Server 101 corresponding to the public key Ss 101*a* recorded by device 103(3).

Other benefits for recording server static public keys Ss 101*a* as unique keys 101*v* for devices 103 exist as well without departing from the scope of the present invention, such as increased security. If (a) a single server static secret key ss 101*b* is compromised, then (b) communication with the device recording the corresponding public key Ss 101*a* could be compromised, while (c) devices recording other, different values for server static public key Ss 101*a* would not be compromised. Cryptographic analysis or leakage of information pertaining to network static secret keys ss 101*b*, such as via side channel attacks, timing attacks, malformed ephemeral public keys, etc., risk the compromise of a single key for a single device (when using unique keys 101*v*), which has less impact than compromise of a server static secret key ss 101*b* supporting shared keys 101*z* across a plurality of devices 103.

FIG. 2*a*

Figure 4:
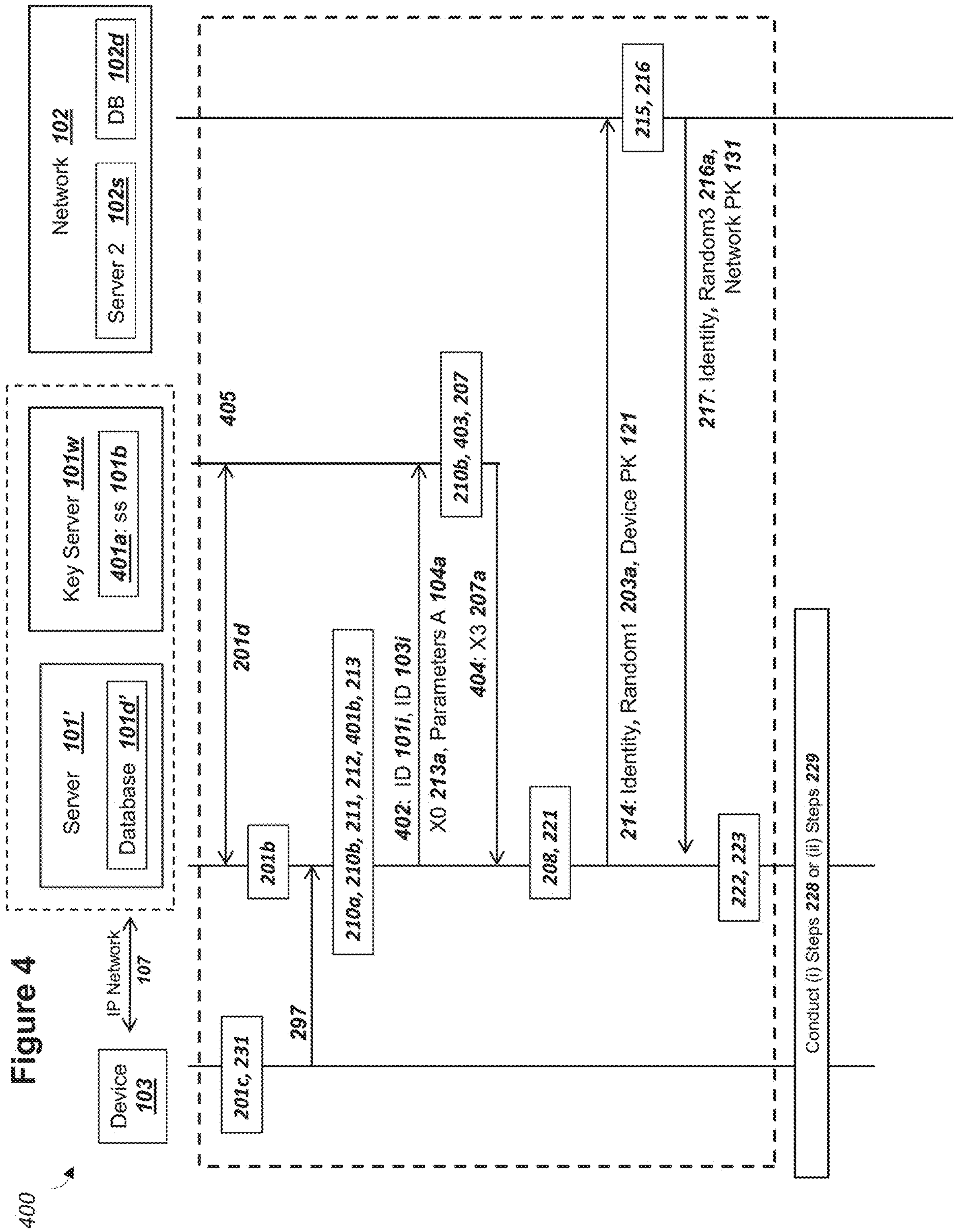
FIG. 4 is a simplified message flow diagram illustrating an exemplary system with exemplary data sent and received by a device, a server, a key server, and a network, in accordance with exemplary embodiments.

FIG. 2*a* is a simplified message flow diagram illustrating an exemplary system with exemplary steps and messages sent and received by a device, a server, and a network, in accordance with exemplary embodiments. System 200*a* can include a device 103, Server 101, and a network 102. Device 103 was depicted and described in connection with FIG. 1*a*, FIG. 1*b*, and FIG. 1*d* above. Server 101 and network 102 were depicted and described in connection with FIG. 1*a* above, and server 101 was depicted and described in connection with FIG. 1*c* above. Server 101 can record and operate a server database 101*d*, and network 102 can record and operate a database 102*d* and a server B 102*s*. Individual steps and components used in system 200*a* in FIG. 2*a* are also additionally depicted and described in subsequent FIGS. 2*b*, 2*c*, and 2*d*, etc. Before starting the steps and message flows depicted in FIG. 2*a*, device 103 can securely receive and record or store a server static public key Ss 101*a*, which was also depicted and described in connection with FIG. 1*a* and FIG. 1*d*. The corresponding private key for Ss 101*a* can be securely recorded in (i) Server 101 as ss 101*b* for the embodiment depicted in FIG. 2*a*, or (ii) a key server 102*w* for the embodiment as depicted in FIG. 4 below.

For system 200*a*, Server 101 and network 102 may establish a secure session 201*a*, which could comprise establishing a secure communications link between the two servers using protocols such as TLS, IPSec, a virtual private network (VPN), a secure shell (SSH), or similar networking, transport, or application layer technologies in order to establish secure communications between network 102 and Server 101. Secure session 201*a* can utilize certificates for the two servers in order to provide mutual authentication and mutual key derivation for a symmetric encryption key in secure session 201*a*. Secure session 201*a* can also be conducted over private network 107*a*, although the secure session 201*a* could also be established or conducted through an IP network 107 such as the globally routable Public Internet. Other possibilities exist as well for establishing a secure session 201*a* between Server 101 and network 102 without departing from the scope of the present invention. Although not depicted in FIG. 2*a*, firewalls between Server 101 and network 102 could also be utilized in order to establish or conduct secure session 201*a*. At step 201*b*, Server 101 can begin listening for incoming messages from a device 103 using a physical network interface that provides connectivity to the IP network 107 and Server 101 can use a specific port number such as TCP port 443 to listen for incoming data 106 from a device 103.

At step 201*c*, device 103 can be "pre-configured" with operating data such as an operating system similar to OS 101*h* in FIG. 1*b*, a set of cryptographic algorithms 104 or a subset of cryptographic algorithms 104*a*, an identity 102*i* for network 102 or 101*i* Server 101, and at least one for each of a device static private key sd 103*d*, and a server static public key Ss 101*a*. At a step 201*c*, public keys for at least one server 101 could be recorded in a server public key table 103*t* as depicted in FIG. 1*d*. Other configuration data for device 103 could be recorded in a step 201*c* as well, such as timers, drivers for transducers, user information, etc. A step 201*c* could be performed by a device manufacturer, a device distributor, or a device owner, and other possibilities exist as well without departing from the scope of the present invention. A step 201*c* could be performed in parts, such that a first part is conducted by a device manufacturer, a second part conducted by a device owner, etc. A device 103 could also record a server static public key Ss 101*a* in the form of a certificate in a step 201*c*.

At step 202, device 103 can be powered on and begin operating, in order to establish connectivity with an IP network 107. At step 202, device 103 can read an address for Server 101 from memory or a server public key table 103*t*, and the address can comprise a DNS name or an IP address for Server 101, or also a URL. The DNS name or IP address for Server 101 could be recorded or received along with the key Ss 101*a*, or device 103 could conduct a DNS query to obtain the address. At step 202, device 103 can also read device public key 121 which can include PK.Device 121*a* or derive device public key PK.Device 121*a* or PK-PQC.Device 121*a*' using parameters 2 121*b*. Step 202 can also include device 103 reading a network identity 102*i* from a server public key table 103*t*. Device 103 can also read a device static secret key sd 103*d* recorded in nonvolatile memory or a TRE 113 in a step 201*c*.

At step 202, device 103 can also read the set of cryptographic parameters A 104 and select a subset of the cryptographic parameters A 104*a* in order to establish communications with Server 101. An exemplary subset of cryptographic parameters A 104*a* in a step 202 can comprise a member of the set the cryptographic parameters A 104 depicted and described in connection with FIG. 2*g* below (e.g. one line of values in cryptographic parameters A 104 in FIG. 2*g* below). In step 202, device 103 can select a subset of cryptographic parameters A 104*a* that is compatible with all of device static secret key sd 103*d* and server static public key 101*a*. The subset of cryptographic parameters A 104*a* that are compatible with public keys could also be recorded in nonvolatile memory in device 103 along with server public key 101*a* at the time the public keys were recorded or received by device 103, which could include during a step 201*c* above.

A step 203 can comprise device 103 also using a random number generator in order to output a random number random1 203*a* for use in subsequent communications with Server 101. Although the term "random number" is described herein, a random number could comprise a pseudo random number processed by device 103 using information entropy available to device 103. In exemplary embodiments, a device 103 can use data from transducers in order to obtain information entropy and generate random numbers in a step 203. The random number random1 203*a* processed in a step 203 could contain the number of bits specified by a selected subset of cryptographic parameters A 104. Random number 203*a* generated or derived by a device 103 in a step 203 could also comprise a "number used once" (nonce).

Device 103 can then conduct a key pair generation step 103*x* as depicted and described in connection with FIG. 1*a* above using the selected subset of cryptographic parameters A 104*a*. The parameters A 104 could specify a named curve and parameters to derive a device ephemeral private key ed 103*b* and a device ephemeral public key Ed 103*a*. The device ephemeral private key ed 103*b* can comprise a random number generated using a random number generator, including a second random number generated in a step 203 above. The device ephemeral public key Ed 103*a* could be derived using (i) ECC point multiplication from a base point G for a named curve within cryptographic parameters A 104*a* and (ii) the device ephemeral private key ed 103*b*. Other possibilities exist as well for the steps a device 103 can use in a key pair generation step 103*x* without departing from the scope of the present invention.

Device 103 can then conduct a step 204 to calculate a value for use with an ECDH key exchange algorithm 207, where the calculation of the value for a step 204 is depicted and described in connection with a step 204 in FIG. 2*c* below. In summary, device 103 can calculate the sum of device static private key sd 103*d* and the derived device ephemeral private key ed 103*b*, and then calculate the modulus of the sum using the value n, where the value n can be defined or determined based upon the selected set of cryptographic parameters A 104*a*. As contemplated herein a "secret key" for use with a PKI key pair can also be referred to as a "private key". As one exemplary embodiment, when using the named elliptic curve secp128r1, the value of n can comprise the decimal number:

340282366762482138443322565580356624661

Device 103 can then conduct a step 205 to select the server static public key Ss 101*a* from memory, which could include a server public key table 103*t*. The row or data to use from the server public key table 103*t* could be determined by device 103 using a device program 103*m*, such as selecting a network 102 and then a server identity 101*i* and server static public key Ss 101*a* from table 103*t*. Other possibilities exist as well for the logic or steps that device 103 uses to select server static public key Ss 101*a* and server identity 101*i* in a step 205 without departing from the scope of the present invention. Device 103 can then conduct an ECDH key exchange step 206 using the value from a step 204 and the server static public key from step 205 in order to calculate a symmetric ciphering key K1 206*a*. The calculation of a symmetric ciphering key K1 206*a* using a key exchange step 206 is depicted and described in connection with FIG. 2*c* below. Note that a MAC key 206*b* can also be calculated using a key exchange step 206 as well by device 103.

Device 103 can then conduct an encryption step 209 using (i) the symmetric ciphering key 206*a* and (ii) data to encrypt which can include the random number random1 203*a*, the device public key 131, and a network identity 102*i*. In exemplary embodiments, and as depicted for an encryption step 209 in FIG. 2*c* below, the plaintext for encryption step 209 can comprise the device public key 121 (which can be PK.Device 121*a* and parameters B 121*b*), the random number random1 203*a* from a step 203, and the network identity 102*i*. The use of an encryption step 209 by device 103 is depicted and described in connection with FIG. 2*c* below. The output of an encryption step 209 can comprise ciphertext 209*b*.

Device 103 can then use (i) the recorded address for Server 101 (possibly from a table 103*t*) and (ii) connectivity to IP network 107 from step 202 to send a message 297 to Server 101. Message 297 and other messages contemplated herein can be sent as either TCP or UDP messages, and other possibilities exist as well for the formatting and transfer of messages without departing from the scope of the present invention. In exemplary embodiments, device 103 both uses an IP address and port number to send message 297 to Server 101 and then also the same IP address and port number to listen for responses or messages from Server 101. In this manner, device 103 can send a message 297 and receive a response message 225 or 229*a* below through an IP network 107, where intermediate nodes on the IP network 107 may conduct network address translation (NAT) routing.

In exemplary embodiments, message 297 from device 103 can include ciphertext 209*b* and the device ephemeral public key Ed 103*a* derived in the step 101*x* above. Although not depicted in FIG. 2*a*, message 297 can also include the selected subset of cryptographic parameters A 104*a* associated with key Ed 103*a* (and also related keys such as keys 101*a*, 103*c*, and 103*d*). Message 297 may also include identity information for device 103 or PKI keys recorded by device 103, which could comprise any of (i) a device identity of ID.device 103*i* as plaintext, (ii) an obfuscated device identity comprising ID.device-obfuscated 1030, or (iii) a secure hash value over device static public key Sd 101*d*, which could be H (Sd) 250. Message 297 could be with different information for Server 101 to identify device 103 or process message 297, and some different embodiments for message 297 are depicted and described in connection with FIG. 2*b* below. The selection of identifying information for device 103 to use with message 297 could be written to device during a step 201*c* above and determined by a device program 103*m* or operating system 103*h*.

In a message 297, device identity of ID.device 103*i* can be omitted from plaintext in a message 297, and rather device identity of ID.device 103*i* could be included within the ciphertext 209*b*. For embodiments where message 297 optionally excluded device identity ID.device 103*i* in plaintext, then an identity for device 103*i* can optionally be transmitted in later messages. Omitting ID.device 103*i* as plaintext from message 297 can increase security for message 297 since an identity for device 103 would not be sent as plaintext in a message 297. Or, the obfuscated identity for device 103*i* comprising ID.device-obfuscated 1030 could be sent as plaintext in message 297 instead of ID.device 103*i*. The use of an obfuscated identity of ID-device-obfuscated 1030 by a Server 101 to map to an ID.device 103*i* is depicted and described in connection with FIG. 2*f* below. An obfuscated identity for device 103*i* comprising ID.device-obfuscated 1030 could be an apparently random string or number that is uniquely associated with device 103. As depicted in FIG. 2*a*, message 297 could also optionally include in ciphertext 209*b* an identity for network 102 comprising Network ID 102*i*, such that Server 101 can determine which network 102 should be associated with message 297. Note that an identity for network 102 of Network ID 102*i* can be omitted from a message 297, and Server 101 can select a network 102 from other means in a step 212 below.

As depicted in FIG. 2*a*, message 297 could also optionally include a secure hash value 250 such as, but not limited to, SHA-256 of the device static public key Sd 103*c*. Device 103 can send the hash value 250 of key Sd 103*c* to Server 101, in order for Server 101 to identify both (i) which device static public key Sd 103*c* Server 101 should utilize for subsequent operations (such as steps 218 below) and (ii) which of a plurality of possible networks 102 could be used to forward the device public key PK.Device 121 within message 297, which is further described for a Server 101 below. For embodiments where a secure hash value 250 of key Sd 103*c* is included in a message 297 (or other identifying information for device 103 such as ID.device 103*i* or ID.device-obfuscated 1030), then the message 297 could optionally exclude the selected subset of cryptographic parameters A 104*a*. Server 101 receiving the message 297 with the hash value 250 (or device identity information) could determine the set of parameters A 104*a* to use for key Ed 103*a* based on the hash value 250 (or device identity information). Server 101 can use device identity information in a message 297 to select the set of cryptographic parameters A 104*a* from a server database 103*d* in order to obtain the set of cryptographic parameters A 104*a* to process message 297.

As one exemplary embodiment, and as depicted in FIG. 2*f* below, a server database 101*d* could maintain mapping of hash values 250 and parameters A 104*a*, and Server 101 could conduct a query of database 101*d* using the received hash value 250 in order to select the parameters A 104*a* for further processing and cryptographic operations with key Ed 103*a*. Or, in an exemplary embodiment cryptographic parameters A 104*a* as transmitted via an IP network 107 or private network 107*a* could comprise the secure hash 250 of key 103*c*, where the secure hash 250 of key 103*c* can specify which subset of a set of cryptographic parameters A 104 to utilize for subsequent ECC cryptographic operations. Although not depicted in FIG. 2*a*, but depicted for a message 297*a* in FIG. 2*b* below, a message 297 could also include the selected set of cryptographic parameters A 104*a* as plaintext.

Server 101 can receive message 297 and conduct steps in order to process the message. At step 210*a*, Server 101 can determine the subset of cryptographic parameters A 104*a* to use with received device ephemeral public key Ed 103*a*. Parameters A 104*a* could be determined in a step 210*a* in several different ways. If parameters A 104*a* are included in message 297, then parameters A 104*a* could be read from message 297. Or, Server 101 could use identifying information for device 103 from message 297 in order to select parameters A 104*a*, such as any of (i) ID.device 103*i*, (ii) ID.device-obfuscated 1030, or (iii) a secure hash value for a public key unique to device 103 such as H (Sd) 250. Note that for embodiments where device 103 uses a unique key 101*v* from FIG. 1*d*, then the hash value for the unique key comprising a H (Ss) could be sent in message 297, and Server 101 could query a server database 101*d* in order to look up the cryptographic parameters A 104*a* (and PKI keys for device 103) associated with the hash value of the unique key 101*v*. In another exemplary embodiment, a Server 101 with a server DNS name or URL or listening to a server IP: port number could use a selected subset of cryptographic parameters A 104*a*, and the receipt of a key Ed 103*a* in a message 297 with the DNS name or URL or server IP: port number could specify the use of parameters A 104*a* with the received key Ed 103*a*.

At step 210*b*, Server 101 can conduct a public key validation step on received device ephemeral public key Ed 103*a* in order to ensure the key is valid and on the selected curve in parameters A 104*a*. Step 210*b* by Server 101 can comprise conducting the steps for an ECC Full Public-Key Validation Routine in section 5.6.2.3.2 of FIPS publication SP 800-56A (revision 2) for the received device ephemeral public key Ed 103*a*. Alternatively, step 210*b* can comprise Server 101 performing the steps ECC Partial Public-Key Validation Routine in section 5.6.2.3.3 of the same FIPS publication. Other example steps within a public key validation step 210*b* can comprise (i) verifying the public key is not at the "point of infinity", and (ii) verifying the coordinates of the point for the public key are in the range [0, p−1], where p is the prime defining the finite field. Other possibilities exist as well for evaluating and validating a received public key is cryptographically secure in a public key validation step 210*b*, without departing from the scope of the present invention.

In exemplary embodiments, a public key validation step 210*b* can include verifying that a point or public key received in a message such as message 297 is not reused, and in this manner a step 210*b* can be used to reject messages 297 that could comprise a "replay attack". Server 101 could record in a server database 101*d* a list of received device ephemeral public keys Ed 103*a* for an extended period of time, and if any key Ed 103*a* is reused then message 297 could be rejected. The period of time could be suitable for the application used by device 103 and Server 101, including potentially a period of years. As contemplated in the present invention a device 103, Server 101, and network 102 can conduct a public key validation step 210*b* each time a public key or a point on an elliptic curve is received.

At step 211 and after a key validation step 210*b*, Server 101 can query a server database 101*d* using identifying information for device 103 from message 297 in order to select a device static public key Sd 103*c*. As mentioned above, message 297 can include identifying information for device 103, such as, but not limited to (i) device identity ID.device 103*i*, (ii) obfuscated device identity ID.device-obfuscated 1030, or (iii) a secure hash value over the device static public key comprising H (Sd) 250. Server database 101*d* can record the depicted identity information for device 103, as well as other information required for conducting the steps contemplated herein, before Server 101 receives message 297. The data for device 103 in a server database 101*d* could be received from any of a device manufacturer, a device distributor, or a device owner, and other possibilities exist as well. In exemplary embodiments, a step 201*b* could include a device registration process, where the data for a device 103 in a server database 101*d* could be recorded in a secure and authenticated manner. Exemplary values and data for a server database 101*d* recording data for a plurality of devices 103 are depicted and described in connection with FIG. 2*f* below. At step 211, Server 101 can record in server database 101*d* the values device ephemeral public key Ed 103*a*, and other plaintext data received in a message 297, including information to identity device 103*i*.

At step 211, Server 101 can also record the originating source IP address and port number 297*p* (depicted in FIG. 2*f* below) for message 297, in order to subsequently transmit a message 225 or 229*a* below back to the same IP address and port number 297*p*. In this manner, message 225 or 229*a* below can be routed by intermediate nodes on IP network 107 back to the source IP address and port number used by device 103 to transmit message 297. In other words, (i) the destination IP address and port number of a subsequent message 225 or 229*a* from Server 101 to device 103 can comprise the source IP address and port number 297*p* (depicted in FIG. 2*f* below) received in message 299, and (ii) the source IP address and port number 297*p* (depicted in FIG. 2*f* below) from message 297 can be recorded in a server database 101*d*. In this manner, communications with device 103 can be tracked or identified by Server 101 during the brief period of time of the message flows in FIG. 2*a* using the source IP address and port number from message 297. A step 211 can also comprise Server 101 generating a random number random2 211*a* using parameters A 104*a* (e.g. using random length 104*g*) for use in subsequent messages with device 103 and network 102.

At step 212, Server 101 can use identifying information in message 297 for device 103 to select a server static private key ss 101*b* from a server database 101*d*, which can correspond to the server static public key Ss 101*a* recorded and used by device 103. For embodiments where Server 101 does not record or operate with server static private key ss 101*b*, such as embodiments depicted and described in connection with FIG. 4 below, then a step 212 by Server 101 could comprise Server 101 selecting (a) a key server 101*w* that records or operates with server static private key ss 101*b* using (b) identifying information for device 103 in message 297.

After selecting the server static private key ss 101*b* in a step 212, Server 101 can then conduct an ECC point addition step 213. ECC point addition 213 can use (i) the recorded device static public key Sd 103*c* selected by Server 101 in a step 211 and (ii) the received device ephemeral public key Ed 103*a* from a message 297. The output from an ECC point addition step 213 can comprise a point X0 213*a*. Exemplary details for conducting an ECC point addition step 213 are depicted and described for a Server 101 in FIG. 2*d* below.

Server 101 can conduct a series of steps in order to derive a mutually shared and authenticated key exchange with device 103. As contemplated herein, the authentication performed between Server 101 and device 103 can comprise a "two-way" authentication or mutual authentication between the nodes. Authentication of Server 101 with device 103 can be provided by a key exchange, since server 101 conducts an ECDH key exchange using at least, in part, the server static private key ss 101*b*, and device static public key Sd 103*c* (in addition to a device ephemeral public key Ed 103*a*). Authentication of device 103 with Server 101 or network 102 can be provided by the equivalent key exchange conducted by device 103, since device 103 conducts an ECDH key exchange using at least, in part, the device static private key sd 103*d* and the server static public key Ss 101*a* (in addition to a device ephemeral private key ed 103*b*).

The "two-way" authentication or mutual authentication from the ECDH key exchange is also not completed until both sides have successfully used a symmetric ciphering key derived from the ECDH key exchange by each side. In other words, a device 103 that successfully mutually derives a symmetric ciphering key with a Server 101 can authenticate that Server 101 has access to the server static private key ss 101*b*. A Server 101 that successfully mutually derives a symmetric ciphering key with device 103 can authenticate that device 103 records or operates with device static private key sd 103*d*. One benefit of the system depicted in FIG. 2*a* is that the device public key PK.Device 121 and the network public key PK.Network 131 are sent in both an encrypted and mutually authenticated manner. Another benefit is that mutual authentication is derived with reasonable forward secrecy, since the symmetric ciphering key is derived with an ephemeral key. Although a quantum computer may feasibly be able to convert a ECC public key into a private key within the next two decades, the time, cost, and power for converting a single ephemeral public key would be uneconomical since the static public keys used with the ephemeral public key in the ECDH key exchanges depicted in FIG. 2*c* and FIG. 2*d* are unknown to an attacker and reasonably protected (e.g. not transmitted between device 103 and server 101 as plaintext via IP network 107).

Another benefit of the mutually authenticated key exchange in FIG. 2*a* is that mutual authentication is provided without requiring the use of additional, significant cryptographic steps for a complete PKI-based ECDSA scheme (or similar digital signature scheme), where a certificate may need to be authenticated to a root certificate by a device, and the multiple layers of authentication can require significant processing time, such as an exemplary 10 seconds for a device with a constrained processing resources such as 16 bits data widths running at 50 MHz, while the ECDH key exchanges contemplated herein could require less than 1 second for the same processor. Further, the mutually authenticated key exchange in FIG. 2*a* does not depend on a digital signature and verification of the digital signature up through a root certificate. A root certificate and certificates in general are at greater risks of having the public keys broken (e.g. the private key determined) by quantum computers in a timeframe of 2025-2030, due to their high value and also long lifetimes of many years.

After conducting a point addition step 213, Server 101 can then conduct an ECDH key exchange step 218, where a key exchange step 218 is depicted and described in connection with FIG. 2*d* below. In summary, Server 101 can input (i) the point X0 213*a* from a step 213 in FIG. 2*d* and (ii) the server static private key ss 101*b* into an ECDH key exchange algorithm 207 (in FIG. 2*d*) in order to mutually derive a shared secret X3 207*a* with device 103. Shared secret X3 207*a* can be input into a key derivation function in order to output a symmetric ciphering key K1 206*a* and also optionally a MAC key.

Server 101 can then conduct a decryption step 221 (*i*) using the key K1 206*a* output from key exchange step 218 in order to (ii) convert ciphertext 209*b* from message 297 into plaintext. Exemplary details for a decryption step 221 for Server 101 are depicted and described in connection with FIG. 2*e* below. Server 101 can then record, operate with, and store data read from the decrypted plaintext in message 297. The decrypted plaintext data could include the random number random1 203*a* generated by device 103 in a step 203, device public key PK.Device 121, and network identity 102*i*. Other data could read from a ciphertext 209*b* as well, such as sensor 103*f* data for device 103, and other possibilities exist as well without departing from the scope of the present invention. Decryption step 221 could also comprise using a MAC key from a key exchange step 218 in order to verify message integrity. In exemplary embodiments, random1 203*a* could also comprise a transaction ID. Or, in some exemplary embodiments another pseudo-random number or transaction ID could also be sent as plaintext in a message 297 in order for device 103 and server 101 to track the message flows.

Server 101 can then send network 102 a message 214 through the secure session 201*a*. Message 214 can include an identity for Server 101 comprising ID.Server 101*i*, an identity for device 103 such as ID.device 103*i* (selected from server database 103*d* or received in message 297), device public key 121, and random number random1 203*a*, which could comprise a transaction ID. As depicted in FIG. 1*a*, device public key 121 can comprise both (i) the numeric value for PK.Device 121*a* and (ii) a set of cryptographic parameters B 121*b* associated with PK.Device 121*a*. Network 102 could receive message 214 and process the data.

At step 215, network 102 could conduct a key validation step over the received device public key 121. The key validation step could be equivalent or similar to the key validation step 210*a* described above for server 101, except using cryptographic algorithms associated with cryptographic parameters B 121*b* and PK.Device 121*a*. A key validation step 215 over device public key 121 could confirm that device public key 121 is valid and is properly supported by cryptographic parameters B 121*b* and cryptographic parameters B 131*b*. A key validation step 215 can use an indirect key validation such as proposed by Fujisaki and Okamoto in the paper "Secure Integration of Asymmetric and Symmetric Encryption Schemes" from 1999, which is herein incorporated by reference in its entirety. The key validation step 215 by network 102 can include the steps and calculations for "Key-Generation" and "Encryption" in FIG. 1 of Fujisaki and Okamoto, which can generate a key validation string 215*d* with a temporary network public key ("pk" from FIG. 1) and a ciphertext 215*c* (with c1 and c2 from "Encryption" in FIG. 1). In summary, ciphertext 215*c* can be over at least a value m 215*e* calculated or derived by network 102 in a key validation step 215.

An indirect key validation step for step 215 can include network 102 deriving a random number 215*a*, inputting the random number into a private key derivation function to generate a temporary network private key, generating a temporary network public key using (i) the parameters 121*b* for the device public key 121 and the PKI scheme (e.g. Isogeny-based key agreement or Lattice-based key agreement, or code-based key agreement, etc), conducting a key exchange with the temporary network public key and the device public key 121 in order to generate a temporary shared secret, and inputting the temporary shared secret into a key derivation function equivalent to KDF 208 in order to derive a symmetric ciphering key Kt 215*b*, and encrypting the random number 215*a* with the symmetric ciphering key Kt 215*b* to create the ciphertext 215*c*.

Network 102 could create a key validation string 215*d*, where the key validation string 215*d* includes a combination of ciphertext 215*c* and the temporary network public key. Network 102 could then include key validation string 215*d* in a response to Server 101 below in a message 217, where Server 101 could include the key validation string 215*d* in a message 225 or 229*a* to device 103. A message 217 could also include data pertaining to the key validation step 215 by network 102 in the key validation string 215*d* which could include a temporary network public key and a ciphertext using (i) the temporary network public key and (ii) the device public key 121 from a step 215 by network 102 (where device public key 121 was received in message 214). Note that in some exemplary embodiments the use of a key validation step 215 could be omitted since both network 102 and device 103 can securely rely upon server 101 based on the keys in a system 100 and communications in a system 200*a* and other systems herein.

Network 102 could then conduct a step 216 to record data from message 214 in a database 102*d*. Exemplary data recorded in database 102*d* is depicted and described in connection with FIG. 2*g* below. Network 102 could record the device identity 103*i*, PK.Device 121*a* and parameters B 121*b* in database 102*d*. Further, network 102 in a step 216 could select or derive a network public key 131 along with a network private key SK.Network 132 for use with device 103 and also store or record the data in database 102*d*. For some embodiments, network 102 does not need to derive network public key 131 and the corresponding network private key SK.Network 132 in a step 216, but rather could use a network public key 131 and corresponding network private key SK.Network 132 that was previously recorded or stored by a network 102 before the receipt of a message 214. Step 216 could also include network 102 generating a random number random3 216*a*, and random3 216*a* for device 103 with device identity 103*i* could also be stored in database 102*d*. Note that for some embodiments, a step 216 could optionally omit the creation and use of a random number random3 216*a*.

Network 102 could then send server 101 a message 217 through secure session 201*a*, where message 217 includes identity information for device 103 such as ID.Device 103*i*, the selected or derived network public key 131. Note network public key 131 could include both the numeric value for a network public key of PK.Network 131*a* and also a set of cryptographic parameters B 131*b*. Network public key 131 in a message 217 could also be formatted or structured according to an X.509 certificate, where the certificate is signed by a certificate authority. Message 217 could also include a random number, which could be random3 216*a*. Or, the random number in message 217 could be a different random number generated by server 101 such as random1 203*a*. Message 217 could include more than one random number, such as both random1 203*a* (from message 214) and random3 216*a* generated by network 102 in a step 216.

Server 101 could then receive message 217 and process the message. In step 222, server 101 could use the identity information in message 217 such as a device identity 103*i* to store the network public key 131 (e.g. PK.Network 131*a* and cryptographic parameters B 131*b*) and random3 216*a* in the server database 101*d*. The information or data in a message 217 in FIG. 2*a* depicted as "Identity" could comprise numbers or values to unique identify message 217 with a device 103, such as any of the identity information in a message 297 above, or may also include a transaction ID, where Server 101 could send the transaction ID along with message 214 to network 102 above. Server 101 can then conduct an encryption step 223 in order to create a ciphertext 2 223*b* for transmission of data back to device 103. Exemplary details for an encryption step 223 are depicted and described in connection with FIG. 2*e* below, and an encryption step 223 can use a symmetric ciphering algorithm. The symmetric ciphering algorithm and encryption key for a step 223 can comprise the same or equivalent symmetric ciphering algorithm and encryption key K1 206*a* used for a decryption step 221 above. Note that server 101 can previously derive key K1 206*a* above in a key exchange step 218.

The plaintext for encryption into ciphertext2 223*b* in a step 223 can include the random numbers random1 203*a*, random2 211*a*, and random3 216*a*. Other data could be included in plaintext for ciphertext2 223*b* such as, but not limited to, the network public key 131 received for device 103 from network 102 in message 217. In addition, the plaintext in a step 223*b* can include key validation string 215*d*, where key validation string 215*d* includes a temporary network public key and a ciphertext. The ciphertext in a key validation string 215*d* can be created in a step 215 above using the temporary network public key and the device public key 121. As depicted in FIG. 2*a*, the collection of steps beginning with step 201*a* through step 223 can comprise a step 224. A step 224 is depicted in other figures below such as FIG. 6*a*, FIG. 6*b*, etc. as a condensed or consolidated summary of the individual steps.

Server 101 and device 103 can then select either Option A comprising a step 228 or an Option B comprising a step 229. Option A can include sending the ciphertext2 223*b* to device 103. Option B can comprise (i) server 103 deriving an ephemeral PKI key pair comprising server ephemeral private key es 101*s* and server ephemeral public key Es 101*p*, then (ii) conducting at least an key exchange step 301 from FIG. 3*a* below in order to derive a shared secret X4 305 from FIG. 3*a* below, and then (iii) encrypting a ciphertext with data for device 103 using at least the shared secret X4 305. The next six paragraphs for FIG. 2*a* describe Server 101 and device 103 selecting and conducting an Option A comprising a step 228. The final 10 paragraphs for this description of FIG. 2*a* describe Server 101 and device 103 selecting and conducting an Option B comprising a step 229. The determination by Server 101 and device 103 for using an Option A and a step 228 or an Option B and a step 229 could be specified in a set of cryptographic parameters A 104, such as with a server encryption option 104*h*, which is depicted and described for cryptographic parameters A 104 in FIG. 2*g* below. Or, the selection and use of an Option A or an Option B could be specified by a device program 103*m* or device OS 103*h* and a server OS 101*g*, and other possibilities exist as well for the selection and agreement for using an Option A or an Option B by device 103 and server 101.

For Option A in a step 228, Server 101 can then send device 103 a message 225, where the destination IP address and port number of message 225 can comprise the source IP address and port number 297*p* received with message 297 and recorded in server database 101*d*. Message 225 can include the device ephemeral public key Ed 103*a* and the ciphertext2 223*b*, as depicted in FIG. 2*a*. Message 225 can include identifying information for device 103, such as ID.device 103*i* or ID.device-obfuscated 1030, or a hash value of a unique key 101*v* received in a message 297 (e.g. H (Ss)), or a hash value over the device static public key (e.g. H (Sd)). The value "K1 206*a*" depicted in FIG. 2*a* is shown to illustrated that the derived symmetric ciphering key 206*a* from a key derivation step 219 is used to encrypt ciphertext 2 223*b* (indicated by the brackets shown in FIG. 2*a* for message 225), and the value K1 206*a* is not normally transmitted in message 225. This same depiction of encryption keys with ciphertext applies to other figures and messages herein, where the depiction of a key and the use of brackets with the ciphertext shows the key used to encrypt the ciphertext and does not suggest the symmetric ciphering key is transmitted as plaintext along with the ciphertext. Note that key Ed 103*a* can be omitted from message 225 since device 103 records the data. However, key Ed 103*a* can be useful to confirm that Server 101 is sending message 225 to the correct device 103, and other benefits exist as well. A message 225 could also include data pertaining to the key validation step 227, such as a key validation string 215*d* which could include a temporary network public key and a ciphertext using the temporary network public key from a step 215 by network 102

Continuing with Option A in a step 228, device 103 can then receive message 225 and conduct a series of steps in order to process the message. Device 103 can perform a decryption step 221*a* in order to decrypt ciphertext2 223*b* from message 225 using the derived symmetric ciphering key K1 206*a* from the key exchange step 206 for device 103. A decryption step 221*a* for device 103 can be equivalent to a decryption step 221 for Server 101, except (i) the ciphertext 2 223*b* is input into decryption step 221*a* for device 103, and (ii) ciphertext 209*b* is input into decryption step 221 for server 103. A decryption step 221 is also depicted and described in connection with FIG. 2*e* below. Device 103 can then read the plaintext within ciphertext 2 223*b*, as well as verifying message integrity of ciphertext 2 223*b* using a MAC key 206*b* derived in a step 206. Note that for all ciphertext values transmitted in FIG. 2*a*, the ciphertext can include a MAC code and an initialization vector. Or, the MAC code and the initialization vector could be omitted from being transmitted with the ciphertext from some symmetric ciphering algorithms such as AES-SIV (e.g. IETF RFC 5297) or "synthetic initialization vectors". Device 103 in a decryption step 221*a* can read the plaintext values of random number random1 203*a*, random number random3 216*a* and network public key 131 from Server 101. The plaintext data could include other data from Server 101 or originated from network 102 as well.

Continuing with Option A in a step 226, device 103 can determine if decryption step 221*a* was successful, such as the ability to read plaintext data including the random number random1 203*a* send by device 103 in a message 297. If decryption step 221*a* fails, such as not being able to read plaintext data or failure to verify a MAC code, then device 103 could determine that Server 101 and/or network 102 did not properly record and operate with the private keys corresponding to the selected public keys from a server public key table 103*t*. For example, decryption step 221*a* could fail if Server 101 did not record the private key ss 101*b* corresponding to the public key Ss 101*a* recorded by device 103. Other reasons could exist as well for the failure of a decryption step 221*a*, such as a server 101 uniquely terminating service for device 103.

Continuing with Option A in a step 228, upon determining that decryption step 221*a* failed in a step 226, device 103 could then select another server and corresponding keys from a server public key table 103*t*. For example, and as depicted in FIG. 1*d*, a device 103-1 could use the first row as a primary communications path and method for communicating with network 102. If decryption step 221*a* fails, then at a step 226 then device 103 could select a second row or "backup" to the primary, such as selecting the keys and data for row 2 in FIG. 1*d* for device 103-1. Device 103 could then return to the top of a step 224 and conduct a step 203 and subsequent steps again using the data from the second row of a server public key table 103*t*. In this manner, a server 101 could deprecate a row of keys in a server public key table 103*t* (via creating a failure of device 103 for decryption step 221*a*), while device 103 could continue to communicate with new or different keys. Other reasons could exist for device 103 to use a different row of keys in a server public key table 103*t* as well, such as receiving an instruction for server 101.

Concluding with Option A in a step 228, at step 227, device 103 can process the plaintext data from message 225, which was decrypted by step 221*a*. Device 103 can determine if random number random1 203*a* received in message 225 equals random number 203*a* previously sent in a message 297 above. Device 103 can (i) record or store random number random3 216*a* from Server 101 (shown for encryption step 223 in FIG. 2*e* below) and (ii) use the random number random3 216*a* for subsequent messages to network 102 after receiving message 225. Device 103 in a step 227 could also process network public key 131 such as storing the numeric value PK.Network 131*a* and verifying the associated parameters B 131*b* for network public key 131 are compatible with device public key 121.

For a step 227*a*, device 103 can also conduct a key validation step for PK.Network 131*a* using parameters B 131*b*. The key validation step by device 103 in a step 227*a* can correspond to the key validation steps depicted and described for a step 215 by a network 102. A step 227*b* can include device 103 completing the key validation step 215 initiated by network 102. Data used for key validation in step 227*b* can include key validation string 215*d*, which can include at least the temporary network public key and ciphertext 215*c*. In summary, a key validation step 227 can include the steps for "Decryption" by device 103 using the steps and computations for a "Decryption" in FIG. 1 of the paper "Secure Integration of Asymmetric and Symmetric Encryption Schemes" by Fujisaki and Okamoto, which is herein incorporated by reference. A key validation step 227*b* can also output the value "m" from FIG. 1 of Fujisaki and Okamoto, where the value m can be 227*c*. Device 103 can then send server 101 and network 102 the value m 227*c* in subsequent messages, to prove the successful completion of a key validation step 227*b*. Note that device 103 could omit a step 227*b* in a step 228 or step 229, and separately conduct the step 227*b* in a system 500 depicted in FIG. 5*a* below.

As depicted in FIG. 2*a*, the collection of steps and messages comprising message 225 and steps 221*a*, 226, and 227 could collectively comprise a step 228 for device 103 and Server 101. Although not depicted in FIG. 2*a*, device 103 could then send server 101 a subsequent message such as an encrypted signal of "OK" or other data equivalent to the "OK" message 229*a* below using symmetric ciphering key K1 206*a*. An "OK" message could also include a ciphertext over a random number received from server 101 such as random2 211*a* or random3 216*a*, such that server 101 can verify that device 103 can properly encrypt data sent from server 101, thereby further confirming authentication of device 103 with server 101 and making a system 200*a* more robust to replay attacks. The "OK" message 229*a* could also include the value m 227*c* calculated by device 103 in key validation step 227*b*.

As depicted in FIG. 2*a*, Server 101 and device 103 could alternatively select an Option B, which could comprise a step 229 in order for Server 101 to encrypt data and for device 103 to decrypt data. Option B can include server 101 deriving an ephemeral PKI key pair comprising server ephemeral private key es 101*s* and server ephemeral public key Es 101*p* using a set of cryptographic parameters A 104*a*. An additional security benefit for conducting Option B versus Option A is that Option B can be both more resistant to replay attacks and also further enhance forward secrecy. In other words, if device 103 uses the device ephemeral PKI key pair including device ephemeral public key Ed to receive more than one message 225 (where message 225 does not include the use of a server ephemeral public key Es 101*p*), then message 225 is more prone to a replay attack. There are additional security benefits for using Option B and a step 229 for sending data including network pubic key 131 from a Server 101 to a device 103.

Within Option B and a step 229, Server 101 can use the server ephemeral PKI key pair to conduct a key exchange step 301. A key exchange step 301 is depicted and described in connection with FIG. 3*a* below. Server 103 can then conduct a key exchange step 301 using (i) the server ephemeral private key es 101*s* and (ii) the server static private key ss 101*b*, and (iii) the received device ephemeral public key Ed 103*a* from message 297 and (iv) the device static public key Sd 103*c*, where device static public key 103*c* was selected in a step 210*b* described in FIG. 2*a* above. In summary, server 103 can use the previously calculated value of point X0 213*a* from a step 213, where point X0 213*a* comprises an ECC point addition value for device ephemeral public key Ed 103*a* and the device static public key Sd 103*c*. Server 101 can calculate the modulus of the sum (using the value n to determine the modulus) of the server ephemeral private key es 101*s* and the server static private key ss 101*b*. Server 101 can input the point X0 and the modulus into an ECDH key exchange algorithm 207 using the selected set of cryptographic parameters A 104*a* in order to calculate a shared secret X4 305. Note that device 103 can calculate the point or shared secret X4 305 using a key exchange step 304, which is also depicted and described in connection with FIG. 3*b* below. Server 103 can conduct a key derivation function 208 in order to calculate a symmetric ciphering key K2 301*k* and optionally a MAC key 301*j*.

Continuing with Option B and a step 229, upon the conclusion of a step 301 in order to conduct a key exchange using at least the server ephemeral private key es 101*s*, Server 101 can then conduct an encryption step 302 in order to create a ciphertext3 302*b* for transmission of data including network public key 131 back to device 103. Exemplary details for an encryption step 302 are depicted and described in connection with FIG. 3*c* below, and an encryption step 302 can use a symmetric ciphering algorithm. The symmetric ciphering algorithm and encryption key for a step 302 can comprise the same or equivalent symmetric ciphering algorithm and encryption key used for a decryption step 221 above (but with a different key K2 instead of key K1). Data could be included in plaintext for an encryption step 302 such as, but not limited to ciphertext 2 223*b* above from a step 223 above. Additional data could be included in the plaintext for an encryption step 302, including a response or instruction for device 103 from server 101. The output or result from an encryption step 302 using a key K2 301*k* from a key exchange step 301*a* or 301*b* can comprise ciphertext 3 302*b*.

For Option B in a step 229, Server 101 can then send device 103 a message 229*a*, where the destination IP address and port number of message 229*a* can comprise the source IP address and port number 297*p* received with message 297 and recorded in server database 101*d*. Message 229*a* can include the server ephemeral public key Es 101*p* and the ciphertext 3 302*b*, as depicted in FIG. 2*a*. Message 229*b* can include identifying information for device 103, such as ID.device 103*i* or ID.device-obfuscated 1030, or a hash value of a unique key 101*v* received in a message 297. The value "K2 301*k*" depicted in FIG. 2*a* is shown to illustrate that the derived symmetric ciphering key K2 from a key exchange step 301 is used to encrypt ciphertext 3 302*b* (indicated by the brackets shown in FIG. 2*a* for message 229*a*), and the value K2 301*k* is not normally transmitted in message 229*a*. Note that key Ed 103*a* can be omitted from message 229*a* since device 103 records the data. However, key Ed 103*a* can also optionally be included as plaintext in a message 229*a* and be useful for device 103 to confirm that Server 101 is sending message 229*a* to the correct device 103, and other benefits exist as well. A message 229*a* could also include data pertaining to the key validation step 227, such as a key validation string 215*d* which could include a temporary network public key and a ciphertext using the temporary network public key from a step 215 by network 102. Although depicted as within ciphertext2 223*b*, string 215*d* could be external to ciphertext 2 223*b* in message 229*a* in some exemplary embodiments.

Continuing with Option B in a step 229, device 103 can then receive message 229*a* and conduct a series of steps in order to process the message. Device 103 can conduct a key validation step 210*d* on the server ephemeral public key Es 101*p* received in message 229*a*. Key validation step 210*d* can be equivalent to a key validation step 210*a* used by server 103, including verifying that key Es 101*p* has not been reused. Device 103 could record all keys Es 101*p* in a database in nonvolatile memory 103*s* in device 103, and if key Es 101*p* is reused then message 229*a* could be rejected or device 103 could request a new, different key Es 101*p* be used for a message 229*a*.

Continuing with Option B in a step 229, device 103 can determine or select the use of a key exchange step 304 based on a sever encryption option 104*h* in a set of cryptographic parameters A 104. For a key exchange step 304, device 103 can conduct the series of steps depicted and described be a key exchange step 304 in FIG. 3*b* below. Device 103 can use a step 204 to calculate a value for use with an ECDH key exchange algorithm 207, where the calculation of the value from a step 204 was also described for a key exchange step 206 above. In summary, device 103 can calculate the sum of device static private key sd 103*d* and the derived device ephemeral private key ed 103*b*, and then calculate the modulus of the sum using the value n, where the value n can be defined or determined based upon the selected set of cryptographic parameters A 104*a*. Device 103 can conduct an ECC point addition operation over the server ephemeral public key 101*p* and the server static public key Ss 101*a* to determine a point. Device 103 can input the modulus from step 204 and the point into an ECDH key exchange algorithm 207 in order to calculate a shared secret X4 305. Device 103 can use a key derivation function with the shared secret to calculate at least a symmetric ciphering key K2 301*k* and optionally also a MAC key 301*j*

Continuing with Option B in a step 229, device 103 can perform a decryption step 306 in order to decrypt ciphertext 3 302*b* from message 229*a* using the derived symmetric ciphering key K2 301*k* from the key exchange step 304*a* for device 103. A decryption step 306 is also depicted and described in connection with FIG. 3*c* below. Device 103 can then read the plaintext within ciphertext 3 302*b*, as well as verifying message integrity of ciphertext 3 302*b* using a MAC key 301*j* from the key exchange step 304. Note that for some embodiments, the plaintext within ciphertext 3 302*b* can comprise a second ciphertext 2 223*b* (e.g. an initial plaintext 223*a* that has been "double encrypted"), and device 103 could conduct a second decryption step equivalent to step 221 with key K1 206*a* in order to remove the second layer of encryption. For embodiments where ciphertext3 302*b* includes a second ciphertext2 223*b*, device 103 can perform a decryption step 221*a* in order to read plaintext2 223*a*. The decryption step 221*a* in a step 229 can be equivalent to the decryption step 221*a* depicted and described above for Option A with a step 225. After a decryption step 306 and/or decryption step 221*a*, device 103 can read the plaintext values for plaintext 2 223*a*, which can include random numbers random1 203*a*, random2 211*a*, random3 216*a*, network public key 131, and key validation string 215*d*. Key validation string 215*d* can include a temporary network public key and a ciphertext, where the ciphertext was created using the device public key 121 from a message 297.

Or, for other embodiments, the use of a ciphertext 2 223*b* inside ciphertext 3 302*b* could be omitted, and ciphertext 302*b* could include plaintext values of random1 203*a*, random2 211*a*, random3 216*a*, and network public key 131, where these values are depicted in FIG. 2*a*. In other words, for embodiments where ciphertext3 302*b* does not include "double encrypted" data, the plaintext for ciphertext 302*b* from decryption step 306 could include plaintext2 223*a* with network public key 131. For this embodiment where the use of ciphertext 2 223*b* and "double encryption" is omitted, then device 103 after a decryption step 306 can read the plaintext values of random number random1 203*a*, random number random2 211*a*, random 3 216*a*, network public key 131 from Server 101 (without requiring the subsequent decryption step 221*a*). The plaintext data could include other data from Server 101 or network 102 as well.

Continuing with Option B in a step 226 after reading plaintext2 223*a* from a decryption step 306 (and also after decryption step 221*a* if ciphertext3 302*b* is "double encrypted"), device 103 can determine if decryption steps 306 and 221*a* was successful, such as the ability to read plaintext data including the random number random1 203*a* sent by device 103 in a message 297. Step 226 in a step 229 can be equivalent to a step 226 in a step 228 above. Device 103 can process the plaintext data from message 229*a*, which was decrypted by at least a step 306 (and potentially an additional step 221*a*). Device 103 can determine if random number random1 203*a* received in message 229*a* equals random number random1 203*a* previously sent in a message 297 above.

Device 103 can (i) record or store random number random2 211*a* from Server 101 and (ii) use the random number random2 211*a* for subsequent messages to Server 101 after receiving message 229*a*. Device 103 can store random number random3 216*a* for use with subsequent messages to network 102, such as messages depicted in FIG. 5*a* below. Device 103 can also conduct key validation steps 227*a* and 227*b* equivalent to key validation steps 227*a* and 227*b* above in a step 228, where the key validation step 227*a* are performed over the received, plaintext network public key 131. Key validation step 227*b* can be in response to the key validation string 215*d*, where device 103 conducts the equivalent of a key validation step 215 for the temporary network public key and ciphertext 215*c* in string 215*d* created using the temporary network public key and device public key 121*a* or 121*a*' and the set of cryptographic parameters 121*b*. Note that device 103 could omit a step 227*b* in a step 228 or step 229, and separately conduct the step 227*b* in a system 500 depicted in FIG. 5*a* below.

In exemplary embodiments, device 103 can send a message 229*b* to Server 101, where device 103 can prove the successful decryption of random number random2 211*a* (or another random number sent by server 101 in a message 229*a* such as random3 216*a*). Message 229*b* can also include the value m 227*c* output from a key validation step 227*b*. Device 103 can create a ciphertext4 by encrypting at least the random number random2 211*a* with symmetric ciphering key K2 301*k*, and the ciphertext4 can be included in a message 229*b*. Ciphertext4 can also include the value m 227*c* for embodiments that include a key validation step 227*b* by device 103. Message 229*b* could also include an "OK" signal that message 229*a* has been properly received and processed by device 103, including a successful key validation step 226.

In this manner, device 103 can be further securely authenticated with Server 101 (where the receipt and use of a random number random2 211*a* is more resistant to replay attacks than a message 297). Device 103 can (i) record random number random3 216*a* from Server 101 and (ii) use the random number random3 216*a* for subsequent messages to network 102 after receiving message 229*a*. A message 229*a* could also include data pertaining to the key validation step 227*a*, such as a string which could include a temporary device public key and a ciphertext using the temporary device public key from a step 227*a* by device 103. The key validation step 227*b* can also include the verification of string 215*d* received from server 101 and originated at network 102 as part of a key validation step 215 by network 102, where the verification includes value m 227*c*.

Server 101 can receive message 229*b* and decrypt ciphertext 4 using key K2 301*k* and read the plaintext value of random2 211*a*. Server 101 can verify that the received plaintext value of random2 211*a* from message 229*b* equals the sent value random2 211*a* in a message 229*a*. As mentioned above, another random number transmitted in ciphertext to device 103 by server 101 could also be used, such as random3 216*a*. Message 229*b* can include identity information for device 103 and also an "OK" signal that device 103 properly received and processed message 229*a*. Server 101 can then send network 102 a message 232 via secure session 201*a* with the identity of device 103 and the "OK" message, indicating to network 102 that device 103 (*i*) has securely received the network public key 131 and (ii) can use the network public key 131 in subsequent communication with network 102. Message 232 could also include a string regarding a key validation step 227*a* and the value m 227*c* for a key validation step 215 initiated by network 102. Network 102 can conduct a step 233 to store or record in a database 102*d* that device 103 can network public key 131 in subsequent communications between device 103 and network 102. Network 102 in a step 223 can compare the received value m 227*c* with the value m 215*e* from a step 215, and if the two values m are equal then the device public key 121 can be considered validated by network 102. For some embodiments, the values m 227*c* and 215*e* and corresponding key validation steps 215 and 227 could be omitted, and network 102 and device 103 can rely upon device public key 121 and network public key 131 being validated or proper based on the authentication between device 103 and server 101. As depicted in FIG. 2*a*, the collection of steps comprising messages 229*a* through 232 and steps 101*x* through 233 could collectively comprise a step 229 for device 103, Server 101, and network 102.

FIG. 2*b*

FIG. 2*b* is a simplified message flow diagram illustrating an exemplary messages transmitted from a device to a server, in accordance with exemplary embodiments. System 200*b* in FIG. 2*b* can be equivalent to system 200*a* in FIG. 2*a*. System 200*b* in FIG. 2*b* can include a device 103 and a Server 101. As depicted and described in connection with FIG. 2*a*, a message 297 transmitted from device 103 to Server 101 can comprise several different embodiments, including the use of different possible values for identification information for a device 103 in a message 297. FIG. 2*b* depicts different embodiments for a message 297 from a device. Although the message 297 may comprise different possible embodiments, a Server 101 and a network 102 can conduct the same or equivalent steps as depicted and described in connection with FIG. 2*a* in order to conduct a (i) step 224 and (ii) a step 228 or a step 229.

A first exemplary embodiment for a message 297 could include a message 297*a* for a step 224*a*. For message 297*a*, the message can include the depicted values of device ephemeral public key Ed 103*a*, ciphertext 209*b*, a digital signature 103*s*, and a selected set of cryptographic parameters A 104*a*. Note that identifying information for device 103 is omitted from plaintext a message 297*a*, but device identity comprise ID.device 103*i* is included in ciphertext 209*b* within message 297*a*. In this manner, device identity 103*i* can remain secured and not transmitted over IP network 107 in an insecure manner. For embodiments with message 297*a* and without identity information for device 103, then server static public key Ss 101*a* recorded by device 103 could comprise a shared key 101*z* as depicted and described in connection with FIG. 1*d*.

Server 101 could receive message 297*a* and conduct subsequent operations in a common manner for all devices 103 transmitting the same set of cryptographic parameters A 104*a*. For a message 297*a*, Server 101 in a step 224*a* utilizes a modified step 213, comprising a step 213*x*. For a step 213*x*, a device static public key Sd 103*c* cannot normally be selected by Server 101 since no identifying information for device 103 is received as plaintext in a message 297*a*. Consequently, a step 213*x* can comprise Server 101 omitting a key Sd 103*c* from a point addition operation 213*x* and in this embodiment point X0 213*a* can comprise the point Ed 103*a*. All subsequent operations by Server 101 and network 102 in a step 224*a* with point X0 213*a* could use point Ed 103*a* as the point X0 213*a*. Server 101 can derive key K1 206*a* using a key derivation step 218 (depicted in FIG. 2*d* below). Server 101 can then decrypt ciphertext 209*a* using key K1 206*a* with a decryption step 221. Server 101 can subsequently read the device identity ID.device 103*i* from the plaintext in ciphertext 209*a*.

Server 101 could conduct a key exchange step 218 using the same key ss 101*b* for all messages 297*a* received with a given set of cryptographic parameters A 104*a*. Note that for embodiments depicted in FIG. 2*b* with a step 224*a*, that decryption of ciphertext1 209*a* does not provide authentication for device 103, since device 103 has not demonstrated use and cryptographic operations with device static private key sd 103*d*. For a system 224*a*, other steps could be conducted in order to establish authentication for device 103 with Server 101 or network 102. As one example, device 103 could include a digital signature 103*s* with message 297*a*, and digital signature 103*s* could be over at least the key Ed 103*a*.

After reading device identity 103*i* from ciphertext 209*b* in a message 297*a*, Server 101 could select a device static public key Sd 103*c* from a database 101*d* and conduct a signature verification step 234 for the digital signature 103*s* in a message 297*a* using the selected device static public key Sd 103*c*. Upon successful verification of a digital signature 103*s* from a message 297*a* in a signature verification step 234, then device 103 could be considered authenticated with Server 101 and/or network 102. In this manner of including a digital signature 103*s* with message 297*a*, a device 103 can be authenticated with a Server 101 and/or a network 102 using a single message 297*a*. Note that the other steps and messages from FIG. 2*a* would be utilized as well, such as a step 210*b* to confirm that key Ed 103*a* is not retransmitted, and thus preventing replay attacks.

A second exemplary embodiment for a message 297 could include a message 297*b* for a step 224*b*. For message 297*b*, the message can include the depicted values of device ephemeral public key Ed 103*a*, a secure hash value over server static public key Ss 101*a* comprising H (Ss) 252, and ciphertext1 209*b*. For a step 224*b*, a device 103 could record server static public key Ss 101*a* in a server public key table 103*t* as a unique key 101*v*. Recording record server static public key Ss 101*a* in a server public key table 103*t* as a unique key 101*v* is depicted and described in connection with FIG. 1*d* above. Although H (Ss) 252 is depicted for a message 297*b* in FIG. 2*b*, a hash value for a different unique public key recorded by device 103 could be utilized as well or instead, such as a secure hash value H (Sd) 250 as depicted for a message 297 in FIG. 2*a*. For embodiments using H (Ss) for a message 297*b*, then the network static public key Ss 101*a* recorded by device 103 could also comprise a unique key 101*v* as depicted and described in connection with FIG. 1*d*.

Server 101 could receive message 297*b* and conduct steps to process the message. Server 101 could conduct a step 210*a* to select a set of cryptographic parameters A 104*a* for use with PKI keys such as Ed 103*a* from message 297*b*. Server 101 could conduct a step 210*b* to validate public key Ed 103*a* and also confirm that key Ed 103*a* is not reused. A step 212*b* in FIG. 2*b* can be equivalent to a step 212 in FIG. 2*a*, but with modifications for Server 101 to identify device 103. A step 212*b* could comprise Server 101 reading H (Ss) 252 and querying server database 101*d* as depicted in FIG. 2*f* below in order to obtain PKI keys for device 103 in order to conduct subsequent steps.

Since Ss 101*a* can comprise a unique key 101*v*, the hash value of H (Ss) 252 would also reasonably be a unique number or value for querying database 101*d* to obtain keys Sd 101*c*, Ss 101*a*, and also a network 102 for sending device public key 121 and obtaining network public key 131 for device 103. As contemplated herein, a hash value over a public key, such as H (Ss) 252 or H (Sd) 250 can reasonably be considered a unique number to identify a device 103, where unique public keys 101*v* are recorded in a device 103, as depicted and described in connection with FIG. 1*d*. After selecting keys Sd 101*c*, Ss 101*a*, and also a network 102 in a step 212*b*, Server 101 could then conduct the subsequent series of steps for Server 101 as depicted and described in connection with FIG. 2*a* with network 102 and also device 103. Other possibilities exist as well for a message 297 to include identifying information for device 103 with Server 101 without departing from the scope of the present invention.

FIG. 2*c*

FIG. 2*c* is a flow chart illustrating exemplary steps for conducting a key exchange using PKI keys in order to derive a shared secret key, and for using the derived shared secret key to encrypt data, in accordance with exemplary embodiments. Exemplary steps for a device 103 to mutually derive a shared secret X3 207*a* and symmetric key K1 206*a* with Server 101 can include or use a key exchange step 206. Exemplary steps in FIG. 2*c* for a device 103 to encrypt plaintext data using the mutually derived symmetric key K1 206*a* can use an encryption step 209. The use of the steps for a key exchange 206 and encryption 209 were also depicted and described in connection with FIG. 2*a* above. Note that steps in FIG. 2*c* and the steps in FIG. 2*d* below can share some algorithms and values, and the descriptions for the algorithms and values in FIG. 2*c* can be applicable for FIG. 2*d*. For example, the key exchange algorithm 207 in FIG. 2*c* can comprise an ECDH key exchange equivalent to key exchange algorithm 207 in FIG. 2*d* (but with different numbers input for the algorithm in the two different Figures). The set of parameters A 104*a* depicted and described in FIG. 2*c* can also be used in FIG. 2*d*.

The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

A device 103 can conduct a key exchange step 206. At step 206, device 103 can use a step 204 to calculate the sum of device static private key sd 103*d* and the derived device ephemeral private key ed 103*b*, and then calculate the modulus of the sum using the value n, where the value n can be defined or determined based upon the selected set of cryptographic parameters A 104*a*. Exemplary data for a step 204 will be shown below. Device 103 can then a step 205 to select server static public key Ss 101*a* Exemplary data for a step 205 will also be shown below. The combination of output from step 204 and step 205 can be input can be input into an ECDH key exchange algorithm 207 using parameters A 104*a* in order to calculate the shared secret X3 207*a*.

A summary of ECDH as a key exchange algorithm 207 is included in the Wikipedia article titled "Elliptic Curve Diffie-Hellman" from Mar. 9, 2018, which is herein incorporated by reference. An exemplary embodiment of key exchange algorithm 207 could comprise a "One-Pass Diffie-Hellman, C(1, 1, ECC CDH)" algorithm as described in section 6.2.2.2 on page 81 of the National Institute of Standards and Technology (NIST) document "NIST SP 800-56A, Recommendation for Pair-Wise Key Establishment Schemes Using Discrete Logarithm Cryptography" from March 2007 which is hereby incorporated by reference its entirety. Other key exchange algorithms in NIST SP 800-56A could be utilized as well for a key exchange algorithm 207 in FIG. 2*a* and FIG. 2*d* without departing from the scope of the present invention. Example calculations for an ECDH key exchange for a key exchange algorithm 207 are shown below. In exemplary embodiments, the key exchange algorithm 207 used by Server 101 can comprise the equivalent key exchange algorithm 207 used by device 103 in a key exchange step 206 in FIG. 2*c*.

Other algorithms to derive a secret keys using public keys and private keys may also be utilized in a key exchange algorithm 207, such as, but not limited to, the American National Standards Institute (ANSI) standard X-9.63. Cryptographic parameters A 104*a* can also include information, values, or settings for conducting (i) a key exchange algorithm 207 in step 206 and (ii) a key derivation function 208 in order to derive a commonly shared symmetric encryption key K1 206*a*. As contemplated herein, the terms "selected set of cryptographic parameters A 104*a*" and "cryptographic parameters A 104*a*", and "parameters A 104*a*" can be equivalent, and can also comprise a subset of exemplary cryptographic parameters depicted and described in connection with FIG. 1*a* and FIG. 2*g* below.

Parameters A 104*a* input into a key exchange algorithm 207 can include a time-to-live for a key K1 206*a* that is derived, a supported point formats extension, where the supported point formats extension could comprise uncompressed, compressed prime, or "compressed char2" formats, as specified in ANSI X-9.62 and related IETF standards. In other words, (i) an ECC keys input into a key exchange algorithm 207 and (ii) secret keys output from key exchange algorithm 207 may have several different formats and a set of parameters A 104*a* can be useful to specify the format.

Exemplary data and numbers can be provided to demonstrate the calculations for (i) step 205, (ii) step 204 to combine private keys, and (iii) key exchange step 206. Parameters A 104*a* can comprise the elliptic of "secp128r1" with key lengths of 128 bit long keys. Although the exemplary numbers for keys, points, and a named curve are provided, other values for keys, points, and named ECC curves could be utilized as well. Other example named curves and parameters A 104*a* could comprise curve from IETF RFC 5480.

The device ephemeral private key ed 103*b* can comprise the exemplary following number, and can be recorded in device 103 after a key pair generation step 103*x* from FIG. 1*a* and FIG. 2*a* above:

330225223315954763304200471137380016969

The device static private key sd 103*d* can comprise the exemplary following number, and can be recorded in device 103 before key pair generation step 103*x*, such as during device manufacturing or device distribution:

209122135174501513062984245101620420255

Note that the private keys ed 103*b* and sd 103*d* above correspond to the public keys Ed 103*a* and Sd 103*c* stored and used by a server 101, with exemplary numeric values below in FIG. 2*d* below for the example numbers given above. The server static public key Ss 101*a* can comprise the following exemplary values with X and Y numbers (or "coordinates") of:

X: 319423829544285733939020505180109110187

Y: 242179187598040154943588326777101424083

Device 103 can conduct step 204 to calculate the sum of device static private key sd 103*d* and the derived device ephemeral private key ed 103*b*, and then calculate the modulus of the sum using the value n, where the value n can be defined or determined based upon the selected set of cryptographic parameters A 104*a*. For the exemplary values for keys above, when using the named elliptic curve secp128r1, the value of n can comprise the decimal number:

340282366762482138443322565580356624661

Consequently the modulus of (i) the sum of private keys sd 103*d* and ed 103*b* and (ii) the value n above will equal the following number for a step 204:

199064991727974137923862150658643812563

An ECDH key exchange algorithm 207 in key exchange step 206 can input (i) the public key 101*a* and (ii) the value calculated from a step 204 (e.g. (sd 103*d*+ed 103*b*) mod n). The output of ECDH key exchange algorithm 207 in key exchange step 206 can be the secret value or point X3 207*a*. Note that the secret X3 207*a* as derived by device 103 in a key exchange step 206 equals or is the same numeric value as the secret X3 207*a* derived by Server 101 in a key derivation step 218 below. An exemplary number or value for secret X3 207*a* calculated by device 103 using a key exchange step 206 using the above exemplary numeric values for ed 101*b*, sd 103*d*, and Ss 101*a* would be:

X: 283470377637256529257925581999478035172

Y: 117395441238388206677723127104680679540

Although a key exchange 206 step in FIG. 2*c* depicts device 103 conducting a step 205 and step 204, the same secret X3 207*a* can be derived using the keys Ss 101*a*, ed 103*b*, and sd 103*d* through alternative but equivalent calculations. For example a key exchange step could comprise (i) two separate ECDH key exchanges and then (ii) a point addition from the resulting points from the two separate ECDH key exchanges in order to calculate or derive the shared secret point X3 207*a*. The two separate ECDH key exchanges in a step 206 could comprise (Ss 101*aed 103***b*) and (Ss 101*asd 103***d*). X3 207*a* as calculated above using the same values and parameters for keys would also equal (Ss 101*aed 103***b*)+ (Ss 101*asd 103***d*), where the "+" represents an elliptic curve point addition operation.

For a key exchange step 206, derived shared secret key X3 207*a* can be input into a key derivation function 208 where the key derivation function 208 can be equivalent to the key derivation function 208 depicted and described in connection with FIG. 2*d* below for a key exchange step 218. Note that for key derivation steps in the present invention, the X coordinate of a derived shared secret can be taken or used as input into the key derivation function 208. The output of a key derivation function 208 can comprise both (i) a symmetric ciphering key K1 206*a* and (ii) a MAC key 206*b*. MAC key 206*b* can be used with a symmetric ciphering algorithm in order to generate a MAC code, such that the other party using the same key K1 206*a* and MAC key 206*b* can process the ciphertext and calculate the same MAC code in order to verify message integrity. The use of key K1 206*a* and MAC key 206*b* are described in connection with encryption step 209 above in FIG. 2*c* and decryption step 221 below in FIG. 2*e*.

Key derivation function 208 can use (i) a secure hash algorithm such as, but not limited to, SHA-256, SHA-384, SHA-3, SHA-512, etc. and (ii) additional values such as a text string combined with secret X3 207*a*. The specification of a secure hash algorithm and the text string for use with a key derivation function 208 could be commonly shared between Server 101 and device 103 by commonly shared parameters A 104*a*. The output of a secure hash algorithm within a key derivation function 208 could have a subset of bits selected or possibly a secure hash expanded in order to obtain the number of bits required for a symmetric key with a symmetric ciphering algorithm, such as key K1 206*a* and a set of symmetric ciphering parameters 104*f*. A key derivation function (KDF) 208 could comprise a KDF compatible with or specified by ANSI standards for "X9.63 Key Derivation Function". Other possibilities exist for a key derivation function 208 to convert a secret X3 207*a* into a symmetric ciphering key K1 206*a* and a MAC key 206*b* without departing from the scope of the present invention. As contemplated in the present invention, although an ECC public key such as secret X3 207*a* can comprise a coordinate with an X value and a Y value, in exemplary embodiments a single number comprising the X value can be selected and input into a key derivation function 208.

Device 103 can conduct an encryption step 209, where the use for an encryption step 209 is depicted and described in connection with FIG. 2*a* above. Plaintext 209*a* in a step 209 can comprise the random number random1 203*a* from device 103, the device public key 121, and a network identity 102*i*. Device public key 121 can include a number or value for the device public key of PK.Device 121*a* and parameters B 121*b* associated with PK.Device 121*a*. The plaintext for use in an encryption step 209 can be selected by device 103 in a step 231 as described above in FIG. 2*a*. Other or different exemplary data could be included as plaintext 209*a* in an encryption step 209. The symmetric ciphering key for encryption step 209 can comprise symmetric key K1 206*a* from a key derivation step 208 in step 206 above and a MAC key 206*b* can be input into a symmetric ciphering algorithm 230 as well. Encryption step 209 in FIG. 2*c* and decryption step 221 in FIG. 2*e* can use a common symmetric ciphering algorithm 230, which could comprise the Advanced Encryption Standard with Synthetic Initialization Vectors (AES-SIV) (and deciphering algorithm) also with a common set of symmetric ciphering parameters A 104*f* from a set of cryptographic parameters A 104. Note that MAC key 206*b* can also be input into symmetric ciphering algorithm 230 along with an initialization vector 209*i*.

Other or different symmetric ciphering algorithms 230 could be utilized as well, such as, but not limited to such as AES, Triple Data Encryption Standard (3DES), Blowfish, or related algorithms. Symmetric ciphering parameters A 104*f* can also specify the use of a block chaining mode such as cipher block chaining (CBC), counter mode (CTR), or Galois/Counter mode (GCM) and other possibilities exist as well. In addition, symmetric ciphering parameters A 104*f* could specify a mode for message authentication, which could comprise a CMAC mode as specified in NIST publication SP-800-38B. In some exemplary embodiments, a symmetric ciphering algorithm 230 can comprise the AES-SIV algorithm as specified in IETF RFC 5297. The output from an encryption step 209 using a symmetric ciphering algorithm 230 and the depicted values input can be ciphertext 209*b*, as depicted in FIG. 2*c*. The output from an encryption step 209 using a symmetric ciphering algorithm 230 and the depicted values input can also include MAC code 209*m*, where MAC code 209*m* can be used by the receiving party with the MAC key 206*b* to verify message integrity. The initialization vector 209*i* can be sent along with the ciphertext 209*b* in order for both sides to commonly initiate block chaining.

FIG. 2*d*

FIG. 2*d* is a flow chart illustrating exemplary steps for conducting an ECC point addition operation to combine public keys, for conducting a key exchange using PKI keys in order to derive shared secrets, and for conducting a key derivation function, in accordance with exemplary embodiments. Server 101 can conduct an ECC point addition operation 213 to calculate or obtain point X0 213*a*. Server 101 can then conduct a key derivation function 218 using secret keys ss 101*b* and point X0 213*a* in order to derive a symmetric ciphering key K1 206*a*. Using the methods and ECC PKI keys described in the present invention, a device 103 can also derive the same symmetric ciphering key K1 206*a* as depicted and described below for a key exchange step 206 in FIG. 2*c* above.

Server 101 can conduct an ECC point addition step 213 in order to combine (i) device static public key Sd 103*c* recorded in a server database 101*d* with (ii) device ephemeral public key Ed 103*a* received in a message 297. Exemplary calculations for an ECC point addition 213 can comprise the calculations shown for point addition in the Wikipedia article for "Elliptic Curve Point Multiplication" dated May 15, 2018, which is herein incorporated by reference in its entirety. The output of an ECC point addition step 213 can comprise the point or value X0 213*a*. An ECC point addition step 213 can be performed with a named elliptic curve from a selected set of parameters A 104*a*, where Server 101 selects parameters A 104*a* in a step 210*a*.

The key exchange algorithm 207 could utilize or use a Diffie Hellman key exchange (DH), an Elliptic Curve Diffie Hellman key exchange (ECDH), and other possibilities exist as well without departing from the scope of the present invention. A key exchange algorithm 207 can support either PKI keys based on elliptic curves or RSA algorithms, although support of elliptic curves may be preferred in some exemplary embodiments due to their shorter key lengths and lower computational processing requirements. In exemplary embodiments, value X3 207*a* can comprise a point on an elliptic curve, where the equation and parameters for the elliptic curve can be specified in parameters A 104*a*. Exemplary numeric values for using a key exchange algorithm 207 using a set of parameters A 104*a* are depicted and described below. Note that shared secret symmetric ciphering key K1 206*a* can be also mutually derived by device 103, where device 103 uses the key exchange step 206 depicted and described in connection with FIG. 2*c* above.

Exemplary data and numbers can be provided to demonstrate the calculations for (i) ECC point addition step 213, (ii) key exchange algorithm 207. Parameters A 104*a* can comprise the elliptic of "secp128r1" with key lengths of 128 bit long keys. Although the exemplary numbers for keys, points, and a named curve are provided, other values for keys, points, and named ECC curves could be utilized as well.

The server static private key ss 101*b* can comprise the exemplary following number, and can be recorded by Server 101:

246768250079261690512638148137618184294

Note that the corresponding public key Ss 101*a* is recorded by device 103 and used in step 206 above in FIG. 2*c*. The device ephemeral public key Ed 103*a* can comprise the following exemplary values with X and Y numbers (or "coordinates") of:

X: 239356896551017663412726672579682627094

Y: 209570745539973929739512070961905802250

Note that the above device ephemeral public key Ed 103*a* corresponds to the device ephemeral private key ed 103*b* above from FIG. 2*c*. The device static public key Sd 103*c* can comprise the following exemplary values with X and Y numbers (or "coordinates") of:

X: 203473426612520506812902270038827201196

Y: 64318327833120582836973711848343026891

ECC point addition step 213 by Server 101 can combine the device static public key Sd 103*c* and the device ephemeral public key Ed 103*a* in order to output the following value for point X0 213*a*:

X: 59121922812458579600446751790662160796

Y: 304934509235778268978955867170200917057

Key exchange step 218 for an ECDH algorithm key exchange 207 by Server 101 can input the point X0 213*a* from a step 213 above and the server static private key ss 101*b* (both with numbers above) in order to calculate a secret X3 207*a*. An exemplary number or value for key X3 207*a* from the values above using parameters A 104*a* can be:

X: 283470377637256529257925581999478035172

Y: 117395441238388206677723127104680679540

Note that the same numeric value for key X3 207*a* can also be derived by device 103 from a key exchange step 206 above using ECDH key exchange algorithm 207. In addition, although X3 207*a* is depicted in FIG. 2*d* as calculated from X0 207*ass 101***b*, X3 207*a* could be calculated as the same number above using two ECDH key exchanges and conducting a point addition over the results of the two ECDH key exchanges. In other words, key X3 207*a* could also be calculated as (Sd 103*css 101***b*)+ (Ed 103*css 101***b*), where the "+" represents an elliptic curve point addition operation.

After the ECDH key exchange algorithm step 207, server 101 can input the shared secret key X3 207*a* into a key derivation function 208. The key derivation function 208 can utilize or be the same key derivation function 208 used by a device 103 in a step 206 above. The output of a key derivation function 208 can comprise both (i) a symmetric ciphering key K1 206*a* and (ii) a MAC key 206*b*. MAC key 206*b* can be used with a symmetric ciphering algorithm in order to generate a MAC code 209*m*, such that the other party using the same key K1 206*a* and MAC key 206*b* can process the ciphertext and calculate the same MAC code 209*m* in order to verify message integrity. In exemplary embodiments, the MAC code 209*m* can be transmitted as plaintext metadata along with the ciphertext resulting from an encryption step using a MAC key.

FIG. 2*e*

Figure 2E:
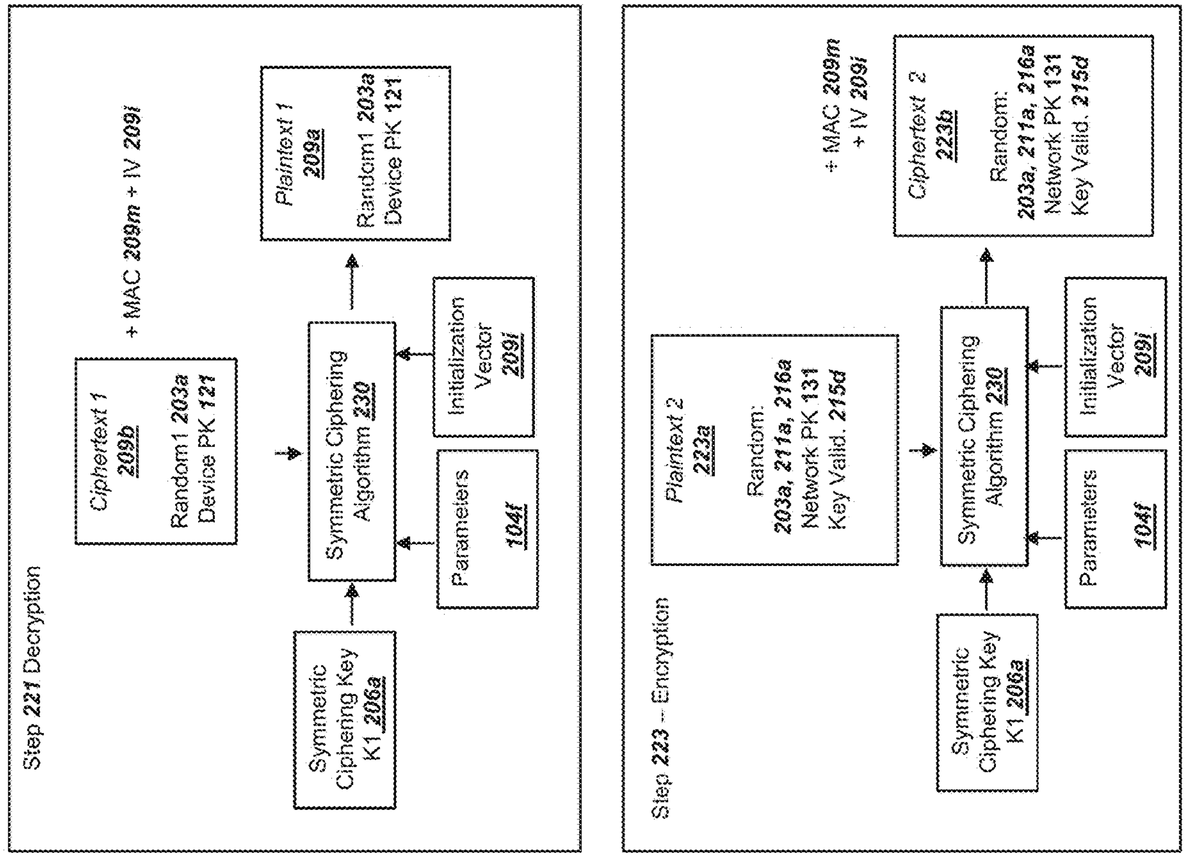
FIG. 2*e* is a flow chart illustrating exemplary steps for using a derived shared secret ciphering key to encrypt and decrypt data, in accordance with exemplary embodiments.

FIG. 2*e* is a flow chart illustrating exemplary steps for using a derived shared secret ciphering key to encrypt and decrypt data, in accordance with exemplary embodiments. A decryption step 221 can be performed by Server 101, and an encryption step 223 can be performed by Server 101. The use of a decryption step 221 by Server 101 and an encryption step 223 by Server 101 was depicted and described in connection with FIG. 2*a* above, and additional exemplary details are provided herein in FIG. 2*e*. A decryption 221 step converts the ciphertext 209*b* received in a message 297 from device 103 in FIG. 2*a* into plaintext 209*a*. Decryption step 221 can utilize a symmetric ciphering algorithm 230 for decryption, which could comprise the same algorithm used in symmetric ciphering algorithm 230 in a step 209 from FIG. 2*c*, except the algorithm being used for decryption in step 221 instead of encryption in step 209.

Note that the equivalent values are input into symmetric ciphering algorithm 230 for decryption in step 221 as symmetric encryption algorithm 230 above for encryption in step 209, such as symmetric ciphering key K1 206*a* and parameters A 104*f* in order to convert ciphertext 209*b* back into plaintext 209*a*. Additional data input into symmetric ciphering algorithm 230 in step 221 or step 229 can include an initialization vector 209*i* and MAC code 206*m*. Initialization vector 209*i* and MAC code 206*m* which could be sent along with ciphertext 209*b* in message 297. MAC key 206*b* could be input into symmetric ciphering algorithm 230 as well, in order to calculate the MAC code 209*m*. The calculated MAC code 209*m* could be compared to the received MAC code 209*m*, where equal values to the calculated MAC code 209*m* and the received MAC code 209*m* can indicate that ciphertext 209*b* was received with message integrity (e.g. no bit errors or modifications to ciphertext 209*b* during transmission).

Server 103 can the read and process plaintext 209*a* after a decryption step 221. The plaintext 209*a* as read by device 103 can include (i) random number random1 203*a* generated by device 103 in a step 203 and device public key 121. Plaintext 209*a* could also include other data or information from device 103 for Server 101 and/or network 102 for use with an application managing the communications between device 103 and Server 101, such as data from a sensor 103*f*. In exemplary embodiments, the successful decryption of a ciphertext into a plaintext using decryption algorithm 230 in decryption step 221 can comprise an authentication of the device 103, since successful decryption by Server 101 can only take place when the device 103 has access to device static private key sd 103*d*. Note that a key validation step 210*a* could previously check that key Ed 103*a* is not reused for device 103 and server 101, and thus a secure authentication of device 103 assumes that Ed 103*a* has not been reused (e.g. not replayed). Or, additional steps such as those depicted in a step 229 could be used to more fully authenticate device 103.

A successful decryption of ciphertext 209*b* can also include the use of MAC key 206*b* to calculate MAC code 209*m*, as described in the paragraph above. In other words, only the nodes could mutually derive key K1 206*a* and MAC key 206*b* in FIG. 2*c* and FIG. 2*d* by (i) device 103 recording private key sd 103*d* and (ii) Server 101 securely receiving and recording the corresponding device static public key Sd 103*c*. Thus, data that is successfully encrypted by the device 103 and decrypted by the Server 101 using key K1 206*a* and/or MAC key 206*b* would confirm the device 103 is authenticated with Server 101. The authentication of device 103 through a successful decryption step 221 can also mean that device public key 121 can be trusted (on the basis of device 103 proving successful use of device static secret key sd 103*d*) and forwarded to a network 102 in a secure manner.

Server 101 can also conduct an encryption step 223, where the use for an encryption step 223 is depicted and described in connection with FIG. 2*a* above. Plaintext2 223*a* in a step 223 can include the (i) random number random1 203*a* from device 103 from message 297 decrypted from ciphertext 209*a* by decryption step 221 above, (ii) random number random2 211*a* from Server 101 using step 211, (iii) random number random3 216*a* from network 102 in a message 214, and (iv) network public key 131. Note that server 101 could receive the random number random3 216*a* and network public key 131 from network 102 in a message 217 as depicted in FIG. 2*a* above. Although not depicted in FIG. 2*e*, an encryption step 223 could also include a plaintext response where a plaintext response could represent data for device 103 from Server 101 in response to data received in message 297. The symmetric ciphering key for encryption step 223 can comprise (a) the keys symmetric key K1 206*a* and MAC key 206*b* from a key derivation step 208 in step 218 by Server 101 in FIG. 2*d* above input into (b) a symmetric ciphering algorithm 230 with parameters A 104*f*.

Encryption step 209 in FIG. 2*c* and decryption step 221 in FIG. 2*e* and encryption step 223 in FIG. 2*e* can use a common symmetric ciphering algorithm 230. Note that MAC key 206*b* can also be input into symmetric ciphering algorithm 230 along with an initialization vector 209*i*. The output from a symmetric ciphering algorithm 230 in an encryption step 223 can comprise ciphertext 2 223*b* and MAC code 209*m*. MAC code 209*m* and initialization vector 209*i* can be sent along with ciphertext 2 223*b* in a message 225 (or message 229*a*) in FIG. 2*a*. Note that an initialization vector 209*i* for encryption step 223 can comprise a different number than initialization vector 209*i* for encryption step 209 and decryption step 221.

As depicted and described in connection with FIG. 2*a*, device 103 can also conduct a decryption step 221*a*, which can comprise the exemplary decryption step 221 for Server 101 but with different plaintext and ciphertext data. A decryption step 221*a* by device 103 can use ciphertext2 223*b* received in a message 225 (or message 229*a*). Thus, when device 103 conducts decryption step 221*a* using symmetric encryption key K1 206*a* and/or MAC key 206*b*, the ciphertext and plaintext will comprise different values than those depicted for a decryption step 221 depicted in FIG. 2*d*. A decryption step 221*a* can convert ciphertext2 223*b* into a plaintext2 223*a*.

In exemplary embodiments, the successful decryption of a ciphertext2 223*b* into a plaintext 223*a* by device 103 using decryption algorithm 230 in decryption step 221*a* can comprise an authentication of the Server 101, since successful decryption by device 103 can only take place when the Server 101 has access to server static private key ss 101*b*. A successful decryption of ciphertext2 223*b* by device 103 in a step 221*a* can also include the use of MAC key 206*b* to calculate MAC code 209*m*, as described for a decryption step 221 by Server 101.

In other words, only the nodes could mutually derive key K1 206*a* and MAC key 206*b* in FIG. 2*c* and FIG. 2*d* by (i) Server 101 recording and using private keys ss 101*b* and device static public key Sd 103*c* and (ii) device 103 recording the corresponding server static public key Ss 101*a* and device static private key sd 103*d*. Thus, data that is successfully encrypted by the Server 101 in step 223 and decrypted by the device 103 in a decryption step 221*a* using key K1 206*a* would confirm the Server 101 is authenticated with device 103 (where the ciphertext can include a unique random number generated by both device 103 and server 101).

FIG. 2*f*

FIG. 2*f* is an illustration of an exemplary server database, in accordance with exemplary embodiments. A server database 101*d* depicted and described above in connection with system 100 and system 200*a* or 200*b* can record data for Server 101 to work with a plurality of devices 103 and at least one network 102. A server database 101*d* could record at least one set of values, keys, and/or numbers for each device 103 in a plurality of devices 103. Other possibilities exist as well for the organization, tables, and recorded data within a server database 101*d* as depicted in FIG. 2*f* without departing from the scope of the present invention. Data within server database 101*d* could be encrypted using a symmetric key. Although system 100 and system 200*a* depict a server database 101*d* as operating or recorded within a Server 101, a server database 101*d* could comprise a separate server communicating with Server 101 via a secure session 201*a* or a secure network 107*a*. Further, a server database 101*d*, when operating or recorded in a separate server than Server 101, then server database 101*d* could contain electrical components equivalent to a Server 101 depicted and described in connection with FIG. 1*c*.

Server database 101*d* can record or store values for devices 103 in multiple tables or a single table. FIG. 2*f* depicts two exemplary tables comprising a PKI key table 101*da* and a device table 101*db*. Exemplary data for a PKI key table 101*da* could include an obfuscated device identity 1030, a device identity 103*i*, a secure hash value for the device static public key Sd 103*c* comprising H (Sd) 250, a secure hash value for the server static public key Ss 101*a* used by a device 103, which could comprise H (Ss) 252, a device static public key Sd 103*c*, a device ephemeral public key Ed 103*a*, a server static public key Ss 101*a*, a server static private key ss 101*b*, a network public key 131, an identity of network 102 for device 103 which could comprise network identity 102*i*, server ephemeral public key Es 101*p*, and server ephemeral private key es 101*s*. Note that the identity of network 102 could identify which network 102 receives device public key 121, such as the network identity 102*i* received by server 101 from device 103 in a message 297. For embodiments where Server 101 does not derive a server ephemeral PKI key pair using a step 101*x* (such as for "Option A" in FIG. 2*a*), then Server 101 could omit recording or storing in a PKI key table 101*da* in a server database 101*d* the values for a server static public key Es 101*p* and server static private key es 101*s*, as depicted for row 2 and row 3 of PKI key table 101*da* in FIG. 2*f*. Although not depicted in FIG. 2*f*, a PKI key table 104*da* could also store the device public key 121.

Exemplary data for a device tables 101*da* in a server database 101*d* can include a device identity 103*i*, random number 203*a* (depicted as "Random 1"), a selected set of cryptographic parameters A 104*a*, a source IP address and port number 297*p* received in message 297, a random number random2 211*a* (depicted as "Random 2"), random number random3 216*a* from network 102 in message 217, ECC point values or secrets for X0 213*a* and X3 207*a*, derived symmetric ciphering key K1 206*a*, and derived symmetric ciphering key K2 301*k*.

In exemplary embodiments, the values depicted in (a) the first row of both PKI key table 101*da* and device table 101*db* in a server database 101*d* could comprise (b) data recorded by a Server 101 for a device 103 while conducting the series of steps for a step 224 and step 229 depicted and described in connection with FIG. 2*a* above with a first device 103. The values depicted in the second row of both PKI key table 101*da* and device table 101*db* in a server database 101*d* could comprise data recorded by a Server 101 while conducting the series of steps for a step 224 and step 228 depicted and described in connection with FIG. 2*a* above with a second device 103, etc.

In exemplary embodiments for a server database 101*d*, a first device 103 could send Server 101 a first value for device ephemeral public key Ed 103*a*, and the first value is depicted in FIG. 2*f* as "103a-1" in table 101*da*. Since Server 101 could communicate with a plurality of devices 103, the second row in the depicted table 101*da* could comprise data for the equivalent steps conducted with a second device 103, such as recording a second value for device ephemeral public key Ed 103*a* for the second device. The second value for device ephemeral public key Ed 103*a* with the second device 103 is depicted in FIG. 2*d* as "103a-2".

Equivalent notations for other keys or values are applicable as well in a server database 101*d*, such as table 101*db* in server database 101*d* recording a first point X0 213*a* depicted as "213a-1" for a first device 103, and then recording a second point X0 213*a* depicted as "213a-2" for a second device. Thus, as depicted a server database 101*d* can record and operate with a plurality of different values for a key, where each set of values are utilized by a different device. Server 101 could keep track of TCP IP addresses and port numbers associated with different devices 103 for conducting the steps in FIG. 2*a* by the source IP: port number 297*p*, such as recording IP: port number 297*p* as a source IP: port number from a message 297 from a device 103, and then using the same IP: port number 297*p* as a destination IP: port number for a message 225 or message 229*a* in FIG. 2*a*.

In some exemplary embodiments, a message 297 can include a secure hash value H (Sd) 250, as described for a message 297 in FIG. 2*a* above. The receipt of a secure hash value H (Sd) 250 could be mapped to or associated with a network 102 via a network identity 102*i*, where the mapping of H (Sd) 250 to network identity 102*i* could be recorded in a server database 101*d*. For these embodiments, Server 101 could conduct a query in a step 212 of server database 101*d* using the received H (Sd) 250 in a message 297 in order to select a network 102 with network identity 102*i* in order to send the message 214 to network 102. In this manner, Server 101 can communicate with a plurality of different networks 102, and the destination of a message 214 (or network 102) can be selected by the value H (Sd) 250 or other information received in message 297 to uniquely identify device 103 (such as device identity 103*i*). In other words, for some embodiments message 297 could omit a network identity 102*i* and server 101 could determine the correct network identity 102*i* for sending a received device public key 121 based on data stored in a server database 102*d*, such as storing a value for network identity 102*i*, where the value for network identity 102*i* was received by server 101 before device 103 sends message 297. Other values could be used for a query step 212 from FIG. 2*a* as well in order to determine a network 102 to use for sending message 214.

In other words, for a plurality of different devices 103 communicating with a Server 101, a first subset of devices 103 could record and use a first network 102 with a first network identity 102*i*, and a second subset of devices 103 could record and use a second network 102 with a second network identity 102*i*. By receiving a value or identifier of device 103 in message 297 (which could comprise ID.device 103*i*, or ID.device-obfuscated 1030 or a hash value for a unique key 101*v* as depicted in FIG. 1*d*), Server 101 could use the identifying information or identifying value for device 103 depicted for a server database 101*d* to select or identify the correct network 102 from a step 212 in order to (i) send a message 214 and (ii) receive the correct network public key 131 for the device 103, where server 101 subsequently sends device 103 the network public key 131 in a ciphertext2 223*b*.

In another exemplary embodiment, an identity for network 102 (such as network identity 102*i*) could be selected or determined by Server 101 using the selected set of cryptographic parameters A 104*a* received in message 297*a* from FIG. 2*b* and recorded in a database 101*d*. For these embodiments, a first selected set of cryptographic parameters A 104*a* could be associated with a first network 102 (and first network identity 102*i*) and a second set of cryptographic parameters A 104*a* could be associated with a second network 102 (and second network identity 102*i*). Other possibilities exist as well for a server database 101*d* to record data in order to select a network 102 for sending message 214 with device public key 121 and device identity 101*i* based on data received in message 297, without departing from the scope of the present invention.

In a server database 101*d*, although separate values are depicted for some data, such as values "102i-1" and "102i-2" for identities of networks 102, some of the exemplary values can comprise identical strings or numbers. For example, data for more than one device 103 in a server database 101*d* could record the same name or value of "102i-1" for a single network 102 to be associated with the two different devices 103. Likewise, two different devices 103 could share the same server static public key Ss 101*a*, and thus Ss 101*a* for two different devices 103 can be the same value of an exemplary "101a-1" for two different devices 103, which could also comprise shared server public keys 101*z* as depicted in FIG. 1*d* above. In other words, the depiction of a value of "−1" in a table for Figures herein could comprise a first number or string for a numbered value, and the depiction of a value "−2" could comprise a second number or string for a numbered value, etc.

Similarly, two different devices 103 could use different server static public keys Ss 101*a*, and thus Ss 101*a* for two different devices could comprise a first value of "101a-3" for the third device or row in a PKI key table 101*da* and second, different value of "101a-4" for the fourth device or row. The use of different values for server static public keys Ss 101*a* for different devices 103 could comprise unique server public keys 101*v* as depicted in FIG. 1*d* above. Note that server database 101*d* as depicted in FIG. 2*f* also shows the use of shared server public keys 101*z* (e.g. rows 1-2 in table 101*da*) and unique server public keys 101*v* (e.g. rows 3-5 in table 101*da*). Further, a network 102 could use more than one network public key 131, as shown by the use of two different network public keys 131 for each of the different devices PKI key table 101*da*.

A server database 101*d* could also record additional data and values than those depicted in FIG. 2*d* for some exemplary embodiments. For example, server database 101*d* could record timestamps for when messages are transmitted or received, such that stale or data older than a specified range could be purged. Server database 101*d* could also record plaintext data received from device 103 in a message 297, which could include exemplary data depicted in FIG. 2*b* such as the parameters A 104*a* received, and also other data as well such as transducer data for device 103. Device data stored in a server database 101*d* and received in a message 297 could include transducer data or data input by a user of device 103.

Some data within a server database 101*d* could be stored and operated on separately by Server 101, such as Server 101 not recording or storing secrets such as X3 207*a* in a database 101*d*, but rather Server 101 could record the values in volatile memory 101*f* of Server 101. In exemplary embodiments, server database 101*d* could also operate in a distributed or "cloud" configuration such that multiple different servers 101 could query and record data in server database 101*d*, where data for server database 101*d* is recorded in multiple, physically separated servers.

As depicted for a server database 101*d*, some data could be optionally omitted. For devices 103 that do not use an obfuscated device identity ID.device-obfuscated 1030, then the fields in a server database could be left blank or empty. Likewise, if a hash value is not received in a message 297 then the corresponding hash values in a server database 101*d* could also be left blank or empty. For embodiments that use a step 228 instead of a step 229 in FIG. 2*a*, then the exemplary data for server ephemeral public key Es 101*p* and es 101*s* can be omitted or left blank as well.

FIG. 2*g*

FIG. 2*g* is an illustration of an exemplary set of cryptographic parameters, in accordance with exemplary embodiments. Cryptographic parameters A 104 can specify sets of cryptographic parameters that are supported by Server 101 and device 103 in order to process message 297 and process a response message 225 or 229*a* as shown in FIG. 2*a*. Cryptographic parameters A 104 can be recorded in nonvolatile memory in each of Server 101 and device 103. Cryptographic parameters A 104 can record identities for a collection of cryptographic algorithms or specifications such as a set identifier 104*a*, a key length 104*b*, an ECC curve name 104*c*, a hash algorithm 104*d*, symmetric ciphering key length 104*e*, settings for a symmetric ciphering algorithm 104*f*, a random number length 104*g*, and a server encryption option 104*h*.

As contemplated herein, when a selected set of cryptographic parameters such as using the words or description "parameters A 104*a*" or "cryptographic parameters A 104*a*" can specify a row of parameters or values in a set of cryptographic parameters A 104, such that the collection of values in the row can be used with key pair generation functions 101*x*, ECDH key exchange 207, ECC point addition operation 213, key derivation function 208, and other cryptographic operations and steps as contemplated herein. Set identifier 104*a* can be an identity for a row or set of values for cryptographic parameters A 104. For example, set "A" can comprise cryptographic suite 1 as specified in section 3.2.3 of DPP specification version 1.0. Key length 104*b* can be the length of keys in bits for PKI keys used in system 100, system 200*a* or 200*b*, system 400 and other systems herein. ECC Curve name 104*c* can be a name for an ECC curve used with PKI keys and key exchange algorithms in system 100, system 200*a* or 200*b*, and other systems herein.

Hash algorithm 104*d* in cryptographic parameters A 104 can be the name of a secure hash algorithm, such as the exemplary SHA-256 algorithm depicted, which may also be referred to as "SHA-2". Hash algorithm 104*d* can also be used in a key derivation function (e.g. KDF 208 above in FIG. 2*c* and FIG. 2*d*) and also with digital signature step 234 from FIG. 2*b*. Settings for a symmetric ciphering algorithm 104*f* can specify (i) the identity or name of a symmetric ciphering algorithm 230 such as "AES", "AES-SIV", 3DES, Blowfish, etc, and (ii) settings for the symmetric ciphering algorithm 230. Random length 104*g* can specify the length in bits for random numbers or "nonces" generated by both device 103 and Server 101, such as random1 203*a* and random2 211*a*. The nonces can be used to prevent replay attacks and require messages transmitted and received to be unique. Other possibilities exist as well for data within cryptographic parameters A 104, such as the specification of point compression, encoding rules such as distinguished encoding rules (DER), ASN or CSN syntax notation, padding rules, byte or bit orders such as big endian, little endian, etc.

Server encryption option 104*h* can specify the use or selection of a step 228 or a step 229 as depicted in FIG. 2*a*. In exemplary embodiments, a server encryption option 104*h* with an exemplary value of "A" could specify that Server 101 and device 103 should conduct a step 228 as depicted and described in connection with FIG. 2*a*. In exemplary embodiments, a server encryption option 104*h* with an exemplary value of "B" could specify that Server 101 and device 103 should conduct a step 229 as depicted and described in connection with FIG. 2*a* with a step 301 for Server 101 and a corresponding step 304 for device 103. Server encryption option 104*h* could also specify the formatting and data in a message 297 in FIG. 2*a*, message 297*a* in FIG. 2*b*, and a message 297*b* in FIG. 2*b*.

FIG. 2*h*

FIG. 2*h* is an illustration of an exemplary network database, in accordance with exemplary embodiments. A network database 102*d* depicted and described above in connection with system 100 and system 200*a* or can record data for network 102 to communicate with a plurality of devices 103 and at least one network 102. A network database 102*d* could record at least one set of values, keys, and/or numbers for each device 103 in a plurality of devices 103. Other possibilities exist as well for the organization, tables, and recorded data within a network database 102*d* as depicted in FIG. 2*h* without departing from the scope of the present invention. Data within network database 102*d* could be encrypted using a symmetric key. Although system 100 and systems 200*a* depict a network database 102*d* as operating or recorded within a network 102, a network database 102*d* could comprise a separate server within a network 102 and communicating with (i) server 101 via a secure session 201*a* or a secure network 107*a* and/or (ii) server B 102*s* in a network 102. Network database 102*d* could be combined with server B 102*s*. Further, a network database 102*d*, when operating or recorded in a separate server than server B 102*s*, then network database 102*d* could contain electrical components equivalent to a server 101 depicted and described in connection with FIG. 1*c*.

Network database 102*d* can record or store values for devices 103 in multiple tables or a single table. Data recorded or stored in a network database 102*d* can include device identity ID-Device 103*i*, Parameters B 131*b*, Source IP: Port number 297*b* for data received from device 103, a random number random 3 216*a*, the device public key numeric value PK.Device 121*a* the network public key numeric value PK.Network 131*a*, a network private key SK.Network 132, a shared secret X5 503, and a symmetric ciphering key K3 506*a*.

As depicted for a network database 102*d* in FIG. 2*h*, some devices 103 could share the same network public key numeric values 131*a* (e.g. "131a-1" and "131a-1" for both device 1 and device 2 in the first two rows), which could comprise shared keys for the devices 103 as depicted and described in connection with FIG. 1*d* above. Other devices 103 could record unique public keys for network 102, where devices 103*s* record or stores a value for the network public key 131*a* that is uniquely recorded in each device. For example, rows 3 and 4 in network database 102*d* depict values of network public key numeric values of 131*a*-3 and 131*a*-4, which can be different numbers and thus network public key 131*a* could be unique keys for the device in row 3 and the device in row 4. A network database 102*d* could record and track the associated network private and public keys for each device.

Other possibilities exist as well for the mapping of network PKI keys to either servers 101 or devices 103 without departing from the scope of the present invention. Also, although a single value for PK.Network 131*a* and SK.Network 132 are depicted as associated with a device 103 using a device identity 103*i* in a network database 102*d*, a network 102 could also record and use multiple different values of network public key PK.Network 131*a* or SK.Network 132, such as (i) different values of 131*a* or 132 for different parameters B 131*b* (e.g. different cryptographic algorithms), or (ii) separate values for SK.network 132 for digital signatures and a key exchange mechanisms 142. In other words, a device 103 could also record the corresponding different multiple values for PK.Network 131*a*, and select and use the public keys depending on requirements such as parameters B 131*b* used or if the network public key will be used for verifying digital signatures or conducting KEM 141 for device 103.

FIG. 3*a*

Figure 3A:
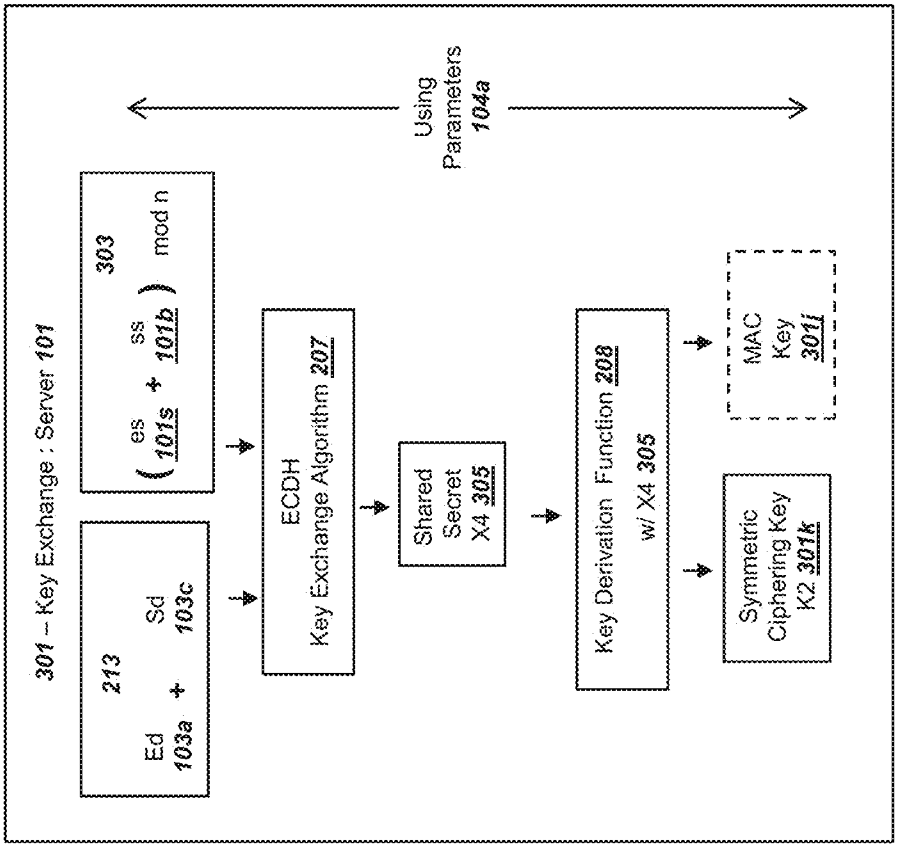
FIG. 3*a* is a flow chart illustrating exemplary steps for conducting a key exchange using PKI keys in order to derive a shared secret key and a shared secret symmetric ciphering key, in accordance with exemplary embodiments.

FIG. 3*a* is a flow chart illustrating exemplary steps for conducting a key exchange using PKI keys in order to derive a shared secret key and a shared secret symmetric ciphering key, in accordance with exemplary embodiments. Exemplary steps for a Server 101 to mutually derive a shared secret X4 305 and shared secret symmetric ciphering key K2 301*k* with device 103 can comprise a key exchange step 301. The exemplary step 301 for Server 101 and step 304 for device 103 were depicted and described above for a step 229 in FIG. 2*a*, and additional details and exemplary data will be provided herein. The use of a step 301 could be specified by a server encryption option 104*h* in a set of cryptographic parameters A 104, and other possibilities exist as well, such as in a server OS 101*g*, device program 103*m*, etc.

For a key exchange step 301, Server 101 can conduct an ECC point addition step 213 in order to combine (i) device static public key Sd 103*c* recorded in a server database 101*d* with (ii) device ephemeral public key Ed 103*a* received in a message 297. Exemplary calculations for an ECC point addition 213 were described above in connection with FIG. 2*d* above. The output of an ECC point addition step 213 can comprise the point or value X0 213*a*. An ECC point addition step 213 can be performed with a named elliptic curve from a selected set of parameters A 104*a*, where Server 101 selects parameters A 104*a* in a step 210*a*. Parameters A 104*a* can comprise the elliptic of "secp128r1" with key lengths of 128 bit long keys. Although the exemplary numbers for keys, points, and a named curve are provided, other values for keys, points, and named ECC curves could be utilized as well. Using the exemplary data described with FIG. 2*d* above (while also using the same parameters A 104*a* and exemplary values for the corresponding secret keys stored or recorded by a device 103), ECC point addition step 213 by Server 101 can combine the device static public key Sd 103*c* and the device ephemeral public key Ed 103*a* in order to output the following value for point X0 213*a:*

X: 59121922812458579600446751790662160796

Y: 30493450923577826897895586717020091705

The server ephemeral private key es 101*s* can comprise the exemplary following number, and can be recorded or stored by Server 101:

303212036043944420841270875000150307127

The server static private key ss 101*b* can comprise the exemplary following number, and can be recorded by Server 101:

246768250079261690512638148137618184294

Consequently the modulus of (i) the sum of private keys ss 101*b* and es 101*s* and (ii) the value n above will equal the following number for a step 303 in a key exchange step 301:

209697919360723972910586457557411866760

Note that the server ephemeral private key es 101*s* corresponds to the server ephemeral public key Es 101*p* sent by Server 101 in a message 229*a*, as depicted in FIG. 2*a* above. Server 101 can input (i) the point X0 213*a* and (ii) the number from a step 303 above into an ECDH key exchange algorithm 207, along with the selected set of cryptographic parameters A 104*a* in order to calculate the shared secret X4 305, which can also comprise a point X4 305 on the named curve, An exemplary named curve for the values could comprise "secp128r1", although other named curves and exemplary values or numbers for keys Sd 103*c*, Ed 103*a*, and es 101*s* and ss 101*b* could be used as well. An exemplary value for point X4 305 using the exemplary values above will result in the following value for point X4 305:

X: 287787251525069258869799747269576815541

Y: 36782360729461211489165900668411883160

Note that device 103 can also derive point X4 305 using a key exchange step 304, using the corresponding PKI keys used by Server 101 in a key exchange step 301*a*. For a key exchange step 301, derived shared secret key X4 305 can be input into a key derivation function 208 where the key derivation function 208 can be equivalent to the key derivation function 208 depicted and described in connection with FIG. 3*b* below for a key exchange step 304. Note that the key derivation function 208 in a step 301 and step 304 can be a different key derivation function than the key derivation function 208 from a step 218 and step 206 above in FIG. 2*d* and FIG. 2*c*, respectively. In other words, (i) different values could be input or different algorithms used for a KDF 208 in a step 301 and step 304 than (ii) a KDF from a step 219 and step 206 above in FIG. 2*d* and FIG. 2*c*, respectively, although a KDF in a step 301 and step 304 can use the same values and algorithms for some exemplary embodiments.

As one example (i) a KDF in a step 301 and step 304 could include the use of a first text string in a secure hash function within a KDF 208 in a step 301 and step 304 (which could be specified in parameters A 104*a*), and (ii) a KDF from a step 218 and step 206 above in FIG. 2*d* and FIG. 2*c*, respectively, could include the use of a second string in a secure hash value within the KDF (which could be specified in parameters A 104*a*). Other possibilities exist as well for a KDF 208 in a step 301 and step 304 without departing from the scope of the present invention.

Note that for key derivation steps in the present invention, the X coordinate of a derived shared secret can be taken or used as input into the key derivation function 208. Other possibilities exist as well without departing from the scope of the present invention for using the X and/or Y values from shared secret with a KDF 208, including combining the X coordinate and the Y coordinate into a single value. The output of a key derivation function 208 in both step 301 and step 304 can comprise both (i) a symmetric ciphering key K2 301*k* and (ii) a MAC key 301*j*. MAC key 301*j* can be used with a symmetric ciphering algorithm in order to generate a MAC code 302*m*, such that the other party using the same key K2 301*k* and MAC key 301*j* can process the ciphertext and calculate the same MAC code 302*m* in order to verify message integrity. In exemplary embodiments, a MAC code and an initialization vector can be sent as plaintext metadata along with a ciphertext. The use of key K2 301*k* and MAC key 301*j* are described in connection with encryption step 302 and decryption step 306 as depicted and described in connection with FIG. 3*c* below.

Note that server 101 can conduct a key exchange step 301 in order to derive the same value for shared secret X4 305 as device 103 in FIG. 3*b* below. Although the derivation or generation of a shared secret X4 305 in a step 301 is shown above for using the steps 213, and 303, (with ECDH key exchange algorithmic steps such an ECDH key exchange algorithm 207 to derive share secret X4 305), other possibilities exist as well for using the public and private keys depicted in step 301 to derive a shared secret X4 305 without departing from the scope of the present invention. In other words, a key exchange step 301 could use other algorithms combining (i) the device public keys Sd 103*c*, Ed 103*a* for a device 103 and (ii) the server 101 private keys es 101*s* and ss 101*b*, without departing from the scope of the present invention. As one exemplary embodiment, a modified ECDH key exchange algorithm for a device 103 could accept the input of all the keys from the previous sentence in order to derive a shared secret X4 305. Or, other exemplary embodiments could use combinations of (i) intermediate points and (ii) the keys shown in a step 301 to derive shared secret X4 305 and corresponding symmetric ciphering key K2 301*k*.

Other exemplary embodiments for a step 301 can include the following combinations to calculate or determine X4 305, where "+" indicates an ECC point addition operation and "*" indicates an ECDH key exchange:

$$\text{A: } \{Ed103a*(es101s+ss101b)\bmod n\}+\{Sd103c*(es101s+ss101b)\bmod n\}$$

$$\text{B: } \{Ed103a*(es101s+ss101b)\bmod n\}+\{(Sd103c*es101s)+(Sd103c*ss101b)\}$$

$$\text{C: } \{(Ed103a*es101s)+(Ed103a*ss101b)\}+\{Sd103c*(es101s+ss101b)\bmod n\}$$

$$\text{D: } (Ed103a*es101s)+(Ed103a*ss101b)+(Sd103c*es101s)+(Sd103c+ss101b)$$

$$\text{E: } \{(Ed103a+Sd103c)\}*[(es101s+ss101b)\bmod n]$$

Combination E is depicted for a key exchange step 301 in FIG. 3*a*. Other possibilities exist as well for using (i) the device public keys Sd 103*c*, Ed 103*a*, and (ii) the server 101 private keys es 101*s* and ss 101*b*, without departing from the scope of the present invention. In summary, a key exchange step 301 with all the combinations A through E (plus other combinations as well) can comprise (i) at least one elliptic curve point addition operations over at least two points or keys (from keys/points Sd 103*c*, and Ed 103*a*), and (ii) at least one ECDH key exchange using server ephemeral private key es 101*s* and server static private key ss 101*b*. A key exchange step 301 can also comprise four point elliptic curve addition operations using four ECDH key exchanges, as shown above with combination D. Other possibilities exist as well for a server 101 to use the exemplary keys depicted for a key exchange step 301 for a server 101 without departing from the scope of the present invention, such that a server 101 could also mutually derive the shared secret X4 305 using the corresponding PKI keys to those stored and used by device 103.

FIG. 3*b*

Figure 3B:
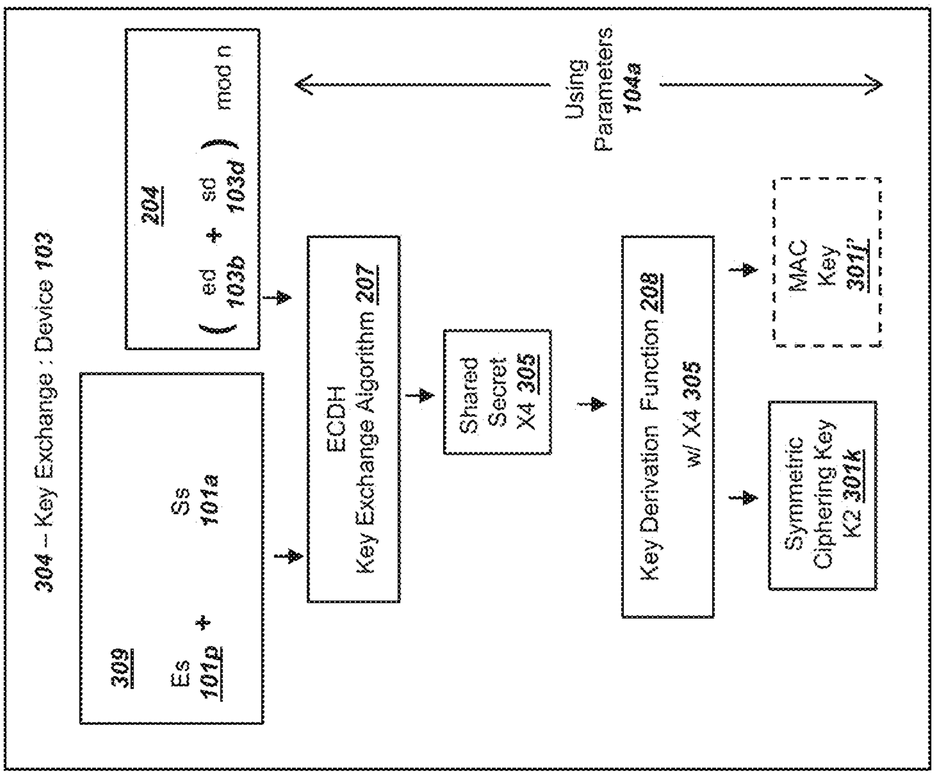
FIG. 3*b* is a flow chart illustrating exemplary steps for conducting a key exchange using PKI keys in order to derive a shared secret key and a shared secret symmetric ciphering key, in accordance with exemplary embodiments.

FIG. 3*b* is a flow chart illustrating exemplary steps for conducting a key exchange using PKI keys in order to derive a shared secret key and a shared secret symmetric ciphering key, in accordance with exemplary embodiments. Exemplary steps for a device 103 to mutually derive a shared secret X4 304 and shared secret symmetric ciphering key K2 301*k* with Server 101 can comprise a key exchange step 304. The exemplary step for device 103 were depicted and described above for a step 229 in FIG. 2*a*, and additional details and exemplary data will be provided herein. The use of a step 304 could be specified by a server encryption option 104*h* in a set of cryptographic parameters A 104 stored by device 103.

For a key exchange algorithm 304, device 103 can (i) conduct a step 204 to combine device static private key sd 103*d* and the derived device ephemeral private key ed 103*b*, and (ii) use the received server ephemeral public key Es 101*p* from a message 229*a* along with the previously stored server static public key Ss 101*a*. The two values for (i) and (ii) can be input into ECDH key exchange algorithm 207 along with the set of cryptographic parameters A 104*a*.

Device 103 can conduct step 204 to calculate the sum of device static private key sd 103*d* and the derived device ephemeral private key ed 103*b*, and then calculate the modulus of the sum using the value n, where the value n can be defined or determined based upon the selected set of cryptographic parameters A 104*a*. Exemplary data was provided for a step 204 in connection with FIG. 2*c* above, and using numbers for the exemplary data, the modulus of (i) the sum of private keys sd 103*d* and ed 103*b* and (ii) the value n above equaled the following number for a step 204:

199064991727974137923862150658643812563

For a key exchange algorithm 304*a*, the server ephemeral public key Es 101*p* can comprise the exemplary following point, and can be received by device 103 in a message 229*a:*

X: 150987437073194493090496847157781464012

Y: 82187013477286197708095522763441186988

Note that the server ephemeral public key Es 101*p* corresponds to the server ephemeral private key es 101*s* stored by Server 101 from a step 101*x*, as depicted in FIG. 2*a* above and described with exemplary values for a step 301 in FIG. 3*a* above. Device 103 can conduct an ECC point addition step 309 for the server ephemeral public key Es 101*p* and server static public key Ss 101*a*. Using the value for Ss 101*a* from FIG. 2*c* above, the output of a step 309 can comprise the following point:

X: 86571521362740031081537299344543943463

Y: 268583000729694094702105776298773092919

Device 103 can input the point from a step 309 above and the value from a step 204 into an ECDH key exchange algorithm 207, along with the selected set of cryptographic parameters A 104*a* in order to calculate the shared secret X4 305. Shared secret X4 305 can also comprise a point X4 305 on the named curve, which could comprise "secp128r1", although other named curves and exemplary values or numbers for keys sd 103*d*, ed 103*b*, Ss 101*a* and Es 101*p* could be used as well. An exemplary value for point X4 305 using the exemplary values above will result in the following value for point X4 305:

X: 287787251525069258869799747269576815541

Y: 36782360729461211489165900668411883160

Device 103 can derive point X4 305 using a key exchange step 304, using the corresponding PKI keys used by Server 101 in a key exchange step 301. For a key exchange step 304, derived shared secret key X4 305 can be input into a key derivation function 208 where the key derivation function 208 can be equivalent to the key derivation function 208 depicted and described in connection with FIG. 3*a* above for a key exchange step 301. The output of a key derivation function 208 in both step 304 and step 301 can include both (i) a symmetric ciphering key K2 301*k* and (ii) a MAC key 301*j*. The use and derivation of (i) the symmetric ciphering key K2 301*k* and (ii) the MAC key 301*j* were also described in a step 301 for Server 101. Device 103 can use the keys (i) the symmetric ciphering key K2 301*k* and (ii) the MAC key 301*j* in a subsequent decryption step 306 as depicted and described in connection with a decryption step 306 in FIG. 3*c* below.

Although the derivation or generation of a shared secret X5 308*a* in a step 304 is shown above for using the steps 309, and 204, with ECDH key exchange algorithmic steps such an ECDH key exchange algorithm 207 to derive share secret X4 305, other possibilities exist as well for using the public and private keys depicted in step 304 to derive a shared secret X4 305 without departing from the scope of the present invention. In other words, a key exchange step 304 could use other algorithms combining (i) the server public keys Ss 101*a* and Es 101*p* for a server 101 and (ii) the device 103 private keys ed 103*b* and sd 103*d*, without departing from the scope of the present invention. As one exemplary embodiment, a modified ECDH key exchange algorithm for a device 103 could accept the input of all the keys from the previous sentence in order to derive a shared secret X4 305. Or, other exemplary embodiments could use combinations of (i) intermediate points and (ii) the keys shown in a step 304 to derive shared secret X4 305.

Other exemplary embodiments for a step 304 can include the following combinations, where "+" indicates an ECC point addition operation and "*" indicates an ECDH key exchange:

$$A:\ \{Ss101a * [(ed103b + sd103d)\bmod n]\} + \{Es101p * [(ed103b + sd103d)\bmod n]\}$$

$$B:\ \{\{Ss101a * ed103b) + (Ss101a * sd103d)\} + \{Es101p * [(ed103b + sd103d)\bmod n]\}$$

$$C:\ \{Ss101a * [(ed103b + sd103d)\bmod n]\} + \{(Es101p * ed103b) + (Es101p * sd103d)\}$$

$$D:\ \{(Ss101a + Es101p) * ed103b\} + \{Ss101a + Es101p) * sd103d\}$$

$$E:\ (Ss101a * ed103b) + (Es101p * ed103b) + (Ss101a * sd103d) + (Es101p * sd103d)$$

$$F:\ \{(Ss101a + Es101p) * [(ed103b + sd103d)\bmod n]\}$$

Combination F is depicted for a key exchange step 304 in FIG. 3*b*. Many other possibilities exist as well for using (i) the server public keys Ss 101*a* and ephemeral public key Es 101*p* for a server 101 and (ii) the device 103 private keys ed 103*b* and sd 103*d*, without departing from the scope of the present invention. In summary, a key exchange step 304 with all the combinations A through F (plus other combinations as well) can comprise (i) at least one elliptic curve point addition operation using at least two points or keys (from keys/points Ss 101*a* and Es 101*p*), and (ii) at least one ECDH key exchange using device ephemeral private key ed 103*b* and device static private key sd 103*d*. A key exchange step 304 can also comprise four point elliptic curve addition operations using four ECDH key exchanges, as shown above with combination E. Other possibilities exist as well for a device 103 to use the exemplary keys depicted for a key exchange step 304 for a device 103 without departing from the scope of the present invention, such that a server 101 could also mutually derive the shared secret X4 305 using the corresponding PKI keys to those stored and used by device 103.

FIG. 3*c*

Figure 3C:
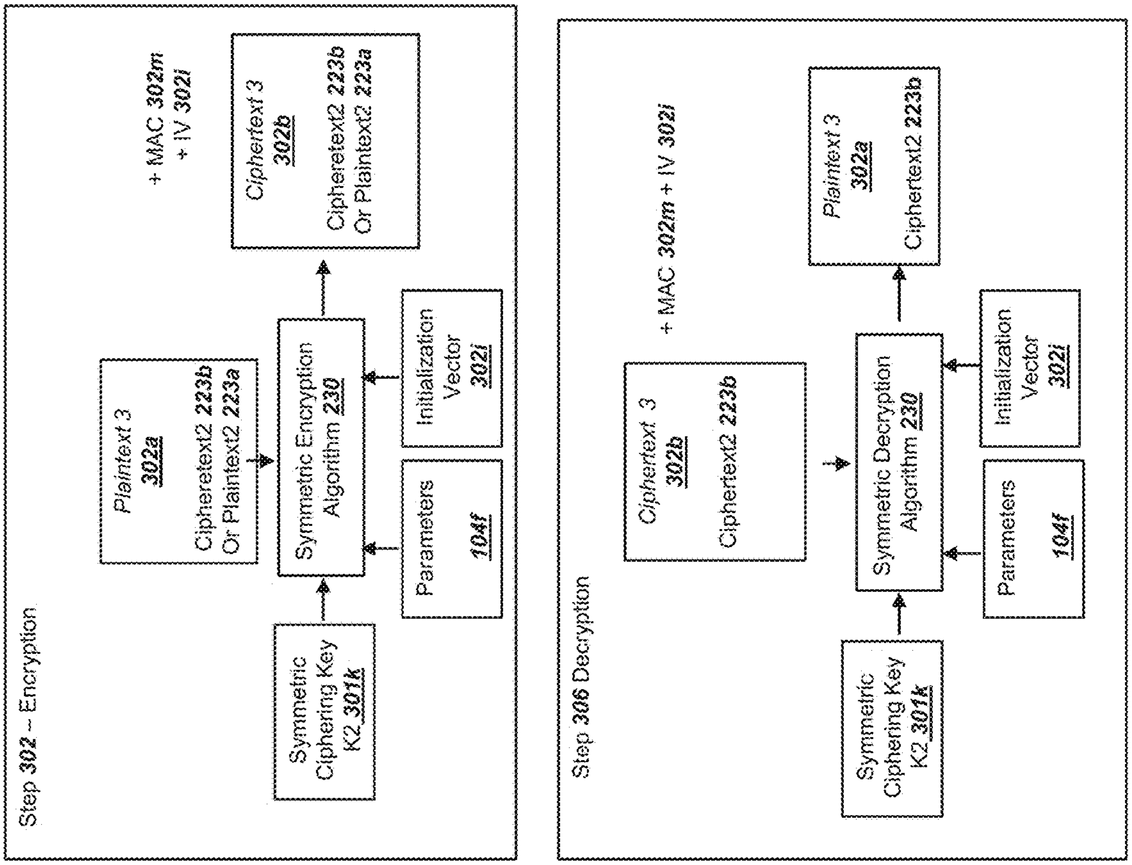
FIG. 3*c* is a flow chart illustrating exemplary steps for using a derived shared secret key to encrypt and decrypt data, in accordance with exemplary embodiments.

FIG. 3*c* is a flow chart illustrating exemplary steps for using a derived shared secret key to encrypt and decrypt data, in accordance with exemplary embodiments. An encryption step 302 can be performed by Server 101 in a step 229 from FIG. 2*a*, and a decryption step 306 can be performed by device 103 in a step 229. The use of an encryption step 302 by Server 101 and decryption step 306 by device 103 was depicted and described in connection with FIG. 2*a* above, and additional exemplary details are provided herein in FIG. 3*c*. An encryption 302 step converts the plaintext3 302*a* into a ciphertext3 302*b* using the mutually derived symmetric ciphering key K2 301*k* (from a step 301).

For an encryption step 302 by Server 101, Server 101 could use a symmetric ciphering algorithm 230 with input of plaintext3 302*a*, mutually derived symmetric ciphering key K2, parameters A 104*f*, and an initialization vector 302*i* in order to output a ciphertext 3 302*b*. The plaintext3 302*a* for creating ciphertext3 302*b* may optionally include a ciphertext2 223*b*, where ciphertext2 223*b* was depicted and described in connection with a step 223 above. In other words, ciphertext3 302*b* could "double encrypt" the original plaintext 223*a* in ciphertext2 223*b*. For embodiments that use "double encryption" with ciphertext2 223*b* inside ciphertext3 302*b*, then Server 101 could conduct the encryption step 223 in FIG. 2*e* and also FIG. 2*a* in order to convert plaintext 223*a* into ciphertext2 223*b*. Or, in other embodiments, different data than a ciphertext2 223*b* could be included as plaintext 302*a* input into encryption step 302. In exemplary embodiments, at least the random numbers 203*a*, 211*a*, and 216*a* and the network public key 131 are included as plaintext input (possibly in ciphertext form such as with ciphertext 2 223*b*) into a symmetric ciphering algorithm in an encryption step 302.

The symmetric ciphering algorithm 230 can receive input of the derived symmetric ciphering key K2 301*k*. Other data could be included in plaintext for an encryption step 302 such as, but not limited to a response from server 101, without departing from the scope of the present invention. In other words, although FIG. 2*a* and FIG. 3*c* depicts ciphertext3 302*b* as including a ciphertext 2 223*b*, in some embodiments, plaintext 223*a* from a step 223 in FIG. 3*c* could be the plaintext used for plaintext 302*a* in an encryption step 302 (e.g. data within ciphertext3 302*b* may not be double encrypted). The output or result from an encryption step 302 using a key K2 from a key exchange step 301 can include ciphertext3 302*b*. In exemplary embodiments a MAC key 301*j* could also be use with encryption step 302, in order to generate a MAC code 302*m*. The initialization vector 302*i* and MAC code 302*m* could comprise plaintext "metadata" that is send along with the ciphertext3 302*b*. Server 101 can send device 103 the ciphertext3 302*b* in a message 229*a*, as depicted and described in connection with FIG. 2*a*.

A decryption 306 step by device 103 converts the ciphertext 302*b* into the plaintext 302*a* using the mutually derived symmetric ciphering key K2 301*k*. For a decryption step 306 by device 103, device 103 could use a symmetric ciphering algorithm 230 with input of ciphertext3 302*b*, mutually derived symmetric ciphering key K2, parameters A 104*f*, and an initialization vector 302*i* in order to output a plaintext 302*a*.

The plaintext 302*a* resulting from a decryption step 306 with ciphertext 3 302*b* may optionally include or comprise a ciphertext2 223*b*, where ciphertext2 223*b* was depicted and described in connection with a step 223 above in FIG. 2*a* and step 223 in FIG. 2*e* and also with encryption step 302 above in this FIG. 3*c*. In other words, ciphertext3 302*b* could "double encrypt" the original plaintext 223*a* in ciphertext2 223*b*. Or, in other embodiments, different data than a ciphertext2 223*b* could be included as plaintext 302*a* output from a decryption step 306. In exemplary embodiments, the random number 203*a*, 211*a*, and 216*a* along with the network public key 131 are included as plaintext output (possibly in ciphertext form such as with ciphertext2 223*b*) from a symmetric ciphering algorithm 230. For embodiments where ciphertext 2 223*b* is the plaintext 302*a* output from a decryption step 306, then device 103 could conduct a second decryption step equivalent to step 221 in FIG. 2*e* in order to read the plaintext 223*a* from ciphertext 2 223*b*. The second decryption step could use key K1 206*a* from a step 206.

The symmetric ciphering algorithm 230 can receive input of the derived symmetric ciphering key K2 301*k*. The output or result from a decryption step 306 using a key K2 from a key exchange step 304 can comprise plaintext 302*a*. Other data could be included in plaintext 302*a* for a decryption step 306 (possibly combined with a decryption step 223 if ciphertext 223*b* is in ciphertext 302*b*) such as, but not limited to response from server 101, without departing from the scope of the present invention. In exemplary embodiments a MAC key 301*j* could also be used with decryption step 306, in order to calculate a MAC code 302*m*. The initialization vector 302*i* and MAC code 302*m* could comprise plaintext "metadata" that is received along with the ciphertext3 302*b* in a message 229*a*. Device 103 can verify message integrity of ciphertext3 302*b* by comparing a received MAC code 302*m* with a calculated MAC code 302*m* using MAC key 301*j*. After reading plaintext 302*a* from a decryption step 306, device 103 can take the additional steps to process the data as depicted in FIG. 2*a* above.

FIG. 4

FIG. 4 is a simplified message flow diagram illustrating an exemplary system with exemplary data sent and received by a device, a server, a key server, and a network, in accordance with exemplary embodiments. System 400 can include a device 103, Server 101', a key server 101*w*, and a network 102. As depicted in FIG. 4 with the dashed box for a server 101' and key server 101*w*, for some exemplary embodiments a server 101 could comprise the functionality of both the Server 101' and the key server 101*w*. Device 103 was depicted and described in connection with FIG. 1*a*, FIG. 1*b*, FIG. 1*d*, and FIG. 2*a*, and other Figures above. A Server 101 was depicted and described in connection with FIG. 1*a*, FIG. 1*c*, FIG. 2*a*, and other Figures above, with the difference from Server 101' and Server 101 being that the server static private key ss 101*b* can be recorded in a key server 101*w* instead of within a Server 101. Note that a system 400 can include a plurality of devices 103, servers A 101', key servers 101*w*, and networks 102.

Key server 101*w* database 401*a* can store and/or record at least one server static private key ss 101*b*. In other words, Server 101 (from FIG. 1*a*, FIG. 2*a*, etc.) could record, store, and operate with server static private key ss 101*b*, while Server 101' can optionally not record, store, or operate with server static private key ss 101*b*. Server database 101*d*' can (i) omit the storing or recording of server static private key ss 101*b*, but can (ii) record other data as depicted and described for a server database 101*d*' in connection with FIG. 2*f* above). The network 102 in FIG. 4 can comprise a network 102 as depicted in FIG. 1*a* and FIG. 2*a* above. Individual steps and components used in system 400 in FIG. 4 are also additionally depicted and described in above FIGS. 2*a*, 2*c*, and 2*d*, etc.

Before starting the steps and message flows depicted in FIG. 2*a*, device 103 can securely receive and record a server static public key Ss 101*a*, which was also depicted and described in connection with FIG. 1*a* and FIG. 1*d*. The corresponding private key for Ss 101*a* can be securely recorded in a key server 101*w* as key ss 101*b*. Steps and messages for system 400 in FIG. 4 that are equivalent to steps and messages for system 200*a* in FIG. 2*a* will be described in summary form herein, where differences between system 400 in FIG. 4 and system 200*a* in FIG. 2*a* will be highlighted and described with additional details. In exemplary embodiments, a server database 101*d*' can comprise a server database 101*d* as depicted and described in connection with FIG. 2*f*, but with the differences of (i) server database 101*d*' does not record server static private key ss 101*b* and (ii) database 401*a* records data such as, but not limited to, a device identity 101*i* in addition to private key ss 101*b*.

A Server 101' can establish a secure connection 201*d* with the key server 101*w* in addition to a secure connection 201*a* with the network 102 from FIG. 2*a* above. Device 103 can conduct a step 201*c* as depicted and described in connection with FIG. 2*a* to record data for conducting a step 224, such as, but not limited to, device static private key sd 101*c*, public key Ss 101*a*, etc. Device 103 can conduct the remaining steps in a step 231 in order to process data for a message 297, where the individual steps in a step 231 for device 103 were depicted and described in connection with FIG. 2*a* above. Device 103 can send Server 101' a message 297. Before receiving message 297, Server 101' could conduct a step 201*b*, where step 201*b* is also depicted and described above in connection with FIG. 2*a*.

Server 101' can receive message 297 and conduct a series of steps to process the message. Server 101' could perform steps 210*a*, 210*b*, 211, and 212 as depicted and described above in connection with FIG. 2*a*. Server 101' can then conduct a step 401*b* in FIG. 4 in order to select the key server 101*w* that records and operates with server static private key ss 101*b*. Server 101' can use the equivalent steps in (a) a step 401*b* to select the key server 101*w* as (b) a step 212 to select the network 102. In summary, Server 101' can use information or data received in message 297 in conjunction with a server database 101*d*' in order to select the key server 101*w* in a step 401*b*. Server 101' could use one of several possible methods for selecting a key server 101*w* in a step 401*b*, including a combination of the following embodiments.

A first embodiment for selecting a key server 101*w* in a step 401*b* could comprise Server 101' selecting the same key server 101*w* for all keys Ed 103*a* received from all devices 103. For example for this first method, Server 101' could listen or operate on (i) a specific IP address and port number or (ii) with a specific DNS name or URL in step 201*b*, where the use of (i) or (ii) could be specified or associated with a server static public key Ss 101*a*. As mentioned above for a step 203 in step 231 in FIG. 2*a*, device 103 can select the address of Server 101' using the server address of Server 101' recorded with Ss 101*a* (possibly from a table 103*t* in FIG. 1*d*). Server 101 could determine that all messages 297 received using (i) or (ii) are associated with a specific key server 101*w*.

A second embodiment of a step 401*b* for selecting key server 101*w* of received device ephemeral public key Ed 103*a* could comprise using an identity of key server 101*w* in a message 297 from device 103. The message 297 can optionally include an identity for key server 101*w* comprising ID.key-server 101*wi* (where ID.key-server 101*wi* is not shown in FIG. 4). For these embodiments, Server 101' can select the key server 101*w* using the ID.key-server 101*wi* from a message 297. A third embodiment for a step 401*b* of selecting key server 101*w* for received device ephemeral public key Ed 103*a* could include using an identity of device 103 in a message 297 comprising (i) ID.device 103*i*, (ii) ID.device-obfuscated 1010, or a secure hash value H (Sd) 250. A secure hash value over a unique key 101*v* or could be used as well to determine a key server 101*w*, where a server database 101*d*' could include tables that map the unique secure hash value to a key server 101*w*.

As described above for a message 297, the message 297 can optionally include unique identifying information for device 103, and Server 101' using database 101*d*' in FIG. 2*f* above could include a table to map any of (i), (ii), and (iii) in this paragraph to a key server 101*w*. For this third embodiment of a step 401*b*, Server 101' could conduct a query of server database 101*d*' to select the key server 101*w* for device 103 using ID.device 103*i* (where ID.device 103*i* was queried from database 101*d*' using identity information such as (i) ID.device 103*i*, (ii) ID.device-obfuscated 1010, or a secure hash value H (Sd) 250. Note that a step 401*b* by Server 101' can also include selecting the device static public key Sd 103*c* from the server database 101*d*' using identity information for device 103 in a message 297.

A fourth embodiment for a step 401*b* to select a key server 101*w* for received device ephemeral public key Ed 103*a* could include using the subset of cryptographic parameters A 104*a* from a step 210*a*. Server 101' could record that a first subset of cryptographic parameters A 104*a* are associated with a first key server 101*w*, and a second subset of cryptographic parameters A 104*a* are associated with a second key server 101*w*, etc. Other possibilities exist as well for Server 101' to conduct a step 401*b* to (i) select a key server 101*w* and (ii) select a device static public key Sd 103*c* using data in a message 297 without departing from the scope of the present invention.

In addition, embodiments for step 401*b* in system 400 could include combining different embodiments described above for a step 401*b*, such as the first embodiment of step 401*b* for selecting a key server 101*w* and the third embodiment of step 401*b* for selecting the device static public key Sd 103*c*. After conducting a step 401*b* to select a key server 101*w* and a device static public key Sd 103*c*, Server 101' can conduct an ECDH point addition operation 213 over device public keys Sd 103*c* and Ed 103*a* to calculate point X0 213*a*, as depicted and described in connection with FIG. 2*d* above.

Server 101' can then send the key server 101*w* a message 402 through the secure session 201*a*. Message 402 can include an identity for Server 101' comprising ID.Server 101*i*, the point X0 213*a* from a step 213 above, a device identity 103*i*, and the subset of cryptographic parameters A 104*a*. Note that although the use of a step 213 and point X0 213*a* are depicted in FIG. 4, a message 402 could include separately both the received device ephemeral public key Ed 103*a* and the device static public key Sd 103*c*, and in this embodiment point X0 213*a* could be omitted from a message 402. The use of a point X0 213*a* for a message 402 may be preferred for some embodiments, since it would provide additional security by not exposing the key server 101*w* to the separate values for keys 103*a* and 103*c*.

For embodiments where device 103 records server static public key Ss 101*a* as shared keys 101*z*, then a device identity 103*i* in message 402 could be omitted, and the key server 101*w* could use the same server static private key ss 101*b* for multiple communications representing multiple devices 103 with Server 101'. In other words, the key server 101*w* could use the Server 101' identity 101*i* in a message 402 for some embodiments to determine the proper server static private key ss 101*b* for conducting subsequent steps, where server identity 101*i* is associated with shared keys 101*z* as depicted in FIG. 1*d*. For embodiments depicted in FIG. 1*d* where a device 103 records and operates with a unique key 101*v*, then a message 402 can preferably include device identity ID.device 103*i* in order for the key server 101*w* to select the appropriate server static private key ss 101*b* for subsequent calculations.

Server identity ID.server 103*i* also can be useful for communications between the key server 101*w* and Server 101' for a system 400, since either (i) Server 101' may communicate with a plurality of different key servers 101*w*, and/or (ii) the key server 101*w* may communicate with a plurality of different servers 101'. In some exemplary embodiments, where server static public keys 101*a* comprise unique keys 101*v*, then message 297 and message 402 can use secure hash value over the server static public key of H (Ss) 252 in order to identify both a device 103 and the corresponding server static private key ss 101*b* to communicate with the device Key server 101*w* can receive the message 402 via the secure session 201*d* and conduct a series of steps to process the message and respond. A first step conducted by key server 101*w* can comprise a key validation step 210*b*, where the key validation step 210*b* conducted by key server 101*w* can be equivalent or compatible with the key validation step 210*b* conducted by a Server 101 as described in FIG. 2*a* above. Key server 101*w* could use the set of cryptographic parameters A 104*a* in message 402 in order to conduct a key validation step 210*b*. As mentioned above for a step 210*b* for Server 101, a key validation step 210*b* for key server 101*w* could be conducted to verify that point X0 213*a* is not reused, in order to deny replay attacks. Key server 101*w* could record all values X0 213*a* received in a database 401*a* for an extended period of time, which could comprise years, and reuse of a value X0 213*a* could be rejected. Or, in other exemplary embodiments, the verification that value or point X0 213*a* is not reused could be omitted by key server 101*w* in a step 210*b*, and network 102 could rely on Server 101' to deny replay attacks.

The key server 101*w* can then conduct a step 403 in order to select a server static private key ss 101*b* to use with the received point X0 213*a* from message 402. For a step 403, key server 101*w* could use device identity 103*i* received in message 402 to query a database 401*a* to select key ss 101*b* associated with device identity 103*i*. For a step 403, key server 101*w* could use H (Ss) 252 to query a database 401*a* to select key ss 101*b*. A database 401*a* could record a plurality of different server static private keys ss 101*b* for use with different devices 103. Or, a step 403 could use other data from a message 402 to select key ss 101*b*, such as parameters A 104*a* or server identity 101*i*. In an exemplary embodiment, multiple different devices 103 could record server static public key Ss 101*a* as shared keys 101*z*, where the shared keys 101*z* are associated with a particular set of cryptographic parameters A 104*a* (such as a particular named ECC curve 104*c*). The key server 101*w* could select a key ss 101*b* to use with the shared keys 101*z* based on the parameters A 104*a* from message 402. Other possibilities exist as well for a key server 101*w* to conduct a step 403 to select a server static private key ss 101*b* using data from a message 402 without departing from the scope of the present invention.

The key server 101*w* can then conduct an ECDH key exchange step 207 using (i) the recorded server static private key ss 101*b* and (ii) the received point X0 213*a* from message 402. Exemplary details for an ECDH key exchange step 207 are depicted and described in connection with FIG. 2*d* above. The output of an ECDH key exchange step 207 can comprise point X3 207*a*. For embodiments where message 402 includes either (i) an identity for device 103 such as ID.device 103*i*, or (ii) identifying information for ss 101*b* for a key server 101*w* to utilize (such as a secure hash over Ss 101*a*, where Ss 101*a* comprises a unique key 101*v*), then key server 101*w* could use the identifying information in message 402 to select the server static private key ss 101*b* from a database 401*a* for ECDH key exchange step 207.

The key server 101*w* can then send Server 101' a message 404, where the message 404 includes point X3 207*a* from step 207 above, as well as an identity for key server 101*w* comprising ID.key-server 101*wi* and cryptographic parameters A 104*a* associated with point X3 207*a*. Message 404 can be transmitted through secure session 201*d*. If device identity 103*i* or other identifying information such as a secure hash value over a unique key 101*v* was included in message 402, then message 404 could also include device identity 103*i* or the other identifying information for a device 103. Or, both message 402 and message 404 can include a transaction identity or session identity, such that Server 101' can associate the received value X3 207*a* with a received device ephemeral public key Ed 103*a* and associated device 103.

Server 101' can receive message 404 with point X3 207*a* and conduct a series of steps in order to derive a mutually shared and authenticated key exchange with device 103. Server 101' can conduct a key derivation function 208 using the received point X3 207*a* in order to derive the mutually shared symmetric ciphering key K1 206*a*, as depicted and described in connection with a step 218 in FIG. 2*d*. Server 101' can conduct a decryption step 221 with key K1 206*a* in order to read a plaintext value for the device public key 121, and a decryption step 221 was depicted and described in connection with FIG. 2*e* above.

Using the system 400 in FIG. 4, additional security can be achieved since Server 101 does not record or operate with server static private key ss 101*b*. The benefits which result from key ss 101*b* being isolated from IP network 107, where devices 103 may connect with Server 101' through insecure networks and Server 101 may need to connect with the insecure networks connected to IP network 107. In other words, using the system 400 in FIG. 4, server static private key ss 101*b* does not need to be recorded in a Server 101' that connects with insecure networks.

Server 101' can send the network 102 a message 214, where a message 214 is depicted and described in connection with FIG. 2*a* above. Message 214 can include an identity associated with device 103 and the device public key 121. The network 102 can receive message 214 and conduct the steps 215 and 216 as depicted and described in connection with FIG. 2*a* above. At step 215, network 102 could conduct a key validation step over the received device public key 121. The network 102 can send Server 101' a message 217, where message 217 includes the network public key 131, a random number random 3 216*a*, as well as identity information for device 103, such as ID.device 103*i*.

Network 102 could then conduct a step 216 to record data from message 214 in a database 102*d*. Exemplary data recorded in database 102*d* is depicted and described in connection with FIG. 2*g* below. Network 102 could record the device identity 103*i*, PK.Device 121*a* and parameters B 121*b* in database 102*d*. Further, network 102 in a step 216 could select or derive a network public key 131 along with a network private key SK.Network 132 for use with device 103 and also store or record the data in database 102*d*. For some embodiments, network 102 does not need to derived network public key 131 and the corresponding network private key SK.Network 132 in a step 216, but rather could use a network public key 131 and corresponding network private key SK.Network 132 that was previously recorded by a network 102 before the receipt of a message 214. Step 216 could also include network 102 generating a random number random 3 216*a*, and random3 216*a* for device 103 with device identity 103*i* could also be stored in database 102*d*.

Network 102 could then send server 101 a message 217 through secure session 201*a*, where message 217 includes identity information for device 103 such as ID.Device 103*i*, the selected or derived network public key 131. Note network public key 131 could include both the numeric value for a network public key of PK.Network 131*a* (or 131*a*' as in FIG. 1*a*) and also a set of associated cryptographic parameters B 131*b* for the network public key value of PK.Network 131*a*. In other words, the combination of the value for network public key of PK. Network 131*a* and the cryptographic parameters B 131*b* can be the network public key 131. In other words, network public key 131 of both 131*a* (or 131*a*') and 131*b* can be equivalent to a certificate such as a root certificate or signed X.509 certificate, where the certificate includes both a public key and parameters associated with the public key. Network public key 131 in a message 217 could be formatted or structured according to an X.509 certificate, where the certificate is signed by a certificate authority. Message 217 could also include a random number, which could be random3 216*a*. Or, the random number in message 217 could be a different random number generated by server 101 (and not network 102) such as random1 203*a*. Message 217 could include more than one random number, such as both random1 203*a* (from message 214) and random3 216*a* generated by network 102 in a step 216.

Server 101 can receive message 217 with random number random3 216*a* and network public key 131 for device 103 and conduct a series of depicted steps 222 and 223, where the series of depicted steps 222 and 223 were depicted and described in connection with FIG. 2*a* above. Message 217 could include identity information to map or identify message 217 with device 103, such as including any of the identity information from a message 297 from device 103 (where Server 101 sends the identity information in a message 214 in FIG. 4). Note that message 217 can include a network public key 131, where a network public key 131 is depicted and described in connection with FIG. 1*a* and also FIG. 2*a* above.

In step 222, Server 101 could use the identity information in message 217 to record the network public key 131 and random3 216*a* in a database 101*d*'. In step 223, Server 101 could conduct an encryption step using key K1 206*a* from the KDF 208 and parameters 104*a* (such as symmetric ciphering parameters 104*f*) to encrypt the network public key 131 and random numbers random1 203*a*, random2 211*a*, and random3 216*a*. The use and operation of an encryption step 223 is also depicted and described in connection with FIG. 2*e* above. As depicted in FIG. 4 with a system 400, the collection of steps and messages for a device 103, server 101, key server 101*w*, and network 102 beginning with step 201*c* for device 103 through and encryption step 223 can comprise a step 405, where a step 405 could optionally be used in a systems 500 and 600 below, as well as other systems herein, including a system 100.

After step 223, Server 101 and device 103 can conduct a step 228 or a step 229, where the selection of a step 228 or step 229 could be specified in server encryption option 104*h* in a selected set of cryptographic parameters A 104*a*. As described for a decryption step 221*a* with step 228 for FIG. 2*e* (or equivalently a decryption step 306 with a step 229 in FIG. 3*c*), Server 101 and network 102 can be authenticated with device 103 by (i) device 103 successfully conducting a decryption step 221*a* or 306 and reading the plaintext random number random1 203*a* previously sent in a message 297 and (ii) device 103 sending a signal or message to server 103 with proof that decryption step 221*a* or 306 has been successfully completed, such as sending or using random number 2 211*a* in the encrypted signal or message.

FIG. 5*a*

Figure 5A:
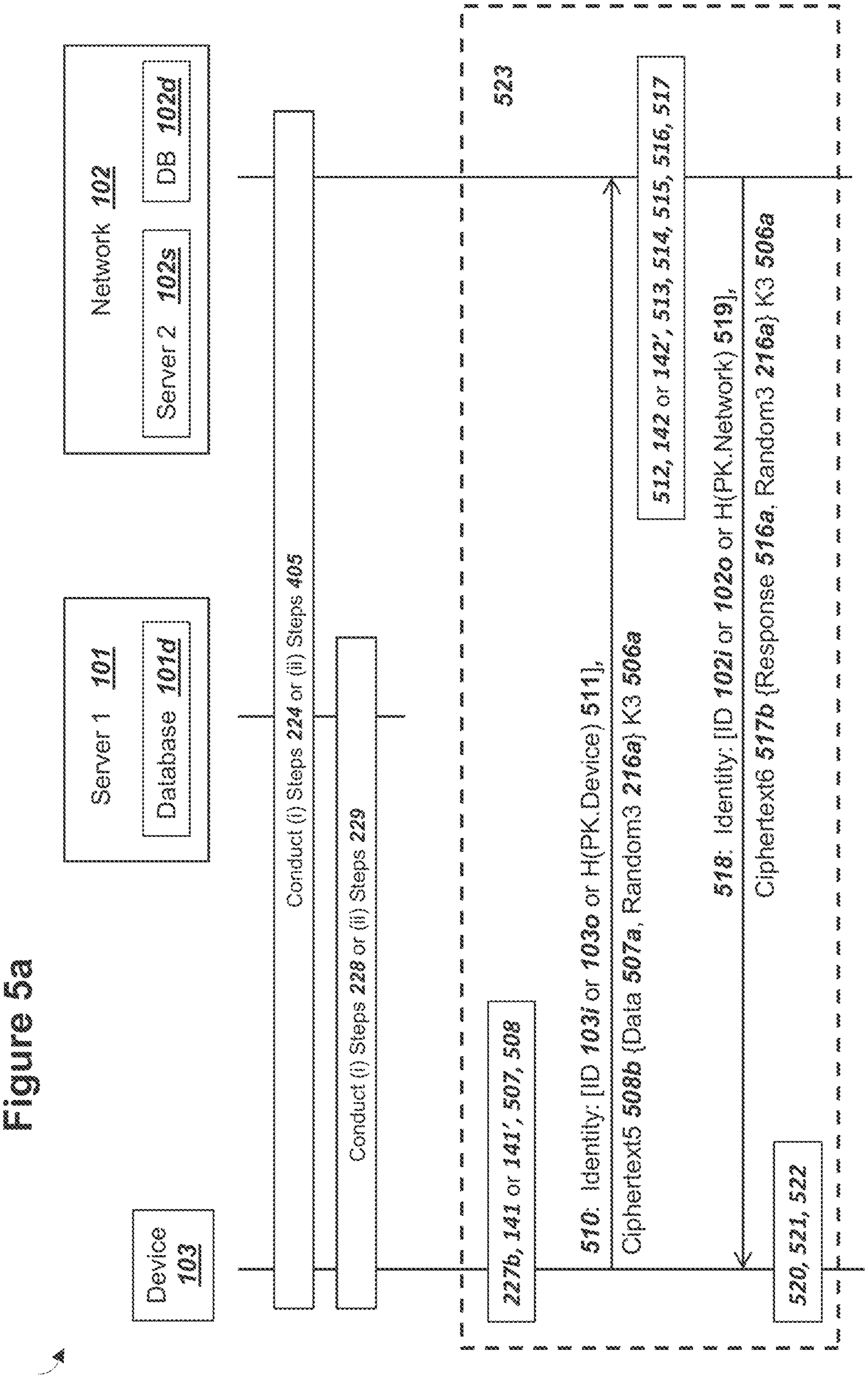
FIG. 5*a* is a simplified message flow diagram illustrating an exemplary system with exemplary data sent and received by a device, a server, and a network, in accordance with exemplary embodiments.

FIG. 5*a* is a simplified message flow diagram illustrating an exemplary system with exemplary data sent and received by a device, a server, and a network, in accordance with exemplary embodiments. A system 500 can include a device 103, a server 101, and a network 102, where the components and operation of the nodes is also depicted and described in FIG. 1*a* through FIG. 4 above. A device 103, server 101, and network 102 can conduct (i) the series of steps and messages for a step 224 from FIG. 2*a* or FIG. 2*b*, or (ii) the series of steps and messages for a step 405 from FIG. 4. The selection of a step 224 or step 405 could be specified in a set of cryptographic parameters 104*a* stored and used by server 101 with a device 103, and other possibilities exist as well for the source of data for the selection of a step 224 or step 405 without departing from the scope of the present invention.

A device 103 and a server 101 could then also conduct a step 228 or a step 229 as depicted and described in connection with FIG. 2*a* above. The selection of a step 228 or step 229 could be specified in a server encryption option 104*h* within a set of cryptographic parameters for both server 101 and device 103. Upon the conclusion of a step 228 or step 229, device 103 could securely store or record network public key 131. Note that network public key 131 can be received by device 103 in both and encrypted and authenticated manner, where device 103 can rely upon the recorded server public key Ss 101*a* in order to trust the network public key 131 received in a step 228 or step 228. Upon the conclusion of a step 228 or 229, network 102 could securely store or record device public key 121. Network 102 can rely upon the server 101 and secure session 201*a* from FIG. 1*a* in order to trust the device public key 121. Network 102 could also conduct a key validation step 215 and device 103 could conduct the key validation step 227*b* in order to further verify and trust the public keys received by the nodes in a system 200.

At step 227*b*, device 103 could complete the key validation step 215 initiated by network 102. Note that a step 227*b* could be conducted by device 103 in a system 500 for embodiments where device 103 omitted a step 227*b* in a step 228 or step 229 above in FIG. 2*a*. For a step 227*b*, device 103 could parse string 215*d* into at least two components of (i) the temporary network public key from a step 215 for the parameters B 121*b*, and (ii) the ciphertext 215*c*. Device 103 could then conduct a key exchange with the temporary network public key and the device public key 121*a* in order to derive the symmetric ciphering key Kt 215*b*. Device 103 can then decrypt the ciphertext 215*c* using the derived symmetric ciphering key Kt 215*b* in order to read the random number 215*a*, which could also comprise a value m 215*c*.

Device 103 could then input the random number 215*a* into the private key derivation function for the encryption scheme in order to generate a value. If the value equals the temporary network public key received in string 215*d*, then device 103 can subsequently use a shared secret from the key exchange in step 501*a* to prove to network 102 that device public key 121 is validated. As one example, the shared secret from the key exchange in a step 501*a* could be input into a KDF 505 below in FIG. 5*b* in order to generate a symmetric ciphering key, and device 103 could send data such as random number random3 216*a* to network 102 using the generated symmetric ciphering key. Note that in some exemplary embodiments the use of a key validation step 215 and 227*b* could be omitted since both network 102 and device 103 can securely rely upon server 101 based on the keys in a system 100 and communications in a system 200*a* and other systems herein.

Device 103 can then perform a step 141 or a step 141' in order to conduct a key exchange or key encapsulation mechanism using the device private key SK.Device 122 and the network public key 131*a*. A step 141 could comprise a key exchange similar to a Diffie Hellman or ECDH key exchange where the respective public and private keys are input in to a key exchange algorithm. A step 141' could comprise a key exchange mechanism equivalent to an asymmetric ciphering algorithm where a secret key or a symmetric ciphering key can be encrypted by device 103 with the network public key 131. Additional details regarding a step 141 and a step 141' are provided below in FIG. 5*b* below. Upon conclusion of a step 141 or 141', device 103 can store and operate with a symmetric ciphering key K3 506*a*.

Device 103 can then conduct a step 507, which can include reading application data, sensor 103*f* data, and/or actuator 103*z* data. Application data could comprise data for the operation of a device program 103*m* or operating system 103*h*. The data read by a device 103 in a step 507 can comprise data 507*a*, and data 507*a* can be data for transmission from device 103 to network 102. Data 507*a* could be control data such as information for registration of device 103 with network 102, or media such as voice, video, or text, and other possibilities exist as well for data 507*a* without departing from the scope of the present invention.

Device 103 can then conduct a step 508 to use the symmetric ciphering key K3 506*a* from a step 141 or 141' above to encrypt plaintext into ciphertext for transmission across the IP network 107. Exemplary details for an encryption step 508 by device 103 are depicted and described in connection with FIG. 5*b* below. In summary, plaintext for encryption can comprise a plaintext 508*a*, where plaintext 508*a* includes data 507*a* and random number random3 216*a*. The output or result from an encryption step 508 can be ciphertext5 508*b*.

Device 103 can then send network 102 a message 510. Device 103 could select a domain name or IP address or URL for sending message 510 to network 102 from several different possible memory locations, including possibly the server public keys table 103*t*, or select the DNS name or URL or IP address from another table or database within nonvolatile memory 103*s* or TRE 113 The DNS name or URL or IP address for network 102 could be recorded at the same time device public key 121 is written or stored or recorded in device 103, such as by a device manufacturer. Or, the DNS name or URL or IP address could be securely received by device 103 before sending message 510. Note that device 103 could use the identity of network 102 from the network identity 102*i* sent in message 297 in FIG. 2*a*.

Figure 5B:
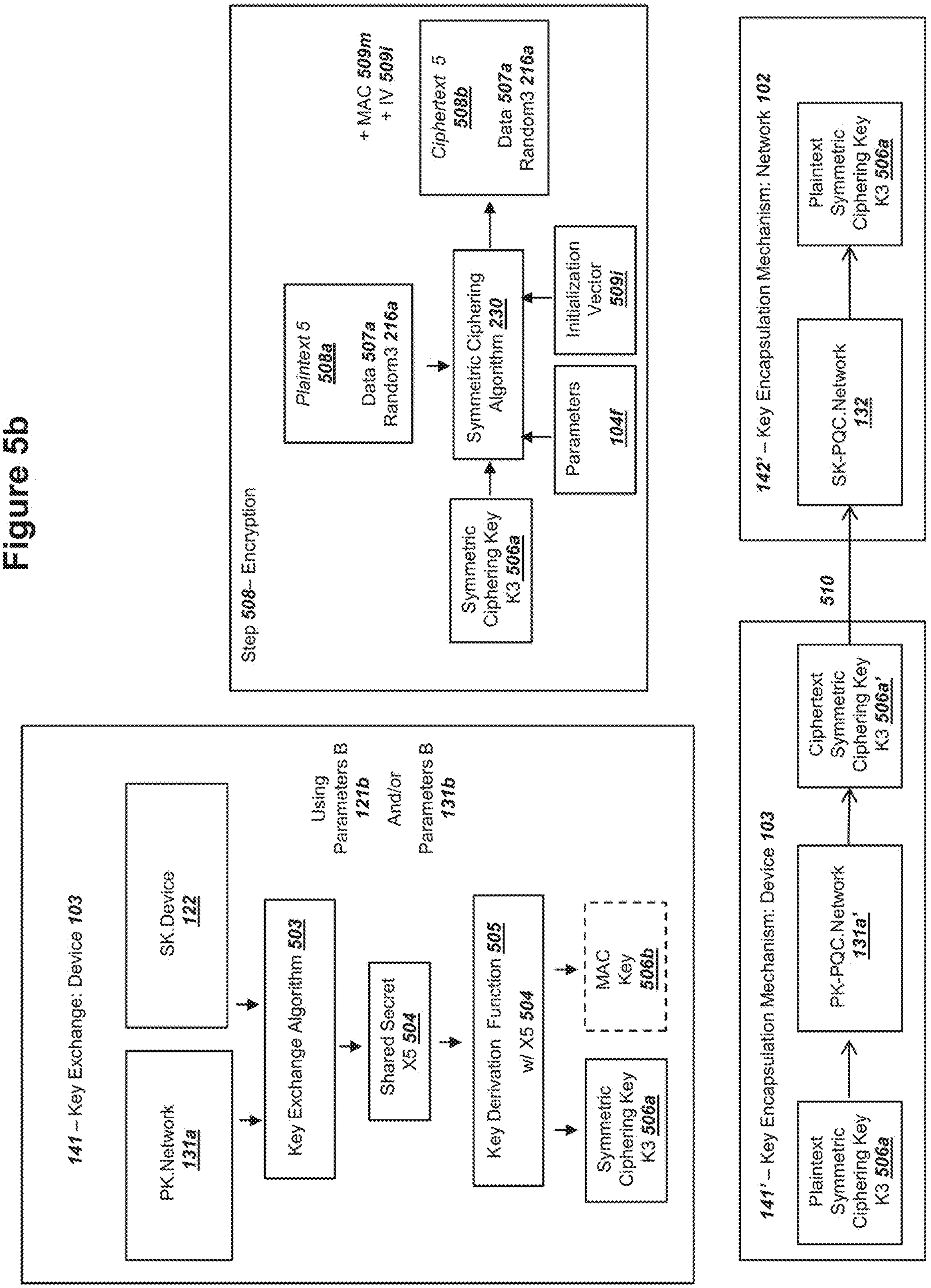
FIG. 5*b* is a flow chart illustrating exemplary steps for conducting a key exchange using PKI keys in order to derive a shared secret key, for using the derived shared secret key to encrypt data, and for a key encapsulation mechanism to transfer an encryption key, in accordance with exemplary embodiments.

Message 510 can include at least an identity of device 103 and the ciphertext5 508*b*. The identity for device 103 could comprise any of ID.device 103*i*, an obfuscated device identity 103*i*, or a secure hash value over PK.device 121*a*, which is depicted as H (PK.Device) 511 in FIG. 5*a*. Note the identity of device 103 in a message 510 can be the same or equivalent to the identity for device 103 sent in message 297 to server 101 from FIG. 2*a*. Although not depicted in FIG. 5*a*, for embodiments where device 103 uses an asymmetric key encryption step 141' for a key exchange mechanism (as depicted in FIG. 5*b*), then a message 510 could include the encrypted key K3 506*a* as ciphertext.

Network 102 could receive message 510 and take steps to process the message and respond. In a step 512, network 102 could use the device identity in message 510 to select the network public key 131 for device 103 from database 102*d*. Network 102 can then conduct a key exchange step 142 or an asymmetric key decryption step 142' in order to derive the symmetric ciphering key K3 506*a*. The steps for a key exchange 142 or an asymmetric key decryption step 142' for network 102 are depicted and described below in connection with FIG. 5*c*. After step 142 or 142', network 102 could read and store symmetric ciphering key K3 506*a*. Network 102 could then conduct a decryption step 513 to convert ciphertext5 508*b* into plaintext5 508*a*, and a decryption step 513 is depicted and described in connection with FIG. 5*c* below. Plaintext5 508*a* can include both data 507*a* and random3 216*a* as plaintext.

In step 514, network 102 could also compare the received value of plaintext random3 216*a* with the transmitted or sent value for random3 216*a*, where the transmitted or sent value for random3 216*a* (from message 217 in FIG. 2*a*) could also be recorded in database 102*d* and selected using the device identity from message 510. For a step 514, if the received value for random3 216*a* equals the transmitted or sent value for random3 216*a* in message 217, then network 102 can authenticate or securely confirm that device 103 records the device public key 121. Network 102 could then process data 507*a* in a step 515 and record or store the data for device 103 in database 102*d*. For a step 514, if the received value for random3 216*a* does not equal the transmitted or sent value for random3 216*a* in message 217, then device 103 could not be authenticated and the data 507*a* in message 510 also rejected. For this case of failed authentication or verification of random3 216*a*, then network 102 could send a failure or rejection message to device 103.

Figure 5C:
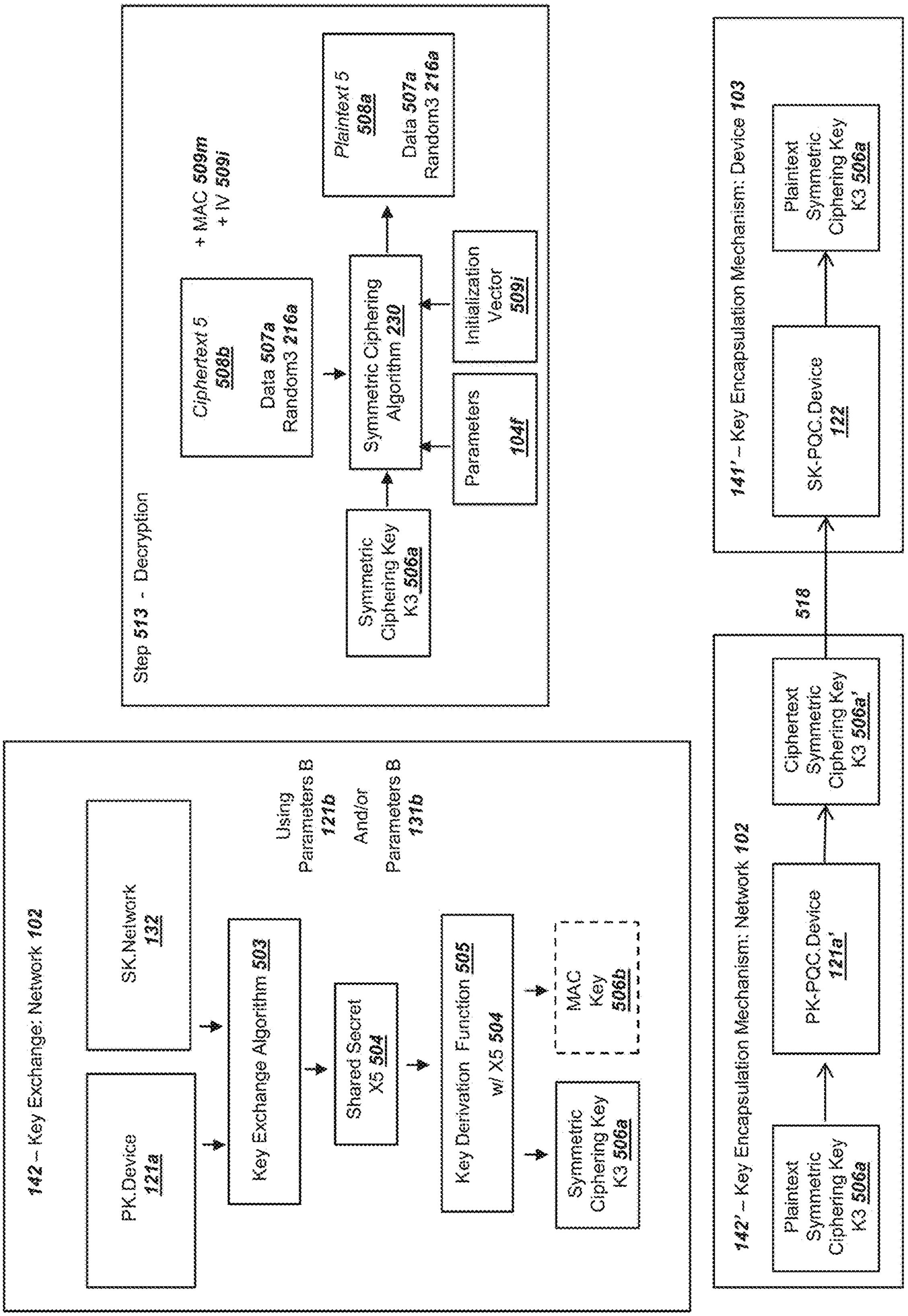
FIG. 5*c* is a flow chart illustrating exemplary steps for conducting a key exchange using PKI keys in order to derive a shared secret key, for using the derived shared secret key to decrypt data, and for a key encapsulation mechanism to transfer an encryption key, in accordance with exemplary embodiments.

In step 516, network 102 could then generate a response 516*a* for device 103 using the data 507*a*. The response 516*a* could include a command or control value for device 103, or setting for a sensor 103*f* or actuator 103*z* for device 103. Other possibilities exist as well for the data in a response 516*a* without departing from the scope of the present invention. Network 102 could then conduct an encryption step 517 to encrypt the plaintext response 516*a* and a random number such as random3 216*a* into a ciphertext6 517*b* using the mutually derived symmetric ciphering key K3 506*a*. An encryption step 517 can be equivalent to the decryption step 513 as depicted in FIG. 5*c* below, except using the symmetric ciphering algorithm 230 and key K3 506*a* for encryption instead of decryption.

Network 102 can then send device 103 a message 518. Message 518 can include an identity of network 102 and the ciphertext6 517*b*. The identity of network 102 in a message 518 could comprise any of network identity 102*i*, an obfuscated network identity 1020 (similar to an obfuscated device identity 1030 from a message 297 in FIG. 2*a*), or a secure hash value over the network public key PK.Network 121*a*. The secure hash value is depicted as H (PK.Network) 519. As contemplated herein, the use and structure of a device identity in message 510 and network identity in message 518 could be specified in parameters A 104*a* or parameters B 121*b* or parameters B 131*b*, and other possibilities exist as well for device 103 and network 102 to agree on the identities of the nodes to use in message 510 and message 518. The parameters could also specify the secure hash algorithm to use over public keys to create H (PK.Device) 511 and H (PK.Network) 519.

Device 103 could receive message 518 and conduct steps to process the message. Device 103 could conduct a step 520 to read the network identity for network 102 in message 518 to determine the symmetric ciphering key K3 506*a* to process the message. As noted above, device 103 could communicate with a plurality of different networks 102 over time, and the network identity in a message 518 could be used to select the symmetric ciphering key K3 506*a* in order to decrypt and process the message 518. Device 103 could record or store a plurality of different keys K3 506*a* for different networks 102 in a table equivalent to a server public keys table 103*t* depicted and described in connection with FIG. 1*d*, where each key K3 506*a* for a network 102 are associated with a network identity.

After selecting the key K3 506*a* using the network identity from a message 518, device 103 could conduct a step 521 to convert the ciphertext6 517*b* into a plaintext6 517*a*. Device 103 could use the selected symmetric ciphering key K3 506*a* and a symmetric ciphering algorithm 230 and parameters 104*f* in order to read the plaintext6 517*a*. Device 103 could use the equivalent of a decryption step 513 as depicted for a network 102 in a decryption step 521, except using the ciphertext6 517*b* as input. Note that the plaintext6 517*a* can include the response 516*a*, which could include a command, instruction, or setting from network 102 for device 103 to use.

After a decryption step 521, device 103 can read the process the plaintext within ciphertext6 517*b*. At step 522, device 103 can verify that the plaintext value for a random number in ciphertext6 517*b* equals the random number send in ciphertext5 508*b*, such as random3 216*a*, in order to prevent replay attacks and other benefits are possible as well for verifying the plaintext random number by device 103 for ciphertext5 508*b* and ciphertext6 517*b*. Upon determining the random numbers are equal, device 103 could then process the response 516*a*, which could include a command, instruction, or setting from network 102 for device 103 to use. Note that the collection of steps and messages in FIG. 5*a* beginning with a step 501 through a step 522 can comprise a step 523, which can be used by the nodes in FIGS. 6*a* through 6*c* below.

FIG. 5*b*

FIG. 5*b* is a flow chart illustrating exemplary steps for conducting a key exchange using PKI keys in order to derive a shared secret key, for using the derived shared secret key to encrypt data, and for a key encapsulation mechanism to transfer an encryption key, in accordance with exemplary embodiments. Exemplary steps for a device 103 to mutually derive a shared secret X5 504 and symmetric key K3 506*a* with Server 101 can comprise a key exchange step 141. Exemplary steps in FIG. 5*b* for a device 103 to encrypt plaintext data using the mutually derived symmetric key K3 506*a* can comprise an encryption step 508. Exemplary steps in FIG. 5*b* for device 103 to conduct a key encapsulation mechanism to transfer a symmetric key K3 506*a* can comprise a KEM 141'. The use of the steps for a key exchange 141, KEM 141' and encryption 508 were also depicted and described in connection with FIG. 5*a* above. Note that steps in FIG. 5*b* and the steps in FIG. 5*c* below can share some algorithms and values, and the descriptions for the algorithms and values in FIG. 5*b* can be applicable for FIG. 5*c*. For example, the key exchange algorithm 503 in FIG. 5*b* can comprise a key exchange equivalent to key exchange algorithm 503 in FIG. 5*c* (but with different numbers input for the algorithm in the two different Figures). The set of parameters B 121*b* or 131*b* depicted and described in FIG. 5*b* can also be used in FIG. 5*c*.

For a key exchange step 141, device 103 can select and input the PK.Network 131, the SK.Device 122, and parameters B 121*b* or 131*b* into a key exchange algorithm 503. The key exchange algorithm 503 could be similar or equivalent to a key exchange algorithm 207 as depicted and described in connection with FIG. 2*c* and FIG. 2*d* above, such as with an ECDH key exchange. Note that other algorithm could be utilized besides ECDH in order to mutually derive a shared secret X5 504. Exemplary data and values for an ECDH key exchange were provided above for key exchange algorithm 207.

Other algorithms besides ECDH could be utilized, such as a Diffie-Hellman key exchange, or possibly a post-quantum cryptography algorithm that support key exchanges. The field of post-quantum cryptography continues to develop with proposed algorithms currently undergoing revisions as of February 2019. In general, the leading candidates for post-quantum cryptography key exchange mechanisms propose using (i) lattice-based cryptography, (ii) code-based cryptography, or (iii) Supersingular elliptic curve isogeny cryptography, as described by the Wikipedia article for "Post-Quantum Cryptography" dated Feb. 22, 2019, which is hereby incorporated by reference.

Algorithms which support a key exchange could be used with a key exchange step 141 and a key exchange algorithm 503 in order to support mutual derivation of a shared secret X5 504 using the depicted PKI keys. A mutually derived shared secret X5 504 could be input into a key derivation function 505 in order to derive a symmetric ciphering key K3 506*a* and an MAC key 506*b*. The key derivation function 505 could be equivalent or similar to a key derivation function 208 as depicted and described in connection with FIG. 2*c* and FIG. 2*d*, although different KDF algorithms could be used in a key exchange 141 than a key exchange 206 or 218, such as using different secure hash algorithms in a KDF 505 than a KDF 208.

As depicted in FIG. 5*b*, a network public key 131 of a PK-PQC.Network 131*a'* with associated cryptographic parameters and algorithms could optionally be used with a key encapsulation mechanism in a step 141' instead of a key exchange step 141. For these embodiments, the cryptographic algorithms associated with PC-PQC.Network 131*a'* may not support a key exchange step 503 used with a key exchange 141. In other words, some post-quantum cryptographic algorithms may not support a key exchange equivalent to an ECDH key exchange or a traditional DH key exchange, and in this case the use of a KEM 141' can be preferred. With a KEM 141', device 103 can derive a symmetric ciphering key K3 506*a* (such as simply creating a random number as K3 506*a*), then encrypt the key K3 506*a* with the PK-PQC.Network 131*a'* in order to create a ciphertext key K3 506*a'*. The algorithm used for a KEM 141' could be selected from the KEM listed for Round 2 of the Wikipedia article titled "Post-Quantum Cryptography Standardization" dated Feb. 22, 2019, which is herein incorporated by reference. A network 102 could receive the ciphertext key K3 506*a'* in a message 510 (along with ciphertext5 508*b* from FIG. 5*a*) and decrypt the ciphertext key K3 506*a'* into a plaintext key K3 506*a'* using the SK-PQC.Network 132 using a KEM decryption step 142'. The specific algorithms steps for a key encryption step 141' by device 103 and a key decryption step 142' by network 102 can be found for each titled KEM in the Wikipedia article referenced in this paragraph.

Device 103 can conduct an encryption step 508, where the use for an encryption step 508 is depicted and described in connection with FIG. 5*a* above. Plaintext5 508*a* in a step 508 can comprise the random number random3 216*a* from network 102 in message 517 and data 507*a* from a step 507. Other or different exemplary data could be included as plaintext5 508*a* in an encryption step 508. The symmetric ciphering key for encryption step 508 can comprise symmetric key K3 506*a* from a key derivation step 141 or key encapsulation mechanism 141' above and a MAC key 506*b* can be input into a symmetric ciphering algorithm 230 as well. Or, symmetric key K3 506*a* and MAC key 506*b* could be derived by device 103 using a KEM 141' and transmitted or sent in a message 510.

Encryption step 508 in FIG. 5*b* and decryption step 513 in FIG. 5*c* can use a common symmetric ciphering algorithm 230, which could comprise the Advanced Encryption Standard with Synthetic Initialization Vectors (AES-SIV) (and deciphering algorithm) also with a common set of symmetric ciphering parameters A 104*f* from a set of cryptographic parameters A 104. Note that parameters B for use with device public key 121 and network public key 131 could also specify parameters for symmetric ciphering algorithm 230. MAC key 506*b* can also be input into symmetric ciphering algorithm 230 along with an initialization vector 509*i*. The output or result from an encryption step 508 can comprise ciphertext5 508*b*.

Other or different symmetric ciphering algorithms 230 could be utilized as well, such as, but not limited to such as AES, Triple Data Encryption Standard (3DES), Blowfish, or related algorithms. Symmetric ciphering parameters A 104*f* can also specify the use of a block chaining mode such as cipher block chaining (CBC), counter mode (CTR), or Galois/Counter mode (GCM) and other possibilities exist as well. In addition, symmetric ciphering parameters A 104*f* could specify a mode for message authentication, which could comprise a CMAC mode as specified in NIST publication SP-800-38B. In some exemplary embodiments, a symmetric ciphering algorithm 230 can comprise the AES-SIV algorithm as specified in IETF RFC 5297. The output from an encryption step 508 using a symmetric ciphering algorithm 230 and the depicted values input can be ciphertext 508*b*, as depicted in FIG. 5*b*. The output from an encryption step 508 using a symmetric ciphering algorithm 230 and the depicted values input can also include MAC code 209*m*, where MAC code 509*m* can be used by the receiving party with the MAC key 506*b* to verify message integrity. The initialization vector 509*i* can be sent along with the ciphertext 508*b* in order for both sides to commonly initiate block chaining.

FIG. 5*c*

FIG. 5*c* is a flow chart illustrating exemplary steps for conducting a key exchange using PKI keys in order to derive a shared secret key, for using the derived shared secret key to decrypt data, and for a key encapsulation mechanism to transfer an encryption key, in accordance with exemplary embodiments. Exemplary steps for a network 102 to mutually derive a shared secret X5 504 and symmetric key K3 506*a* with device 103 can comprise a key exchange step 142. Exemplary steps in FIG. 5*c* for a network 102 to decrypt ciphertext data using the mutually derived symmetric key K3 506*a* can comprise a decryption step 513. Exemplary steps in FIG. 5*c* for network 102 to conduct a key encapsulation mechanism to transfer a symmetric key K3 506*a* can comprise a KEM 142'. The use of the steps for a key exchange 142, KEM 142' and decryption 513 were also depicted and described in connection with FIG. 5*a* above.

Note that steps in FIG. 5*c* and the steps in FIG. 5*b* above can share some algorithms and values, and the descriptions for the algorithms and values in FIG. 5*c* can be applicable for FIG. 5*b*. For example, the key exchange algorithm 503 in FIG. 5*c* can comprise a key exchange equivalent to key exchange algorithm 503 in FIG. 5*b* (but with different numbers input for the algorithm in the two different Figures). The set of parameters B 121*b* or 131*b* depicted and described in FIG. 5*c* can also be used in FIG. 5*b*.

For a key exchange step 142, network 102 can select and input the SK.Network 132, the PK.Device 121*a*, and parameters B 121*b* or 131*b* into a key exchange algorithm 503. The key exchange algorithm 503 could be similar or equivalent to a key exchange algorithm 207 as depicted and described in connection with FIG. 2*c* and FIG. 2*d* above, such as with an ECDH key exchange. Note that other algorithm could be utilized besides ECDH in order to mutually derive a shared secret X5 504. Exemplary data and values for an ECDH key exchange were provided above for key exchange algorithm 207.

Other algorithms besides ECDH could be utilized, such as a Diffie-Hellman key exchange, or possibly a post-quantum cryptography algorithm that support key exchanges. The field of post-quantum cryptography continues to develop with proposed algorithms currently undergoing revisions as of February 2019. In general, the leading candidates for post-quantum cryptography key exchange mechanisms propose using (i) lattice-based cryptography, (ii) code-based cryptography, or (iii) Supersingular elliptic curve isogeny cryptography, as described by the Wikipedia article for "Post-Quantum Cryptography" dated Feb. 22, 2019, which is hereby incorporated by reference.

Algorithms which support a key exchange could be used with a key exchange step 142 and a key exchange algorithm 503 in order to support mutual derivation of a shared secret X5 504 using the depicted PKI keys. A mutually derived shared secret X5 504 could be input into a key derivation function 505 in order to derive a symmetric ciphering key K3 506*a* and an MAC key 506*b*. The key derivation function 505 could be equivalent or similar to a key derivation function 208 as depicted and described in connection with FIG. 2*c* and FIG. 2*d*, although different KDF algorithms could be used in a key exchange 142 than a key exchange 206 or 218, such as using different secure hash algorithms in a KDF 505 than a KDF 208.

As depicted in FIG. 5*c*, a device public key 131 of a PK-PQC.Device 121*a'* with associated cryptographic parameters and algorithms could optionally be used with a key encapsulation mechanism in a step 142' instead of a key exchange step 142. For these embodiments, the cryptographic algorithms associated with PC-PQC.Device 121*a*' may not support a key exchange step 503 used with a key exchange 142. In other words, some post-quantum cryptographic algorithms may not support a key exchange equivalent to an ECDH key exchange or a traditional DH key exchange, and in this case the use of a KEM 142' can be preferred. With a KEM 142', network 102 can derive a symmetric ciphering key K3 506*a* (such as simply creating a random number as K3 506*a*), then encrypt the key K3 506*a* with the PK-PQC.Device 121*a*' in order to create a ciphertext key K3 506*a*'. The algorithm used for a KEM 142' could be selected from the KEM listed for Round 2 of the Wikipedia article titled "Post-Quantum Cryptography Standardization" dated Feb. 22, 2019, which is herein incorporated by reference.

A device 103 could receive the ciphertext key K3 506*a*' in a message 518 (along with ciphertext6 517*b* from FIG. 5*a* in message 518) and decrypt the ciphertext key K3 506*a*' into a plaintext key K3 506*a*' using the SK-PQC.Device 122 using a KEM decryption step 141'. The specific algorithms steps for a key encryption step 142' by network 102 and a key decryption step 141' by device 103 can be found for each titled KEM in the Wikipedia article referenced in this paragraph above. In some exemplary embodiments, two different keys K3 506*a* could be utilized, in order to confirm that both (i) network 102 records and uses SK.Network 132 and (ii) device 103 records and uses SK.Device 122. Device 103 could conduct a KEM 141' to asymmetrically encrypt a first key K3 506*a*' and transmit the first key K3 506*a*' to network 102 in a message 510 (where the ciphertext5 506*b* is encrypted with the first key K3 506*a*'). Network 102 could conduct a KEM 142' to asymmetrically encrypt a second key K3 506*a*' and transmit the second key K3 506*a*' to device 103 in a message 518 (where the ciphertext6 517*b* is encrypted with the second key K3 506*a*').

A decryption 513 step by network 102 converts the ciphertext5 508*b* into the plaintext5 508*a* using the secret symmetric ciphering key K3 506*a*. For a decryption step 513 by network 102, network 102 could use a symmetric ciphering algorithm 230 with input of ciphertext5 508*b*, secret symmetric ciphering key K3 506*a*, parameters A 104*f*, and an initialization vector 509*i* in order to output a plaintext 508*a*. The plaintext 508*a* resulting from a decryption step 513 with ciphertext5 508*b* may include data 507*a* and include or use a random number such as random3 216*a*. Data 507*a* was described above with a step 507 for device 103 and random3 216*a* could be derived or generated by network 102 in a step 216 above in FIG. 2*a* and FIG. 4.

The symmetric ciphering algorithm 230 can receive input of the derived symmetric ciphering key K3 506*a*. The output or result from a decryption step 513 using a key K3 506*a* from either (i) a key exchange step 142 or (ii) a key encapsulation mechanism 142' can comprise plaintext 508*a*. Other data could be included in plaintext 508*a* for a decryption step 513 without departing from the scope of the present invention. In exemplary embodiments a MAC key 506*b* could also be use with decryption step 513, in order to calculate a MAC code 509*m*. The initialization vector 509*i* and MAC code 509*m* could comprise plaintext "metadata" that is received along with the ciphertext5 508*b* in a message 510.

Network 102 can verify message integrity of ciphertext5 508*b* by comparing a received MAC code 509*m* with a calculated MAC code 509*m* using MAC key 506*b*. After reading plaintext5 508*a* from a decryption step 513, network 102 can take the additional steps to process the data as depicted in FIG. 5*a* above, such as steps 514, 515, etc.

Network 102 could then use symmetric ciphering key K3 506*a* to create ciphertext6 517*a* using an encryption step equivalent to encryption step 508 for device 103 above in FIG. 5*b*. As depicted and described in connection with FIG. 5*a*, ciphertext6 517*a* could be included in a message 518 back to device 103 and include a response 516*a* and a random number such as random3 216*a*. In some exemplary embodiments, a message 518 could include a new random number such as a random4, and device 103 could use the new random number such as random4 in subsequent messages from device 103 to network 102.

FIG. 6*a*

Figure 6A:
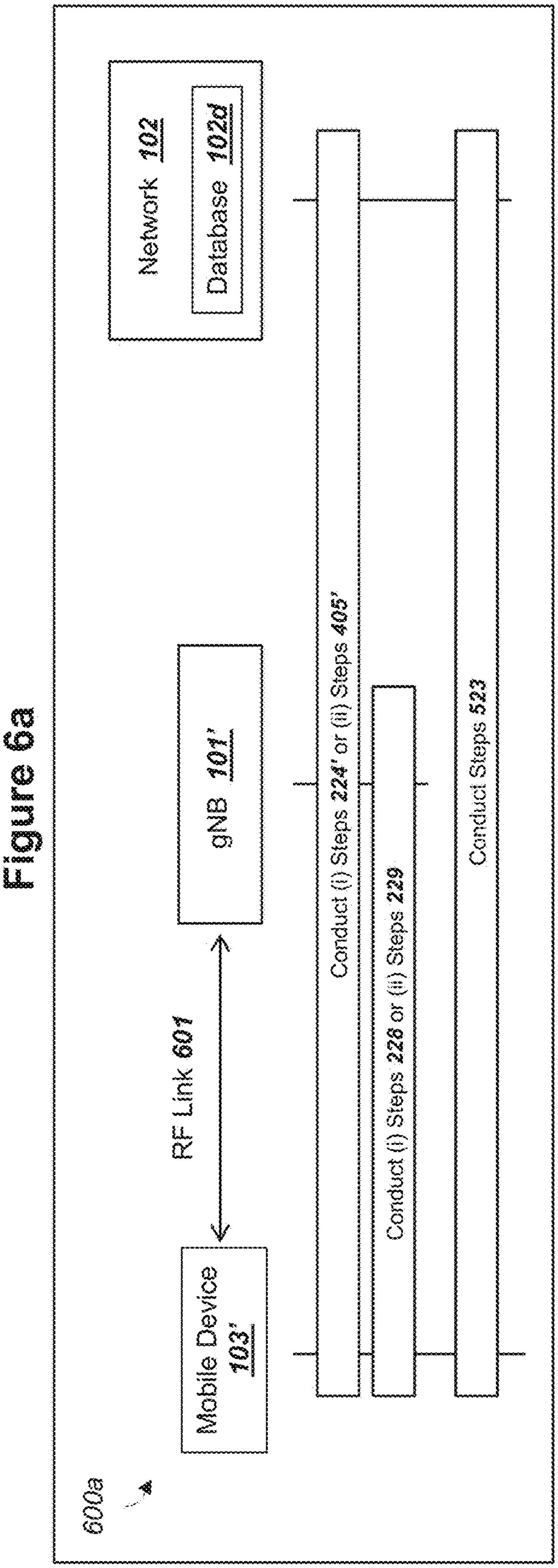
FIG. 6*a* is a simplified message flow diagram illustrating an exemplary system with exemplary data sent and received by a mobile device, a g node b, and a network, in accordance with exemplary embodiments.

FIG. 6*a* is a simplified message flow diagram illustrating an exemplary system with exemplary data sent and received by a mobile device, a g node b, and a network, in accordance with exemplary embodiments. System 600*a* can include a mobile device 103', a "next generation node b" 101', and a network 102. Mobile device 103' can comprise a smart phone, a device for the "Internet of Things" (IoT), a tablet with a modem, or possibly a fixed station device that connects with a 5G or 6G network. Mobile device 103' can operate similar to a device 103, with the additional functionality of connecting to a wireless network, where the wireless network can support 3GPP standards and can also comprise a wide area network such as a public land mobile network. A "next generation node b" 101' (depicted as gNb 101') can contain the equivalent electrical components as those depicted for a Server 101 in FIG. 1*c*, except gNb 101' can also operate as a base transceiver station or with a radio to send and receive data wirelessly with mobile device 103'. The network 102 could operate as part of an Authentication Server Function (AUSF) or equivalent functionality of a core network for a mobile network operator. Or, in other exemplary embodiments, network 102 could operate as a network of a service provider for applications operating on mobile device 103 and network 102 could be independent of a mobile network operator.

Note that use of (i) steps 224 and 228 or 229 as depicted with system 200*a* in FIG. 2*a* and (ii) steps 405 in system 400 in FIG. 4 have benefits for the wireless WAN architecture in FIG. 5*a*. One benefit is that the transfer of public keys for a mobile device 103' (e.g. device public key 121) and a network 102 (e.g. network public key 131) can be encrypted in a secure manner that is robust to post-quantum cryptography, since the static public keys for the encryption (e.g. keys Ss 101*a* and Sd 101*c*) are not transmitted through IP network 107 or RF Link 601. A second potential benefit using the embodiment of system 400 in FIG. 4 with a step 405, a gNb 101' does not need to record or operate with the server static private key ss 101*b*. These benefits increase security, since a gNb 101' may be operated in insecure locations.

In exemplary embodiments, a mobile device 103', a gNb 101', and a network 102 can conduct a step 224' or a step 405'. A system 600*a* can use the same or equivalent components, steps, and messages as a system 200*a* or 200*b*, with some differences between the systems described in this FIG. 6*a*. Note that before the steps 224' depicted in FIG. 6*a*, a mobile device 103' and a gNb 101' could conduct steps to establish communications between the nodes, such as recording parameters for RF communications by the mobile device 103' in a SIM card or eUICC or "Smart Secure Platform" (SSP) from ETSI standard TS 103 666. A mobile device 103' could also conduct steps to authenticate the network 102 operating a gNb 101', such as obtaining keys for accessing network 102 through a different or initial gNb, which could be different than the gNb 101' in system 600*a*. Step 224' can comprise primarily the step 224 as depicted and described in FIG. 2*a*. Step 405' can comprise primarily the step 405 as depicted and described in FIG. 4

For a step 224' or step 405', a mobile device 103' can send message 297 through RF link 601. Message 297 can include the device ephemeral public key Ed 103*a* and also an obfuscated identity ID.device-obfuscated for device 103', where the obfuscated identity can also comprise a temporary identity for device 103. A gNb 101' can use the obfuscated identity to track the device 103 from a potential plurality of devices 103 communicating over a wireless network.

In exemplary embodiments for a system 600*a*, the device identity ID.device 103*i*, which could comprise an IMSI value for 4G LTE networks, or a SUPI value or equivalent for 5G and 6G networks, can be included in ciphertext 209*b* in message 297, such as with message 297*a* in FIG. 2*b* for a step 224. The gNb 101' can use the mutually derived key K1 206*a* to decrypt the ciphertext 209*a* and read the plaintext ID.device 103*i*. Using a system 600*a*, a mobile device can securely send a permanent or long-term subscription identity to a network in a single message comprising message 297 from a step 224.

For a step 405', the gNb 101' can send the device ephemeral public key Ed 101*a* and identifying information for device 103 to a key server 101*w* for a step 405 in FIG. 4*a*, and key server 101*w* could conduct the ECHD key exchange step 207 and send the resulting shared secret value X0 207*a* to gNb 101'. For a step 224' or a step 405', the gNb 101' can use the received device ephemeral public key Ed 103*a* to calculate a symmetric ciphering key K1 206*a* and decrypt ciphertext in message 297, where plaintext from the ciphertext can include a device public key 121. The gNb 101' can forward to network 102 the device public key 121 and receive a network public key 131 from network 102. The gNb 101' can conduct a step 228 or a step 229 to send device 103 the network public key 131 in an encrypted, authenticated, and secure manner. The selection of a step 228 or step 229 could be specified in a set of parameters A 104*a*, such as a server encryption option 104*h* as depicted and described in connection with FIG. 2*g*. Other settings or data in device 103 and gNb 101' could specify the selection for the use of both (i) step 224' or step 405' and (ii) step 228 or step 229 without departing from the scope of the present invention.

After the secure transfer of (i) device public key 121 to network 102, and (ii) the network public key 131 to device 103, device 103 and network 102 can conduct the step 523 in order to securely communicate using the public keys from (i) and (ii). Exemplary steps and messages for a step 523 were depicted and described in connection with FIG. 5*a* above. In general, the security of a system 600*a* can be enhanced compared to conventional technology, because (i) the device public key 121 and the network public key 131 are transmitted only as ciphertext over RF link 601, and (ii) the ciphertext is created using encryption keys such as K1 and/or K2 that are derived from PKI keys that are not transmitted over RF Link 601 (e.g. keys Ss 101*a* and Sd 103*c*).

In exemplary embodiments for a system 600*a*, the static server public key Ss 101*a* recorded in mobile device 103' can comprise a unique key for mobile device 103. In other words, key Ss 101*a* can comprise a unique key 101*v* as depicted and described in connection with FIG. 1*d*. The mobile device 103' and gNb 101' can then conduct either (i) a step 228 to receive a ciphertext 2 223*b* from gNb 101' or (ii) a step 229 to receive a ciphertext 3 302*b* along with the server ephemeral public key Es 101*a*. The successful decryption of ciphertext 2 223*b* or ciphertext 3 302*b* by mobile device 103' can confirm that gNb 101' is authenticated where gNb 101' can record or have access to the private key ss 101*b* corresponding to the public keys Ss 101*a* recorded in mobile device 103' Although depicted as a "gNb 101'", the gNb 101' could comprise radio equipment for establishing an RF link 601 with device an could operate as a radio transmitting and receiving component for a mobile network in a 6th generation or 6G network as well as a 5th generation or 5G network.

FIG. 6*b*

Figure 6B:
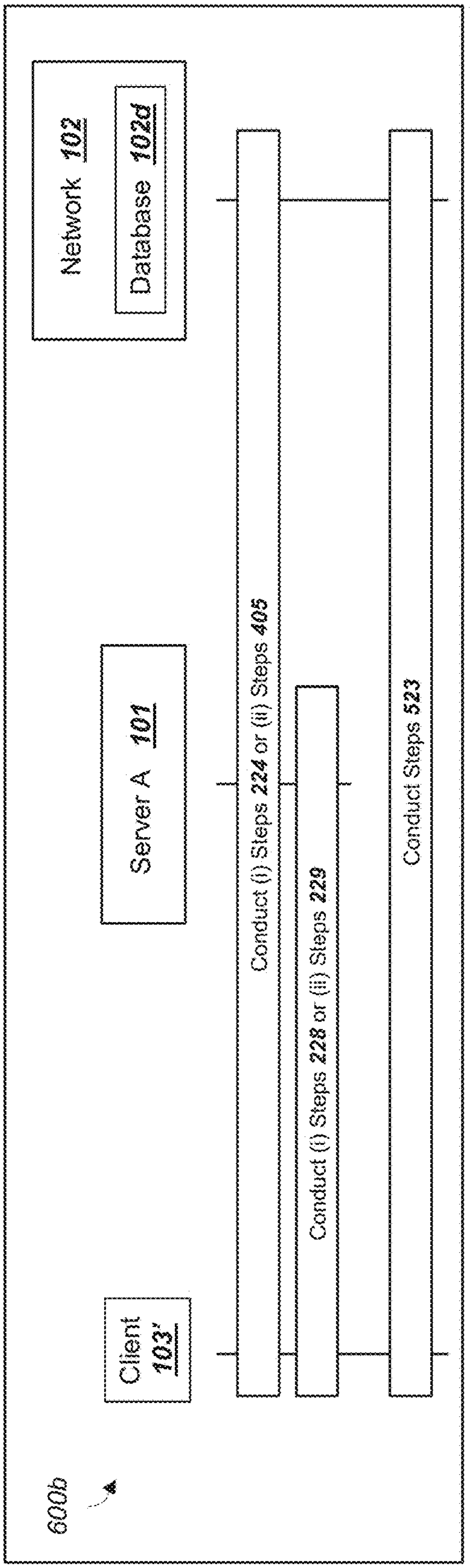
FIG. 6*b* is a simplified message flow diagram illustrating an exemplary system with exemplary data sent and received by a client, a server, and a network, in accordance with exemplary embodiments; and, FIG. 6*c* is a simplified message flow diagram illustrating an exemplary system with exemplary data sent and received by a radio-frequency identification (RFID) tag for a device, a RFID reader, and a network, in accordance with exemplary embodiments.

FIG. 6*b* is a simplified message flow diagram illustrating an exemplary system with exemplary data sent and received by a client, a server, and a network, in accordance with exemplary embodiments. System 600*b* can include a client 103', a server 101, and a network 102. In exemplary embodiments, client 103' can comprise a client using security steps as described in by transport layer security (TLS) sessions version 1.3 and also subsequent and related versions of IETF RFC standards. Client 103' can also comprise a client using security steps as described in datagram transport layer security (DTLS) RFC 6347 and subsequent versions that incorporate ECDH key exchanges. Other protocols could be supported by a client 103' as well with server 101, including versions of secure shell (SSH), Message Queuing Telemetry Transport (MQTT), IP Security (IPSec), WiFi, Bluetooth, the device provisioning protocol (DPP), an open firmware loader (OFL), or a protocol for the embedded SIM.

Client 103' can comprise a computing device such as a personal computer, a laptop computer, or another server, where client 103' that records a server static public key Ss 101*a*. Note that TLS version 1.3 and DTLS version 1.3 contemplate that the client and a server can use ephemeral ECDH key exchanges (one on the client and one on the server) in order to establish a mutually derived secret shared key for a symmetric ciphering algorithm. The difference between (i) a client 103' (which can comprise a device 103 supporting TLS or DTLS standards) and (ii) a client for TLS or DTLS standards can be that client 103' can record and use a server static public key Ss 101*a*, and the server 101 can also record and use the device static public key Sd 103*c*. The public keys could be received by client 103' and a server 101 in a secure manner before a client 103' conducts a step 224 or step 405 with Server 101. Settings or data in client 103' and server 101 could specify the selection for the use of both (i) step 224 or step 405 and (ii) step 228 or step 229 without departing from the scope of the present invention.

The use of server static public key Ss 101*a* by client 103' in a step 224 to conduct an ECDHE key exchange with Server 101 can have many benefits. The standard handshake as currently proposed for TLS version 1.3 as of February 2019 assumes that a client 103' and a Server 101 have no prior relationship. However, for many instances of communication between a client 103' and a Server 101, the manufacturer or distributor of a device operating a client 103' could also operate a server 101, and thus the keys Ss 101*a* for client 103' and the keys Sd 103*c* for server 101 could be respectively securely established and stored before a user begins operating client 103'. Steps 224 in FIG. 6*b* can comprise the set of steps 224 depicted and described in connection with FIG. 2*a*, and steps 405 in FIG. 6*b* can comprise the set of steps 405 depicted and described in connection with FIG. 4, and steps 228 in FIG. 6*b* can also comprise the set of steps 228 depicted and described in connection with FIG. 2*a*. Steps 229 in FIG. 6*b* can be the set of steps 229 in FIG. 2*a*.

Before conducting step 224 in FIG. 6*b*, a client 103' could receive key Ss 101*a* from another server associated with server 101, such as a different web server providing functionality equivalent to Server 101. In an exemplary embodiment, key Ss 101*a* could be securely received by client 103 using the steps 224, and then 228 or 229 with a first, different server that provides equivalent functionality as server 101. In other words, key Ss 101*a* could be received by client 103' (or device 103 in other Figures herein) by client 103' receiving the key Ss 101*a* as a network public key 131 from a message 225 or 229*a*. Further, server 101 could receive the key Sd 103*c* as a device public key 121 from a message 297 in a step 224, where server 101 received the key Sd 103*c* from the steps 224, 229, and 522 as well.

For a step 224 or 405, a client 103' can derive a device ephemeral public key Ed 103*a* and send Server 101 a message 297. The message 297 can include the key Ed 103*a* and a set of cryptographic parameters A 104*a*. In exemplary embodiments where client 103' implements TLS or DTLS, when message 297 can optionally omit a device identity ID.device 103*i*. Server 101 could operate in a manner such that server 101 conducts the steps depicted for server 101 in FIG. 2*a* including conducting the key exchange 218 and decryption 221. As depicted in FIG. 2*d*, server 101 could use at least keys Ed 103*a*, ss 101*b*, and Sd 103*c* in order to derive a symmetric ciphering key K1 206*a*.

Thus, by using the embodiment depicted in FIG. 6*b*, a transport layer security session and similar protocols can have security increased, where (a) an ECDHE key exchange can also add the use of (b) both a server static PKI key pair and a device static PKI key pair. Note that the mutual derivation of symmetric ciphering key K1 206*a* by client 103' and Server 101 can comprise a mutual authentication of Server 101 and device 103, since Server 101 and device 103 can only derive the key K1 206*a* if (a) Server 101 operates or has access to key ss 101*b* and (b) device 103 records and operates with device static private key sd 103*d*.

Note that a step 224 for FIG. 6*b* increases security for a TLS session. Without the use of server static public key Ss 101*a* and a device static private key sd 103*d* by client 103, an active attacker could operate as a "man in the middle" between a real client or "true client" and the Server 101, where the "man in the middle" could derive its own key Ed 103*a* and substitute that for the real key Ed 103*a* from the real client or "true client". Message 225 in a step 228 or message 229*a* in a step 229 could comprise a "Server Hello" similar to a "Server Hello" for TLS v1.3 in the document "draft-ietf-tls-tls13-28". The ciphertext in the Server Hello can be ciphertext 2 223*b* as depicted in FIG. 2*a*, where the ciphertext 2 223*b* is encrypted with the mutually derived symmetric ciphering key K1 206*a*.

Without use of public keys Ss 101*a* and private key sd 103*d* in a key exchange step 206 by client 103', a "man in the middle" (deriving and substituting a key Ed 103*a*) could (a) mutually derive a symmetric ciphering key similar to K1 206*a* with Server 101 and then (b) receive and decrypt the ciphertext 2 223*b*. However, the use of Ss 101*a* for deriving encryption key K1 206*a* can stop a "man in the middle" attack since a "man in the middle" cannot derive key K1 206*a* without also recording ss 101*b*, which can remain secret and not available to the "man in the middle". In this manner, the communications for a TLS session or DTLS session (or related protocols listed above) can remain secured using a (i) step 224 or step 405 and (ii) step 228 or step 229, while recording and using (i) ss 101*b* with Server 101 or key server 101*w* (when using step 405) and (ii) Ss 101*a* with client 103'.

In addition, Server 101 can send client 103' a ciphertext using a step 228 or a step 229. For a step 228, Server 101 can create a ciphertext 223*b* using key K1 206*a*. For a step 229 instead of a step 228, where Server 101 can (i) derive a server ephemeral public key Es 101*a* and (ii) use the corresponding private key es 101*b* to encrypt a ciphertext 302*b* for a step 229. The Server 101 and client 103 can select a step 228 or 229 for Server 101 to send client 103 ciphertext. The use of a step 228 or step 229 could be specified in a set of cryptographic parameters 104*h* recorded in the two devices. Other possibilities exist for the use of a step 224 or step 405 and a step 228 or step 229 between a client 103' and Server 101 without departing from the scope of the present invention.

After the secure transfer of (i) device public key 121 to network 102 (via a step 224), and (ii) the network public key 131 to device 103 (via a step 228 or 229), device 103 and network 102 can conduct the step 523 in order to securely communicate using the public keys from (i) and (ii). Exemplary steps and messages for a step 523 were depicted and described in connection with FIG. 5*a* above. In general, the security of a system 600*b* can be enhanced compared to conventional technology, because (i) the device public key 121 and the network public key 131 are transmitted only as ciphertext, and (ii) the ciphertext is created using encryption keys such as K1 and/or K2 that are derived from PKI keys (e.g. keys Ss 101*a* and Sd 103*c*) that could be securely recorded by client 103' and server 101 before a step 224.

FIG. 6*c*

Figure 6C:
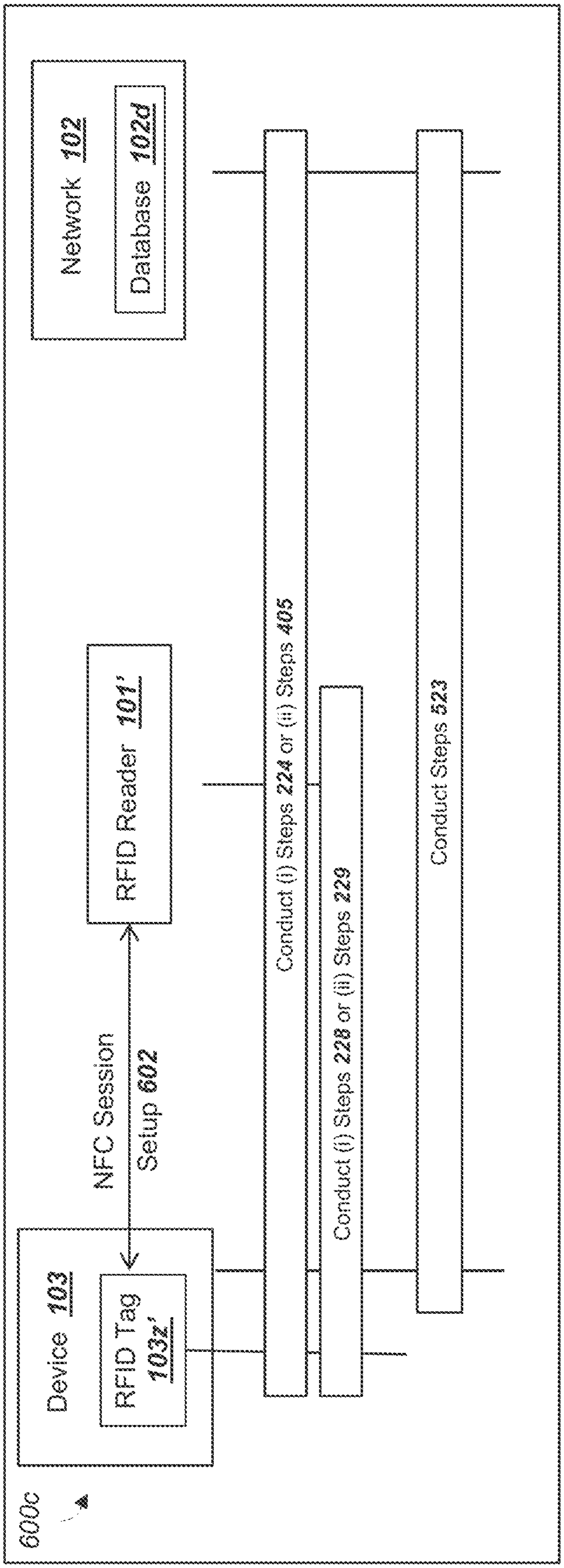

FIG. 6*c* is a simplified message flow diagram illustrating an exemplary system with exemplary data sent and received by a radio-frequency identification (RFID) tag for a device, a RFID reader, and a network, in accordance with exemplary embodiments. System 600*c* can include an RFID tag 103*z*', a RFID reader 101' and a network 102. RFID tag 103*z*' (or "tag 103*z*'") could comprise a tag supporting International Standards Organization (ISO) standards such as ISO 15693, and other possibilities exist as well. Tag 103*z*' could comprise an NFC tag such as a tag compatible with the NFC Forum standards for type 1 through type 5 tags (and subsequent or related standards). The NFC technology could also be NFC-A, NFC-B, or NFC-V, or subsequent standards. RFID tag 103*z*' could operate within a device 103, as depicted in FIG. 6*c*.

RFIC reader 101' could comprise a compatible reader of RFID tag 103*z*' and could support ISO standards 11784 and 11785 and other possibilities exist as well. Network 102 can comprise a network 102 as depicted and described above in connection with FIG. 1*a*, FIG. 1*d*, FIG. 2*a*, and other figures herein. RFID tag 103*z*' can operate within a device 103 with the specific functionality to communicate using near field communications (NFC) such as supporting a NFC session setup 602. RFID reader 101' can comprise the functionality and component of a Server 101 depicted and described in connection with FIG. 1*a*, FIG. 1*c*, FIG. 2*a*, and other figures herein. For the exemplary embodiment depicted in FIG. 6*c*, both RFID tag 103*z*' and RFID reader 101' (or "reader 101'") can include a radio for NFC communications.

In exemplary embodiments, tag 103*z*' and reader 101' can conduct an NFC session setup 602. The air interface for NFC session setup 602 could support a session using ISO/IEC 18092/ECMA-340, "Near Field Communication Interface and Protocol-1" and ISO/IEC 21481/ECMA-352, "Near Field Communication Interface and Protocol-2 (NFCIP-2)".

The air interface for NFC session setup 602 could also comprise subsequent or related versions to these standards. Other possibilities exist as well for the protocol used in an NFC session setup 602 without departing from the scope of the present invention. NFC session setup 602 can establish the physical and data-link layers of communications between tag 103*z*' and reader 101'.

Data between tag 103*z*' and reader 101' could be transferred using NFC Data Exchange Format (NDEF) and support a Multipurpose Internet Mail Extensions (MIME) typed object or file transferred between tag 103*z*' and reader 101'. In other words, subsequent messages and files transferred using NFC radios could utilize NDEF and MIME objects, although other possibilities exist as well for the NFC standards utilized without departing from the scope of the present invention. NFC session setup 602 could also implement additional air-interface security, such as ECMA-409 2nd edition-NFC-SEC-02: NFC-SEC and related standards, where the air interface is encrypted using AES and Diffie-Hellman key exchanges. In exemplary embodiments, NFC session setup 602 utilizes standard ECMA-352 in order to select ECMA-340, ISO/IEC 14443 and ISO/IEC 15693 as a communication mode between tag 103*z*' and reader 101'

As depicted in FIG. 6*c*, tag 103*z*', reader 101' and network 102 could conduct a step 224 or a step 405, where a step 224 is depicted in FIG. 2*a* and a step 405 is depicted in FIG. 4. The selection for the use of a step 224 or step 405 could be specified in parameters or settings for reader 101' and tag 103*z*'. For a step 224 or step 405, a reader 101' can send a probe or query request as part of NFC session setup 602. A tag 103*z*' can send message 297 from a step 224 to reader 101' through NFC session 602. Message 297 can include the device ephemeral public key Ed 103*a* and also an obfuscated identity ID.device-obfuscated 1030 for tag 103*z*', where the obfuscated identity can also comprise a temporary identity for device 103. Or, message 297 for a step 224 or step 405 in FIG. 4 could include a hash value over a public key recorded by tag 101' (such as H (Sd) 250 or H (Ss) 252) and the hash value can be used by reader 101' in order to identify tag 103*z*' Or, message 297 could include an identity for tag 103*z*' comprising an ID.device 103*i*. Other possibilities exist as well for a tag 103*z*' to send plaintext identification information or omit plaintext identification information in a message 297 without departing from the scope of the present invention.

The reader 101' can use identifying information from message 297 to query a database 101*d* for additional PKI key information for tag 103*z*' in a database 101*d*, such as (i) reading a key ss 101*b* for a key Ss 101*a* recorded by the tag 103*z*', as well as (ii) selecting a network 102 the tag 103*z*', and also (iii) selecting a key Sd 103*c* for tag 103*z*'. Reader 101' can conduct an ECC point addition operation 213 over key Sd 103*c* and key Ed 103*a* in order to calculate a point X0 213*a*. Reader 101' can use the point X0 213*a* in a key derivation step 218. For a step 405, the reader 101' can send the point X0 213*a* and identifying information for device 103 and tag 103*z*' to a key server 101*w*, and key server 101*w* could conduct the ECHD key exchange step 207 and send the resulting shared secret value X3 207*a*, as depicted and described in connection with a step 405 in FIG. 4. For a step 224, reader 101' can conduct an ECDH key exchange step 218 with point X0 213*a* and key ss 101*b* in order to calculate a point X3 207*a*. Reader 101' can input X3 207*a* into a KDF 208 in order to calculate or process a resulting symmetric ciphering key K1 206*a*.

The tag 103*z*' can mutually derive the same symmetric ciphering key K1 206*a* using a key exchange step 206 as depicted in FIG. 2*c*. The tag 103*z*' could conduct a step 206 before sending message 297 and after setup of NFC session 602. The tag 103*z*' could encrypt device public key 121 in a ciphertext 209*b* in message 297 using the key K1 206*a*, as depicted in FIG. 2*c*. The reader 101' can decrypt the ciphertext 209*b* in message 297 using the key K1 206*a* derived by reader 101' in a step 218. The reader 101' can use a decryption step 221 in order to read plaintext from ciphertext 209*b*. Successful reading of plaintext from a decryption step 221 (plus optionally a correct MAC code 209*m* received in message 297) can confirm to reader 101' that tag 103*z*' is authenticated and the decrypted plaintext from message 297 can be trusted as from a tag 103*z*' that records a device static private key sd 103*d*. The reader 101' can forward the plaintext device public key 121 to network 102 and receive the network public key 131 from network 102.

The reader 101' and tag 103*z*' can select a step 228 or 229 for reader 101' to send tag 109' ciphertext that encrypts the network public key 131. The use of a step 228 or step 229 could be specified in a set of cryptographic parameters A 104*h* recorded in the two devices, and other possibilities exist as well for data to use in order to select a step 228 or step 229. For a step 228 reader 101' can send a ciphertext 2 223*b* to tag 103*z*' in a message 225. The tag 103*z*' can then conduct a step 228 to receive a ciphertext 2 223*b* from reader 101'. The successful decryption of ciphertext 2 223*b* using key K1 206*a* from step 206 by tag 103*z*' can confirm that reader 101' is authenticated on the basis of having access to private key ss 101*b*. Tag 103*z*' can trust the network public key 131 on the basis of reader 101' having access to private key ss 101*b*.

For another embodiment depicted in FIG. 6*c*, the reader 101' can conduct a step 229 with the tag 103*z*' to send the ciphertext 3 302*b* and an ephemeral public key Es 101*p* to tag 103*z*' in a message 229*a*. The reader 101' could use the corresponding ephemeral private key es 101*s* to conduct a key exchange step 301 to derive a second symmetric ciphering key K2 301*k*. The tag 103*z*' can then conduct the series of steps for a device 103 in a step 229 to receive a ciphertext 3 302*b* and ephemeral public key Es 101*p* from reader 101'. The tag 103*z*' can conduct a key exchange step 304 in order to mutually derive key K2 301*k*. The successful decryption of ciphertext 3 302*b* using key K2 301*k* from step 304 can confirm that reader 101' is authenticated. Tag 103*z*' could also read plaintext values for a random3 216*a* and network public key 131.

After conclusion of a step 229 or step 229, device 103 (which could include tag 103*z*'), then device 103 could use the network public key 131 received in a step 228 or step 229 in order to communicate with network 102. Device 103 and network 102 could communicate through an IP network 107 as depicted and described in connection with FIG. 1*a* above. Device 103 with tag 103*z*' could conduct a step 523 in order to securely transmit or send data 507*a* and receive a response 516*a*.

CONCLUSION

Various exemplary embodiments have been described above. Those skilled in the art will understand, however, that changes and modifications may be made to those examples without departing from the scope of the claims.

The invention claimed is:

1. A system for securely communicating with a device comprising:

(a) a first server comprising (i) at least one first processor and (ii) a first memory operatively connected to the at least one first processor, the first memory including first processor executable code that, when executed by the at least one first processor, performs the steps of:

(1) storing, in the first memory, (i) first elliptic curve cryptography (ECC) parameters for an elliptic curve Diffie Hellman (ECDH) key exchange algorithm, and (ii) a first server private key corresponding to a first server public key for the first ECC parameters;

(2) receiving a message from the device comprising:

(i) a first device public key supporting the first ECC parameters;

(ii) a value for selecting the first server private key; and (iii) a symmetric ciphertext comprising a second device public key supporting second ECC parameters, a domain name for a second server, and a random number;

(3) generating a first symmetric ciphering key from the ECDH key exchange algorithm with the first device public key and the first server private key;

(4) decrypting the symmetric ciphertext in order to read the second device public key, the domain name, and the random number as plaintext;

(5) selecting, a second server using the domain name;

(6) sending, to the second server, the second device public key and the random number;

(b) a second server comprising (i) at least one second processor and (ii) a second memory operatively connected to the at least one second processor, the second memory including second processor executable code that, when executed by the at least one second processor, performs the steps of:

(1) storing, in the second memory, (i) the second ECC parameters, (ii) a second server private key corresponding to a second server public key for the second ECC parameters, and (iii) the domain name for the second server;

(2) generating (i) a second symmetric ciphering key from the ECDH key exchange algorithm with the second device public key and the second server private key and (ii) a response;

(3) encrypting the response with the second symmetric ciphering key in order to generate an encrypted response; and (4) sending the encrypted response in a message for the device.

2. The system of claim 1, wherein a plurality of domain names are associated with a plurality of second servers.

3. The system of claim 1, wherein the first memory of the first server comprises a nonvolatile memory, and wherein the first server private key is static and the corresponding first server public key is static.

4. The system of claim 1, wherein the first memory of the first server stores a plurality of first server private keys and first server public keys with a plurality of values, and wherein the plurality of values identify the first server private keys and the first server public keys.

5. The system of claim 4 further comprising after step 2) and before step 3) of the first server: selecting the first server private key using the value received in the message.

6. The system of claim 1, wherein the device mutually derives the first symmetric ciphering key from the ECDH key exchange algorithm with (i) a first device private key corresponding to the first device public key and (ii) the first server public key.

7. The system of claim 6, further comprising sending, by the first server, the second server public key, wherein the device mutually derives the second symmetric ciphering key from the ECDH key exchange algorithm with (i) a second device private key corresponding to the second device public key and (ii) the second server public key.

8. A system for securely communicating with a device comprising:

(a) a first server comprising (i) at least one first processor and (ii) a first memory operatively connected to the at least one first processor, the first memory including first processor executable code that, when executed by the at least one first processor, performs the steps of:

(1) storing, in the first memory, (i) first elliptic curve cryptography (ECC) parameters for an elliptic curve Diffie Hellman (ECDH) key exchange algorithm, and (ii) a first server private key corresponding to a first server public key associated with the first ECC parameters;

(2) receiving a message from the device comprising:

(i) a first device public key associated with the first ECC parameters;

(ii) a value for selecting the first server private key; and (iii) a symmetric ciphertext including a second device public key associated with second ECC parameters, a domain name for a second server, and a random number;

(3) generating a first symmetric ciphering key using the ECDH key exchange algorithm with the first device public key, and the first server private key;

(4) obtaining, by decrypting from the symmetric ciphertext, the second device public key, the domain name, and the random number as plaint text;

(5) selecting, by the domain name, a second server;

(6) sending, to the second server, a second message including the second device public key and the random number;

(b) the second server comprising (i) at least one second processor and (ii) a second memory operatively connected to the at least one second processor, the second memory including second processor executable code that, when executed by the at least one second processor, performs the steps of:

(1) storing, in the second memory, (i) the second ECC parameters, (ii) a second server private key corresponding to a second server public key for the second ECC parameters, and (iii) the domain name for the second server;

(2) receiving the second message;

(3) generating (i) a second symmetric ciphering key using the ECDH key exchange algorithm with the second device public key and the second server private key and (ii) a response;

(4) generate a response to the second message;

(5) generating an encrypted response by encrypting the response with the second symmetric ciphering key; and (6) ending the encrypted response in a message for the device.

9. The system of claim 8, wherein the second server is one of a first set of a plurality of other servers, and wherein each server in the first set of the plurality of other servers is associated with a respective domain name.

10. The system of claim 8, wherein the first memory of the first server comprises first nonvolatile memory, and wherein the first server private key is static and the corresponding first server public key is static.

11. The system of claim 8, wherein the first server is one of a second set of plurality of other servers, and wherein the first memory of the each server in the second set of the plurality of other servers stores a plurality of first server private keys and corresponding first server public keys with a plurality of corresponding values, and wherein the plurality of corresponding values identify the respective first server private keys and the respective corresponding first server public keys.

12. The system of claim 11, wherein the first processor executable code is further configured to perform after performing step 2) and before performing step 3) the further step of: 7) selecting the first server private key using the value received in the message.

13. The system of claim 8, wherein the device mutually generates the first symmetric ciphering key using the ECDH key exchange algorithm with (i) a second device private key corresponding to the first device public key and (ii) a first server public key corresponding to the first server private key.

14. The system of claim 13, wherein the first processor executable code is further configured to perform the further step of: 7) sending to device, the second server public key, wherein the device mutually generates the second symmetric ciphering key using the ECDH key exchange algorithm with (i) a second device private key corresponding to the second device public key, and (ii) the second server public key.

* * * * *